(12) United States Patent
Yang

(10) Patent No.: US 10,122,008 B2
(45) Date of Patent: Nov. 6, 2018

(54) ELECTRICITY CHARGING/DISCHARGING DEVICE WITH INSULATION PACKAGE ENCLOSE MEMBER HAVING ELECTRODE PLATE PAIR WITH MULTIPLE-SIDED ELECTRIC CONDUCTIVE TERMINALS

(71) Applicant: Tai-Her Yang, Dzan-Hwa (TW)

(72) Inventor: Tai-Her Yang, Dzan-Hwa (TW)

( * ) Notice: Subject to any disclaimer, the term of this patent is extended or adjusted under 35 U.S.C. 154(b) by 519 days.

(21) Appl. No.: 14/743,308

(22) Filed: Jun. 18, 2015

(65) Prior Publication Data

US 2015/0372283 A1 Dec. 24, 2015

Related U.S. Application Data

(63) Continuation-in-part of application No. 14/310,517, filed on Jun. 20, 2014, now Pat. No. 9,911,963, which is a continuation-in-part of application No. 14/310,498, filed on Jun. 20, 2014, now Pat. No. 9,659,715, which is a continuation-in-part of application No. 14/310,542, filed on Jun. 20, 2014, now Pat. No. 10,014,117.

(51) Int. Cl.
| | |
|---|---|
| *H01M 2/30* | (2006.01) |
| *H01M 2/26* | (2006.01) |
| *H01M 2/02* | (2006.01) |
| *H01M 2/16* | (2006.01) |
| *H01M 10/052* | (2010.01) |
| *H01G 9/00* | (2006.01) |
| *H01M 4/13* | (2010.01) |

(52) U.S. Cl.
CPC ............... *H01M 2/30* (2013.01); *H01G 9/00* (2013.01); *H01M 2/026* (2013.01); *H01M 2/0257* (2013.01); *H01M 2/0262* (2013.01); *H01M 2/1653* (2013.01); *H01M 2/26* (2013.01); *H01M 2/266* (2013.01); *H01M 4/13* (2013.01); *H01M 10/052* (2013.01)

(58) Field of Classification Search
None
See application file for complete search history.

*Primary Examiner* — Daniel S Gatewood
(74) *Attorney, Agent, or Firm* — Bacon & Thomas, PLLC

(57) ABSTRACT

The present invention provides an electricity charging/discharging device with insulation package enclose member having electrode plate pair with multiple-sided electric conductive terminals, wherein both the electrode plate pair with multiple-sided electric conductive terminals and the section of the electric conductive terminal adjacent to the connected electrode plate extending from at least two sides thereof to the external for inputting/outputting electric energy are sealed covered by a packing material with insulation property to form a full-closed type electricity charging/discharging device with insulation package enclose member such as Lithium-ion Batteries, for instance Lithium Iron Phosphate (LFP) Battery, Lithium Nickel Manganese Cobalt Oxide (NMW) Battery, and Lithium Polymer Battery, or a supercapacity, so the electrode plate pair is able to output or input electric energy to the exterior through an electric conductive interface formed by at least two-sided electric conductive terminal.

35 Claims, 28 Drawing Sheets

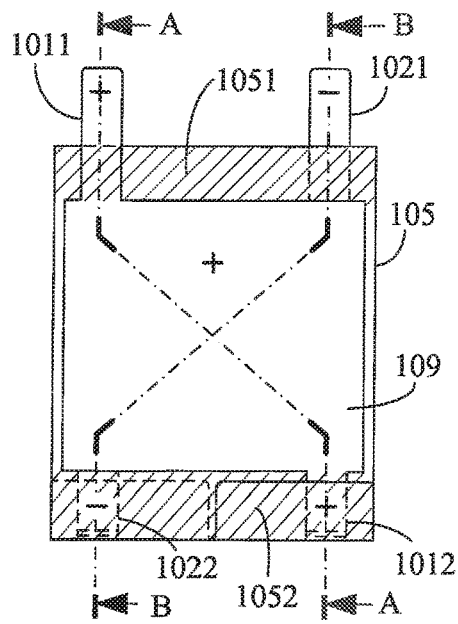
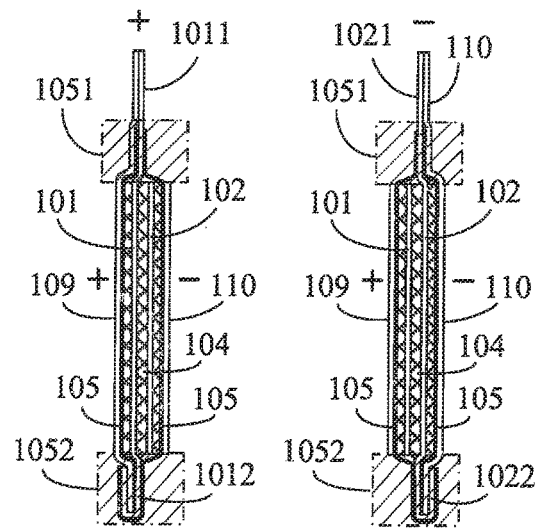
Fig. 9　　　　Fig. 10　　Fig. 11
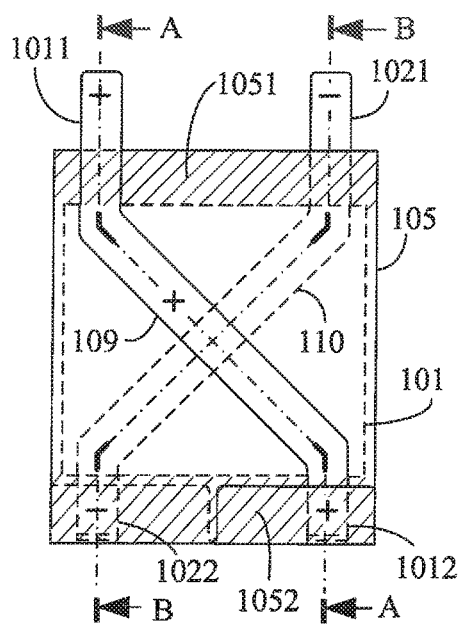
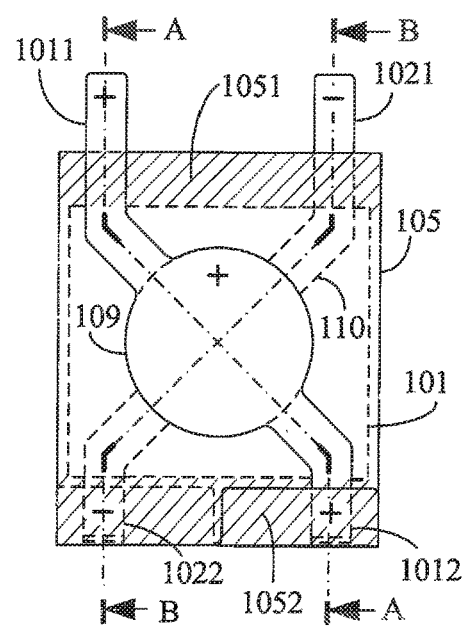
Fig. 12　　　　　　Fig. 13

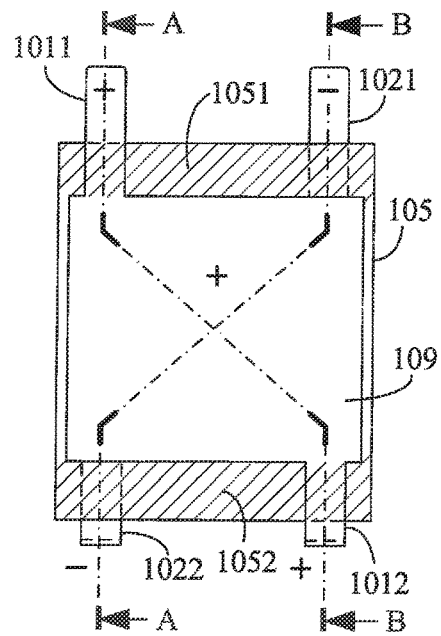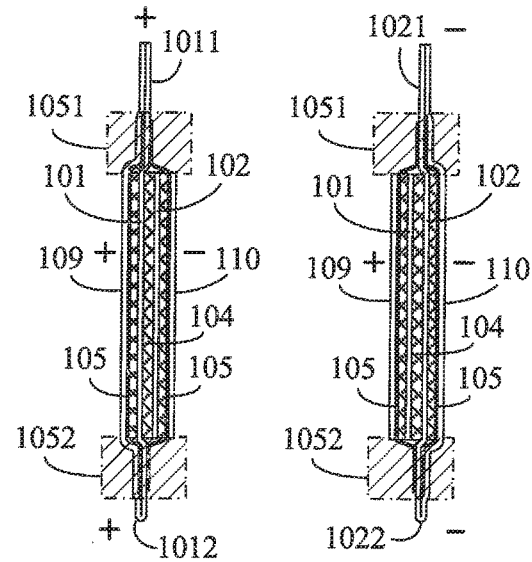
Fig. 19　　　　Fig. 20　　　　Fig. 21
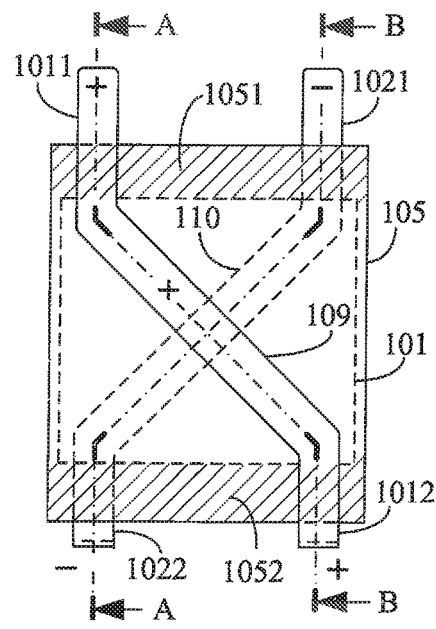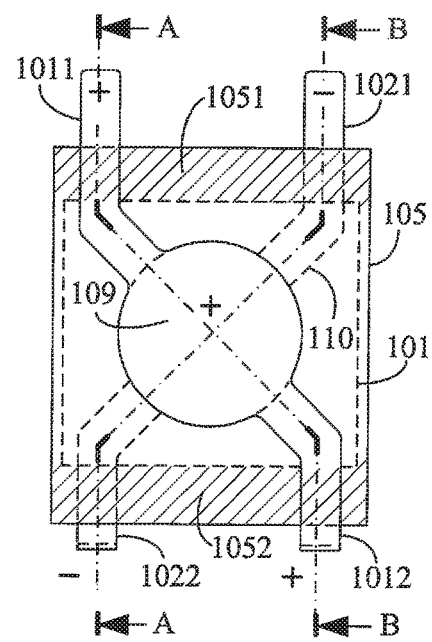
Fig. 22　　　　Fig. 23

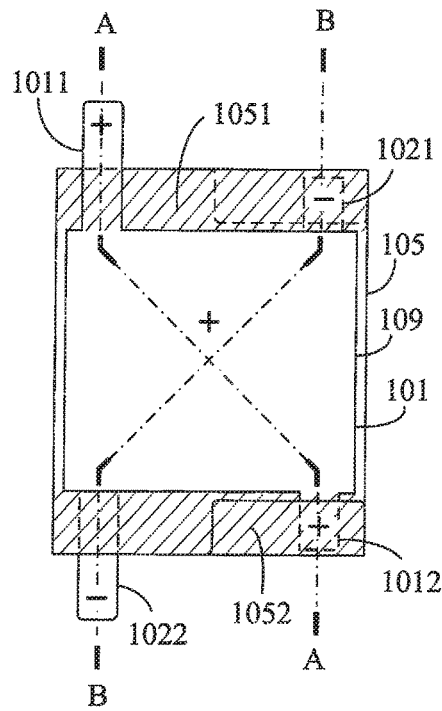
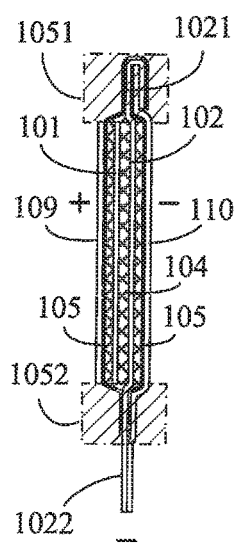
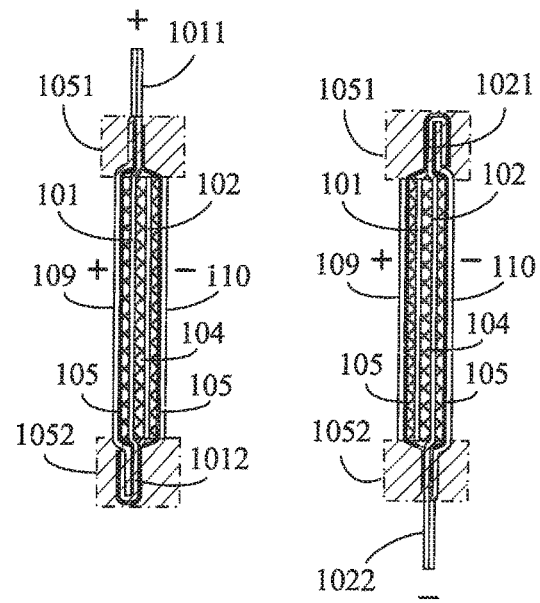
Fig. 29　　Fig. 30　　Fig. 31
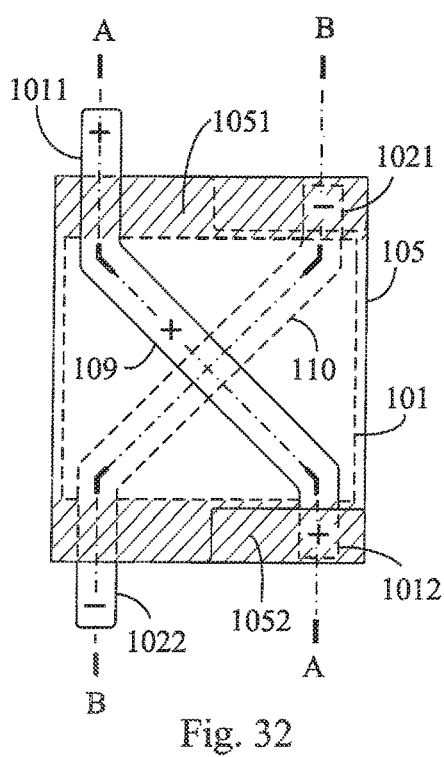
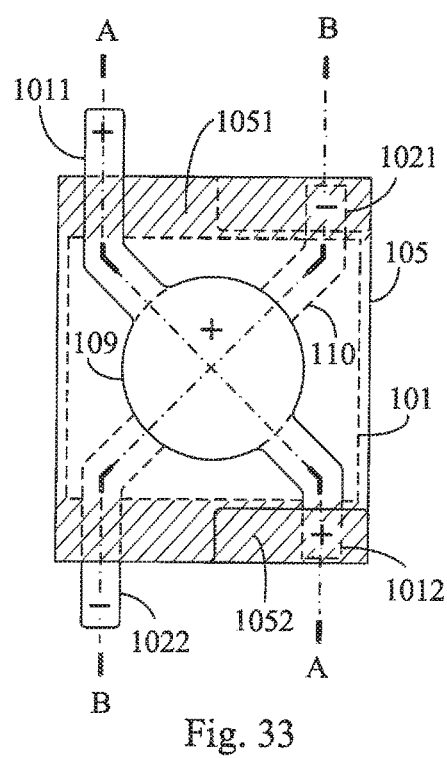
Fig. 32　　Fig. 33

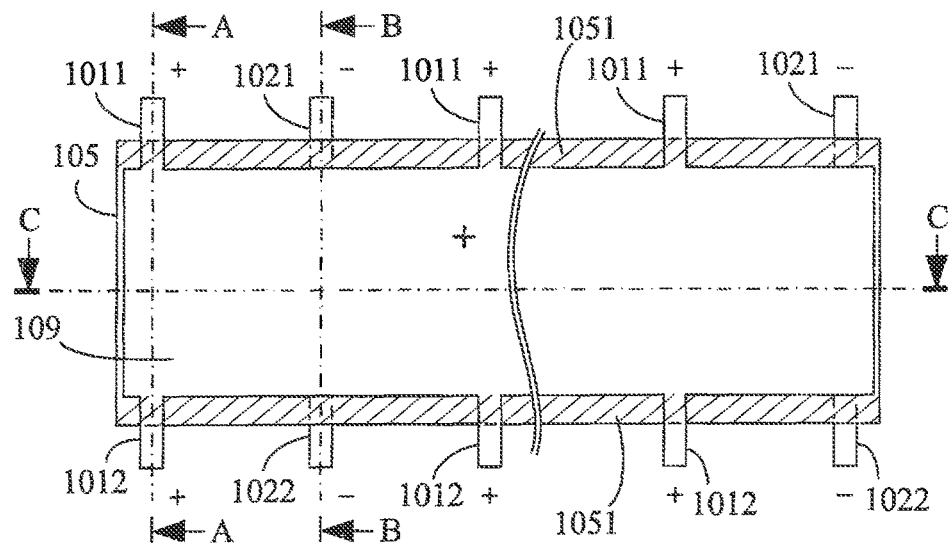
Fig. 36
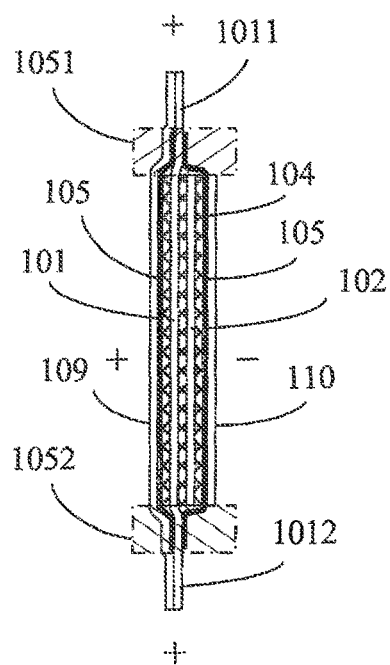 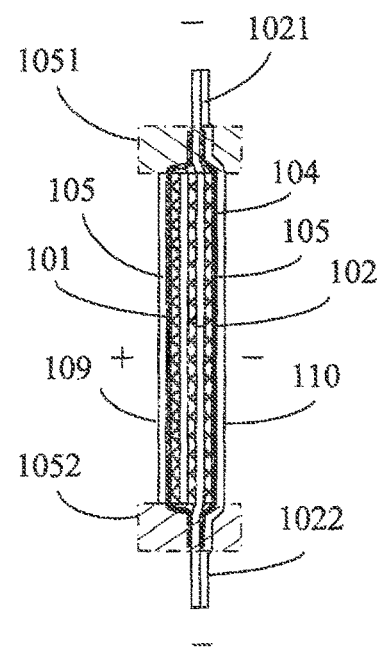
Fig. 37  Fig. 38

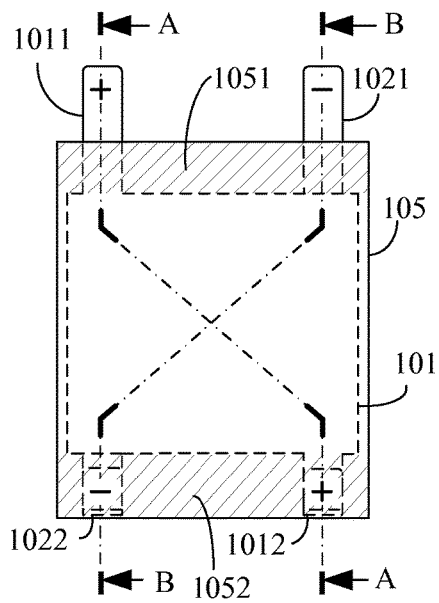
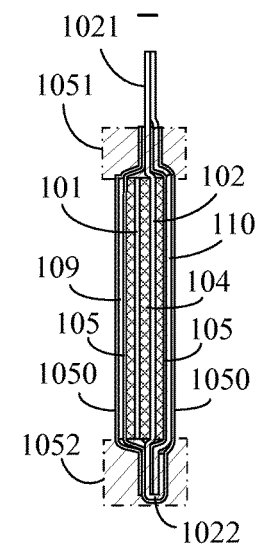
Fig. 42  Fig. 43  Fig. 44
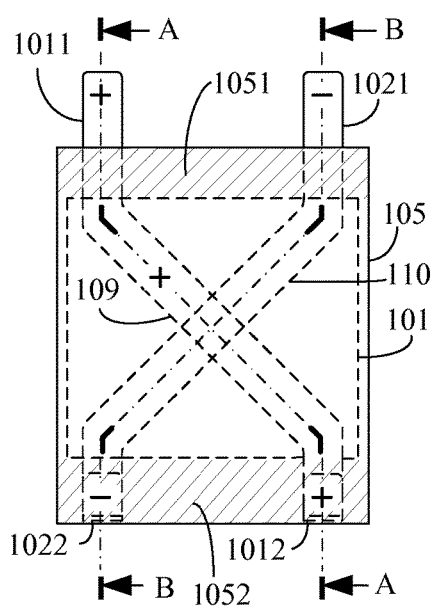
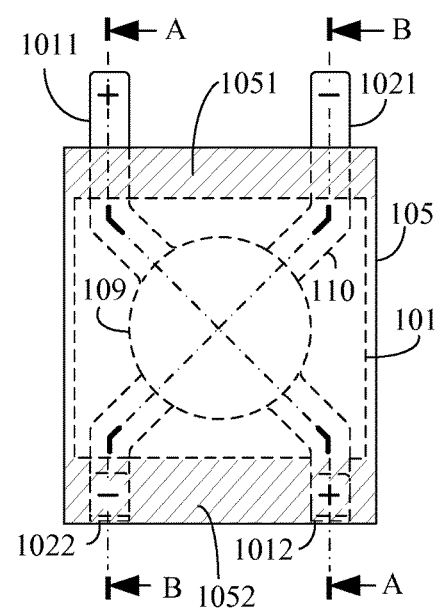
Fig. 45  Fig. 46

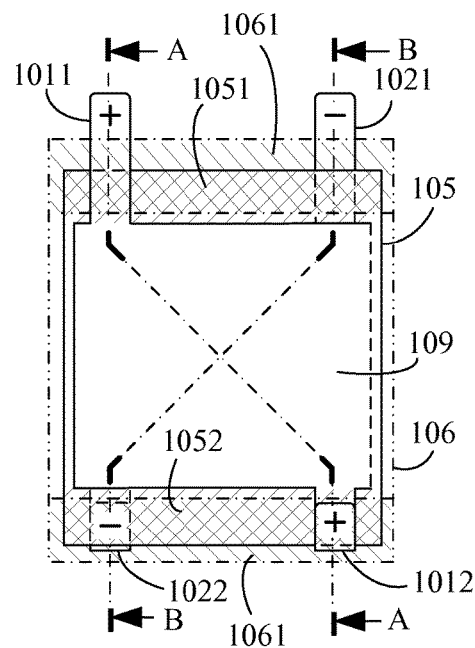
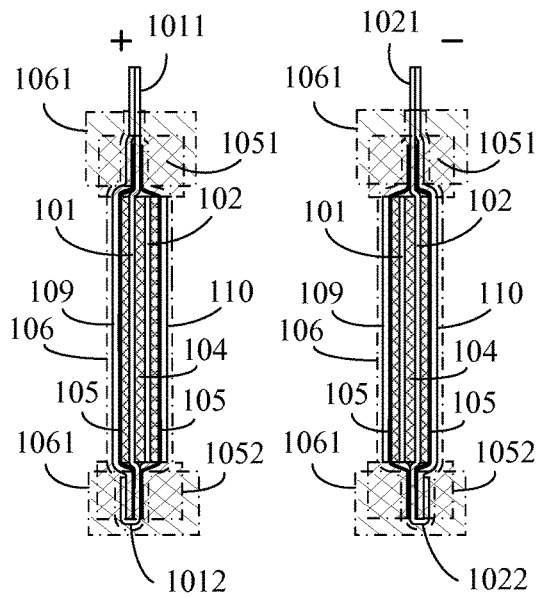
Fig. 63    Fig. 64    Fig. 65
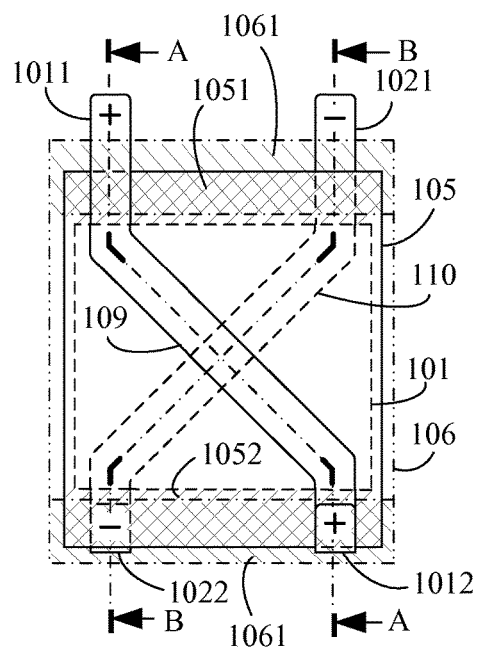
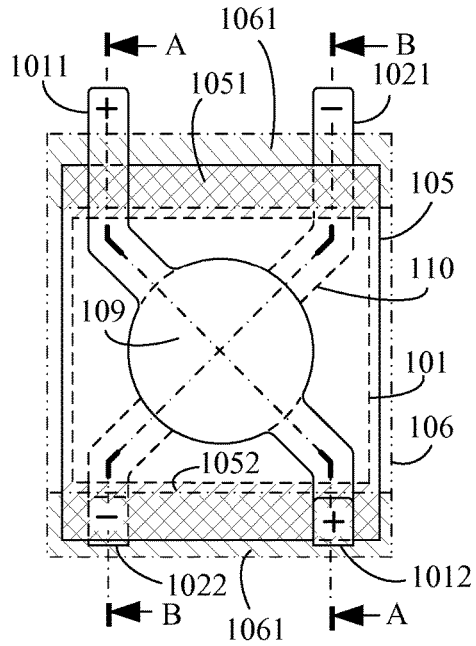
Fig. 66    Fig. 67

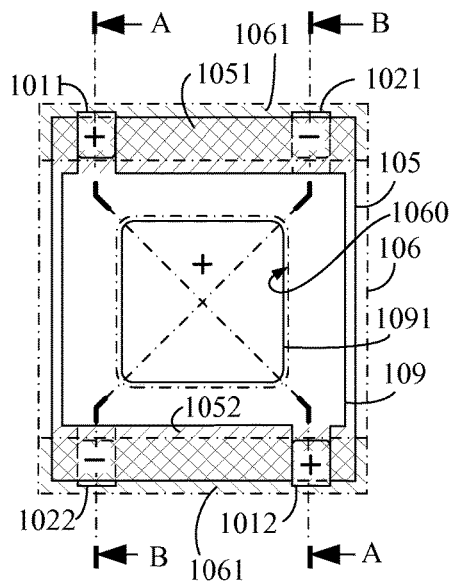
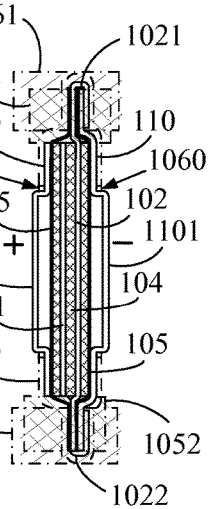
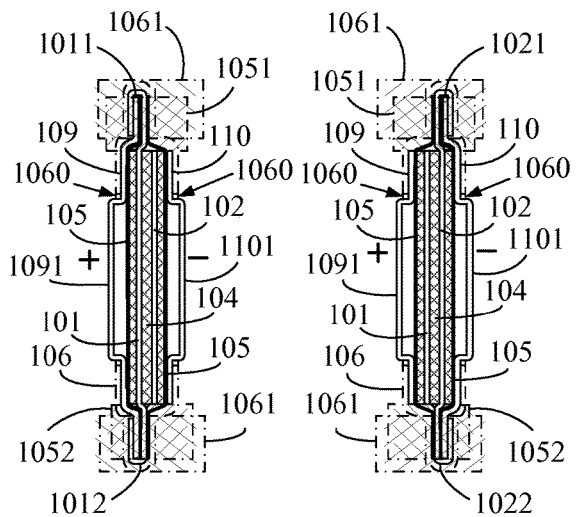
Fig. 78  Fig. 79  Fig. 80
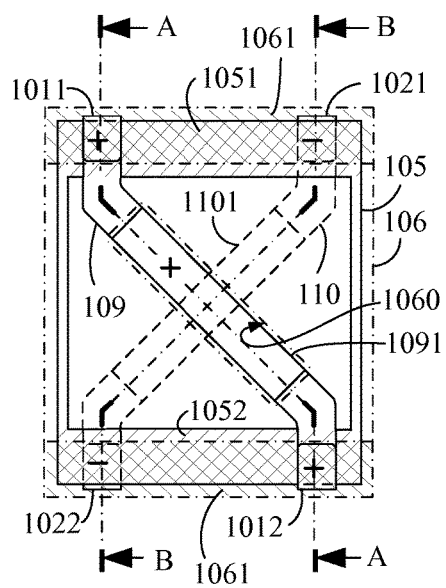
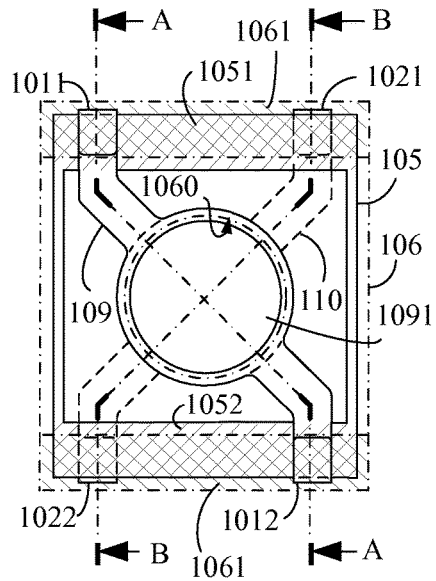
Fig. 81  Fig. 82

ELECTRICITY CHARGING/DISCHARGING DEVICE WITH INSULATION PACKAGE ENCLOSE MEMBER HAVING ELECTRODE PLATE PAIR WITH MULTIPLE-SIDED ELECTRIC CONDUCTIVE TERMINALS

CROSS REFERENCE TO RELATED APPLICATION

This is a Continuation-In-Part of application Ser. Nos. 14/310,498, 14/310,517 and 14/310,542, filed on Jun. 20, 2014.

BACKGROUND OF THE INVENTION (a) Field of the Invention

The present invention provides an electricity charging/discharging device with insulation package enclose member having electrode plate pair with multiple-sided electric conductive terminals, wherein both the electrode plate pair with multiple-sided electric conductive terminals and the section of the electric conductive terminal adjacent to the connected electrode plate extending from at least two sides thereof to the external for inputting/outputting electric energy are sealed covered by a packing material with insulation property to form a full-closed type electricity charging/discharging device with insulation package enclose member such as Lithium-ion Batteries, for instance Lithium Iron Phosphate (LFP) Battery, Lithium Nickel Manganese Cobalt Oxide (NMC) Battery, and Lithium Polymer Battery, or a super-capacity, so the electrode plate pair is able to output or input electric energy to the exterior through an electric conductive interface formed by at least two-sided electric conductive terminal, or further to be connected in series, or in parallel, or in series then in parallel, or in parallel then in series for forming as an electricity charging/discharging device module of two or more than two electricity charging/discharging devices with insulation package enclose member applicable for various requirements; said electricity charging/discharging device with insulation package enclose member can be used directly or can be further selectively covered with a housing for protection at the external of the electrode plate pair with multiple-sided electric conductive terminals of the insulation package enclose member.

(b) Description of the Prior Art

The conventional electricity charging/discharging device having electrode plate pair with multiple-sided electric conductive terminals is configured to a housing of groove structure, then the housing is welded or adhered with the end housing; the electric conductive terminals of the electrode plate pair with multiple-sided electric conductive terminals need to pass through the through holes on the housing or the end housing for extending to the external, and the sealing packaging material is additional filled at the through hole thus constituting a sealed packaging structure; there is numerous manufacturing processes and the quality control of the sealing location is difficult, therefore the sealing structure is often deteriorated after long-time use.

SUMMARY OF THE INVENTION

The conventional electricity charging/discharging device having electrode plate pair with multiple-sided electric conductive terminals is configured to a housing of groove structure, then the housing is welded or adhered with the end housing; the electric conductive terminals of the electrode plate pair with multiple-sided electric conductive terminals need to pass through the through holes on the housing or the end housing for extending to the external, and the sealing packaging material is additional filled at the through hole thus constituting a sealed packaging structure; there is numerous manufacturing processes and the quality control of the sealing location is difficult, therefore the sealing structure is often deteriorated after long-time use.

The present invention provides an electricity charging/discharging device with insulation package enclose member having electrode plate pair with multiple-sided electric conductive terminals, wherein both the electrode plate pair with multiple-sided electric conductive terminals and the section of the electric conductive terminal adjacent to the connected electrode plate extending from at least two sides thereof to the external for inputting/outputting electric energy are sealed covered by a packing material with insulation property to form a full-closed type electricity charging/discharging device with insulation package enclose member such as Lithium-ion Batteries, for instance Lithium Iron Phosphate (LFP) Battery, Lithium Nickel Manganese Cobalt Oxide (NMC) Battery, and Lithium Polymer Battery, or a super-capacity, so the electrode plate pair is able to output or input electric energy to the exterior through an electric conductive interface formed by at least two-sided electric conductive terminal, or further to be connected in series, or in parallel, or in series then in parallel, or in parallel then in series for forming as an electricity charging/discharging device module of two or more than two electricity charging/discharging devices with insulation package enclose member applicable for various requirements; said electricity charging/discharging device with insulation package enclose member can be used directly or can be further selectively covered with a housing for protection at the external of the electrode plate pair with multiple-sided electric conductive terminals of the insulation package enclose member.

BRIEF DESCRIPTION OF THE DRAWINGS

FIG. 9 is a schematic structural view showing the input/output electric conductive terminals having positive and negative polarities at one side of the electrode plate pair and a quadrilateral sheet-like lateral positive electric conductive member (109) and a lateral negative electric conductive member (110) at two lateral sides being structured as a multiple input/output electric conductive interface according to one embodiment of the present invention.

FIG. 10 is a lateral cross sectional view of FIG. 9 taken along A-A.

FIG. 11 is a lateral cross sectional view of FIG. 9 taken along B-B.

FIG. 12 is a schematic structural view showing the input/output electric conductive terminals having positive and negative polarities at one side of the electrode plate pair and the strip-like lateral positive electric conductive member (109) and the lateral negative electric conductive member (110) at two lateral sides are structured as the multiple input/output electric conductive interface according to one embodiment of the present invention.

FIG. 13 is a schematic structural view showing the input/output electric conductive terminals having positive and negative polarities at one side of the electrode plate pair and the circular sheet-like lateral positive electric conductive member (109) and the lateral negative electric conductive member (110) at two lateral sides are structured as the multiple input/output electric conductive interface according to one embodiment of the present invention.

FIG. 19 is a schematic structural view showing the positive electrode plate (101) and the lateral positive electric conductive member (109), and the negative electrode plate (102) and the lateral negative electric conductive member (110) being integrally formed, and the input/output electric conductive terminals having at least one positive polarity input/output electric conductive terminal and at least one negative polarity input/output electric conductive terminal at two sides of the electrode plate pair and the quadrilateral sheet-like lateral positive electric conductive member (109) and the lateral negative electric conductive member (110) at two lateral sides being structured as the multiple input/output electric conductive interface according to one embodiment of the present invention.

FIG. 20 is a lateral cross sectional view of FIG. 19 taken along A-A.

FIG. 21 is a lateral cross sectional view of FIG. 19 taken along B-B.

FIG. 22 is a schematic structural view showing the positive electrode plate (101) and the lateral positive electric conductive member (109), and the negative electrode plate (102) and the lateral negative electric conductive member (110) being integrally formed, and the input/output electric conductive terminals having at least one positive polarity input/output electric conductive terminal and at least one negative polarity input/output electric conductive terminal at two sides of the electrode plate pair and the strip-like lateral positive electric conductive member (109) and the lateral negative electric conductive member (110) at two lateral sides being structured as the multiple input/output electric conductive interface according to one embodiment of the present invention.

FIG. 23 is a schematic structural view showing the positive electrode plate (101) and the lateral positive electric conductive member (109), and the negative electrode plate (102) and the lateral negative electric conductive member (110) being integrally formed, and the input/output electric conductive terminals having at least one positive polarity input/output electric conductive terminal and at least one negative polarity input/output electric conductive terminal at two sides of the electrode plate pair and the circular sheet-like lateral positive electric conductive member (109) and the lateral negative electric conductive member (110) at two lateral sides being structured as the multiple input/output electric conductive interface according to one embodiment of the present invention.

FIG. 29 is a schematic structural view showing an input/output electric conductive terminal having different polarity and respectively provided at two ends defined at the same side of the electrode plate pair and the quadrilateral sheet-like lateral positive electric conductive member (109) and the lateral negative electric conductive member (110) at two lateral sides of the electrode plate pair being structured as the multiple input/output electric conductive interface according to one embodiment of the present invention.

FIG. 30 is a lateral cross sectional view of FIG. 29 taken along A-A.

FIG. 31 is a lateral cross sectional view of FIG. 29 taken along B-B.

FIG. 32 is a schematic structural view showing an input/output electric conductive terminal having different polarity and respectively provided at two ends defined at the same side of the electrode plate pair and the strip-like lateral positive electric conductive member (109) and the lateral negative electric conductive member (110) at two lateral sides of the electrode plate pair being structured as the multiple input/output electric conductive interface according to one embodiment of the present invention.

FIG. 33 is a schematic structural view showing an input/output electric conductive terminal having different polarity and respectively provided at two ends defined at the same side of the electrode plate pair and the circular sheet-like lateral positive electric conductive member (109) and the lateral negative electric conductive member (110) at two lateral sides of the electrode plate pair being structured as the multiple input/output electric conductive interface according to one embodiment of the present invention.

FIG. 36 is a structural develop view showing the multiple input/output electric conductive interface being formed as a rolling structure according to one embodiment of the present invention.

FIG. 37 is a lateral cross sectional view of FIG. 36 taken along A-A.

FIG. 38 is a lateral cross sectional view of FIG. 36 taken along B-B.

FIG. 42 is a schematic structural view showing one side of the electrode plate pair having a quadrilateral sheet-like lateral positive electric conductive member (109) and a lateral negative electric conductive member (110) being provided with the input/output electric conductive terminal having positive and negative polarity for being structured as a single-sided input/output electric conductive interface according to one embodiment of the present invention.

FIG. 43 is a lateral cross sectional view of FIG. 42 taken along A-A.

FIG. 44 is a lateral cross sectional view of FIG. 42 taken along B-B.

FIG. 45 is a schematic structural view showing one side of the electrode plate pair having the strip-like lateral positive electric conductive member (109) and the lateral negative electric conductive member (110) being provided with the input/output electric conductive terminals having positive and negative polarity for being structured as the single-sided input/output electric conductive interface according to one embodiment of the present invention.

FIG. 46 is a schematic structural view showing one side of the electrode plate pair having the circular sheet-like lateral positive electric conductive member (109) and the lateral negative electric conductive member (110) being provided with the input/output electric conductive terminals having positive and negative polarity for being structured as the single-sided input/output electric conductive interface according to one embodiment of the present invention.

FIG. 63 is a schematic structural view showing the electricity charging/discharging device with insulation package enclose member having electrode plate pair with multiple-sided electric conductive terminals being provided with a quadrilateral sheet-like lateral positive electric conductive member (109) and a lateral negative electric conductive member (110).

FIG. 64 is a lateral cross sectional view of FIG. 63 taken along A-A.

FIG. 65 is a lateral cross sectional view of FIG. 63 taken along B-B.

FIG. 66 is a schematic structural view showing the electricity charging/discharging device with insulation package enclose member having electrode plate pair with multiple-sided electric conductive terminals being installed with the strip-like lateral positive electric conductive member (109) and the lateral negative electric conductive member (110).

FIG. 67 is a schematic structural view showing the electricity charging/discharging device with insulation package enclose member having electrode plate pair with multiple-sided electric conductive terminals being installed with the circular sheet-like lateral positive electric conductive member (109) and the lateral negative electric conductive member (110).

FIG. 78 is a schematic structural view showing the lateral positive electric conductive member (109) being installed with the lateral positive auxiliary electric conductive member (1091) and the lateral negative electric conductive member (110) being installed with the lateral negative auxiliary electric conductive member (1101) at two sides of the electricity charging/discharging device with insulation package enclose member having electrode plate pair with multiple-sided electric conductive terminals shown in FIG. 63 passing openings (1060) of the outer auxiliary insulation package enclosed member (106) at two sides for respectively being served as an input/output electric conductive interface.

FIG. 79 is a lateral cross sectional view of FIG. 78 taken along A-A.

FIG. 80 is a lateral cross sectional view of FIG. 78 taken along B-B.

FIG. 81 is a schematic structural view showing the lateral positive electric conductive member (109) being installed with the lateral positive auxiliary electric conductive member (1091) and the lateral negative electric conductive member (110) being installed with the lateral negative auxiliary electric conductive member (1101) at two sides of the electricity charging/discharging device with insulation package enclose member having electrode plate pair with multiple-sided electric conductive terminals shown in FIG. 66 passing openings (1060) of the outer auxiliary insulation package enclosed member (106) at two sides for respectively being served as an input/output electric conductive interface.

FIG. 82 is a schematic structural view showing the lateral positive electric conductive member (109) being installed with the lateral positive auxiliary electric conductive member (1091) and the lateral negative electric conductive member (110) being installed with the lateral negative auxiliary electric conductive member (1101) at two sides of the electricity charging/discharging device with insulation package enclose member having electrode plate pair with multiple-sided electric conductive terminals shown in FIG. 67 passing openings (1060) of the outer auxiliary insulation package enclosed member (106) at two sides for respectively being served as an input/output electric conductive interface.

DESCRIPTION OF MAIN COMPONENT SYMBOLS

Figure 1:
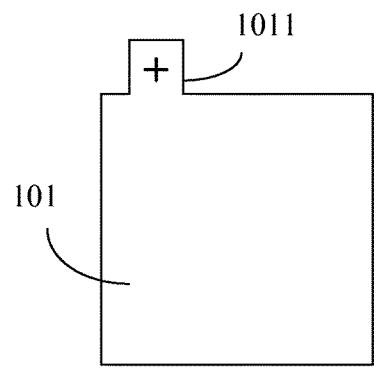
FIG. 1 is a schematic structural view showing a conventional electrode plate having single-sided electric energy transferring terminal.

101: Positive electrode plate
102: Negative electrode plate
104: Separator
105: Insulation package enclose member
1050: Folding covering and packing segment
1051、1052: Sealing zone
106: Outer auxiliary insulation package enclose member
1060: Opening of the outer auxiliary insulation package enclosed member (106)
1061 : Outer sealing zone
109: Lateral positive electric conductive member
1091: Lateral positive auxiliary electric conductive member
110: Lateral negative electric conductive member
1101: Lateral negative auxiliary electric conductive member
120: Housing
1011、1011'、1012、1012'、1013、1013'、1014、1014'、1021、1022、1023、1024: Electric conductive terminal

DETAILED DESCRIPTION OF THE PREFERRED EMBODIMENTS

A electrode plate is a fundamental component for structuring a primary cell or a rechargeable secondary cell or a capacitor or a super capacitor and a fuel cell for outputting electric energy, the configuration thereof is often composed of electrode plates having various geometric shapes, and at least a positive electrode plate and at least a negative electrode plate having the same or different quantity are formed as an electrode plate pair so as to structure an electricity charging/discharging cell, and at least two electricity charging/discharging cells are adopted for being homo-polarity connected in parallel or normal-polarity connected in series or being connected in series then in parallel or connected in parallel then in series for forming as a module applicable for various requirements.

It is well known that the electrode plate applied in the above-mentioned primary cell or rechargeable secondary cell or capacitor or super capacitor and fuel cell for outputting electric energy is mainly formed in a circular or quadrilateral shape or other geometric shapes according to actual needs. The conventional electricity charging/discharging device having electrode plate pair with multiple-sided electric conductive terminals is configured to a housing of groove structure, then the housing is welded or adhered with the end housing; the electric conductive terminals of the electrode plate pair with multiple-sided electric conductive terminals need to pass through the through holes on the housing or the end housing for extending to the external, and the sealing packaging material is additional filled at the through hole thus constituting a sealed packaging structure; there is numerous manufacturing processes and the quality control of the sealing location is difficult, therefore the sealing structure is often deteriorated after long-time use.

The present invention provides an electricity charging/discharging device with insulation package enclose member having electrode plate pair with multiple-sided electric conductive terminals, wherein both the electrode plate pair with multiple-sided electric conductive terminals and the section of the electric conductive terminal adjacent to the connected electrode plate extending from at least two sides thereof to the external for inputting/outputting electric energy are sealed covered by a packing material with insulation property to form a full-closed type electricity charging/discharging device with insulation package enclose member such as Lithium-ion Batteries, for instance Lithium Iron Phosphate (LFP) Battery, Lithium Nickel Manganese Cobalt Oxide (NMC) Battery, and Lithium Polymer Battery, or a supercapacity, so the electrode plate pair is able to output or input electric energy to the exterior through an electric conductive interface formed by at least two-sided electric conductive terminal, or further to be connected in series, or in parallel, or in series then in parallel, or in parallel then in series for forming as an electricity charging/discharging device module of two or more than two electricity charging/discharging devices with insulation package enclose member applicable for various requirements; said electricity charging/discharging device with insulation package enclose member can be used directly or can be further selectively covered with a housing for protection at the external of the electrode plate pair with multiple-sided electric conductive terminals of the insulation package enclose member. A positive electrode plate is adopted for illustration (the same illustration can be applied to a negative electrode plate therefore not provided), as followings:

FIG. 1 is a schematic structural view showing a conventional electrode plate having single-sided electric energy transferring terminal.

As shown in FIG. 1, the electrode plate formed in a shape is provided as an example, and the main configuration is that one side of the quadrilateral electrode plate is outwardly extended for forming the electric conductive terminal for inputting/outputting electric energy.

Figure 2:
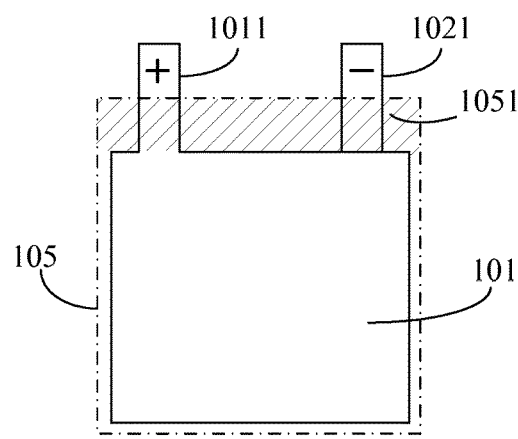
FIG. 2 is a schematic structural view showing a conventional electrode plate pair with single-sided electric energy transferring terminal being formed as an electricity charging/discharging cell.

FIG. 2 is a schematic structural view showing a conventional electrode plate pair with single-sided electric energy transferring terminal being formed as an electricity charging/discharging cell.

Figure 3:
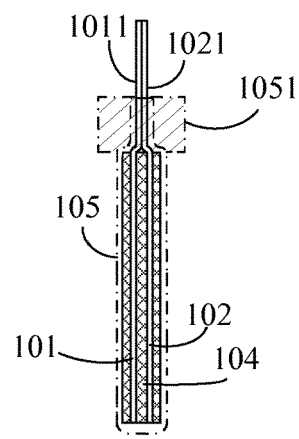
FIG. 3 is a lateral cross sectional view of FIG. 2.

FIG. 3 is a lateral cross sectional view of FIG. 2.

As shown in FIG. 2 and FIG. 3, the main configuration is that a quadrilateral positive electrode plate (101) having single-sided electric conductive terminal for inputting/outputting electric energy (1011) and a negative electrode plate (102) having single-sided electric conductive terminal for inputting/outputting electric energy (1021) are provided, and an separator is provided between the positive and the negative electrode plates, and the separator is directly installed or clamped at the exterior after an electrolyte solution or an electrolyte material is filled in then is disposed in an insulation package enclose member (105), and the electric conductive terminals for inputting/outputting electric energy (1011), (1012) are outwardly extended through a sealing zone (1051) from another side of the insulation package enclose member (105).

Figure 4:
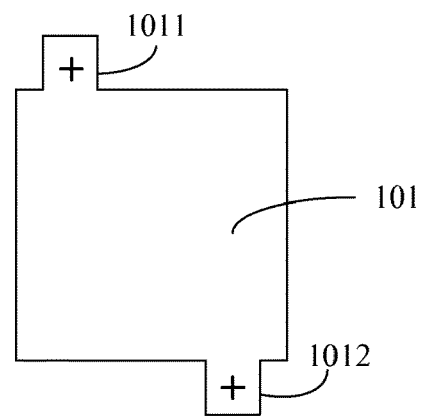
FIG. 4 is the first embodiment showing a conventional electrode plate having multiple-sided electric energy transferring terminals.

FIG. 4 is the first embodiment showing a conventional electrode plate having multiple-sided electric energy transferring terminals.

As shown in FIG. 4, the main configuration is that end portions defined at two opposite sides of the quadrilateral positive electrode plate (101) are respectively formed with an electric conductive terminal for inputting/outputting electric energy (1011), (1012).

Figure 5:
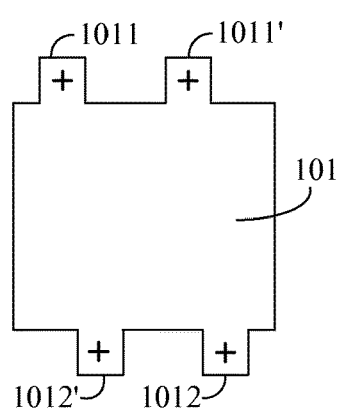
FIG. 5 is the second embodiment showing a conventional electrode plate having multiple-sided electric energy transferring terminals.

FIG. 5 is the second embodiment showing a conventional electrode plate having multiple-sided electric energy transferring terminals.

As shown in FIG. 5, the main configuration is that two opposite sides of the quadrilateral positive electrode plate (101) are respectively formed with two electric conductive terminals for inputting/outputting electric energy (1011), (1011') and two electric conductive terminals for inputting/outputting electric energy (1012), (1012'), wherein the electric conductive terminals for inputting/outputting electric energy (1011), (1011') formed at one side and the electric conductive terminals for inputting/outputting electric energy (1012), (1012') formed at the opposite side are staggeringly arranged.

Figure 6:
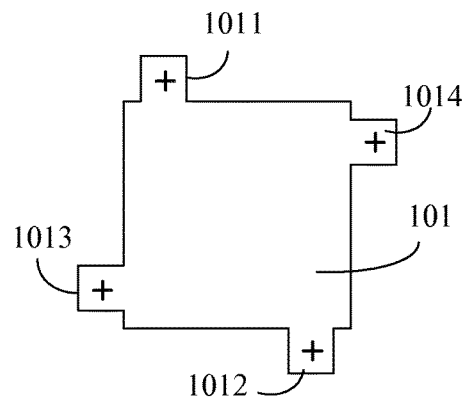
FIG. 6 is the third embodiment showing a conventional electrode plate having multiple-sided electric energy transferring terminals.

FIG. 6 is the third embodiment showing a conventional electrode plate having multiple-sided electric energy transferring terminals.

As shown in FIG. 6, four sides of the quadrilateral positive electrode plate (101) are respectively formed with an electric conductive terminal for inputting/outputting electric energy (1011), (1012), (1013), (1014), wherein the electric conductive terminals for inputting/outputting electric energy arranged at opposite sides are staggeringly arranged.

Figure 7:
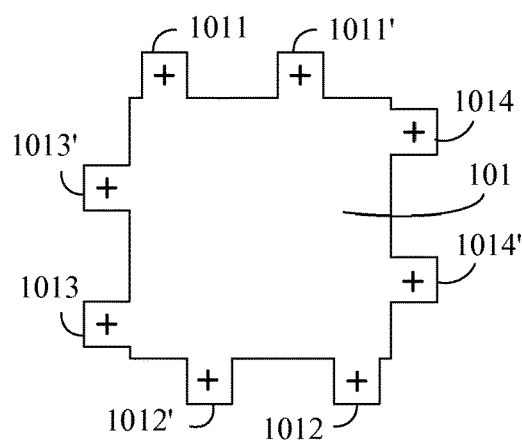
FIG. 7 is the fourth embodiment showing an electrode plate having multiple-sided electric energy transferring terminals.

FIG. 7 is the fourth embodiment showing an electrode plate having multiple-sided electric energy transferring terminals.

As shown in FIG. 7, a first side of the quadrilateral positive electrode plate (101) is formed with two electric conductive terminals for inputting/outputting electric energy (1011), (1011'), a second side thereof is formed with two electric conductive terminals for inputting/outputting electric energy (1012), (1012'), a third side thereof is formed with two electric conductive terminals for inputting/outputting electric energy (1013), (1013') and a fourth side thereof is formed with two electric conductive terminals for inputting/outputting electric energy (1014), (1014'), wherein the electric conductive terminals for inputting/outputting electric energy arranged at opposite sides are staggeringly arranged.

Figure 8:
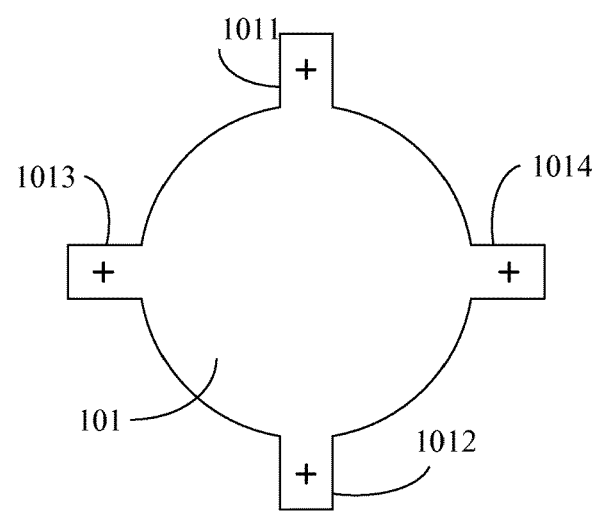
FIG. 8 is an embodiment showing a conventional circular electrode plate having electric energy transferring terminals.

FIG. 8 is an embodiment showing a conventional circular electrode plate having electric energy transferring terminals.

As shown in FIG. 8, the main configuration is that the periphery of the circular electrode plate is radially formed with electric conductive terminals for inputting/outputting electric energy (1011), (1012), (1013), (1014).

Other various geometric shapes have substantially the same feature, therefore no further illustration is provided. The present invention provides an electricity charging/discharging device with insulation package enclose member having electrode plate pair with multiple-sided electric conductive terminals, wherein both the electrode plate pair with multiple-sided electric conductive terminals and the section of the electric conductive terminal adjacent to the connected electrode plate extending from at least two sides thereof to the external for inputting/outputting electric energy are sealed covered by a packing material with insulation property to form a full-closed type electricity charging/discharging device with insulation package enclose member such as Lithium-ion Batteries, for instance Lithium Iron Phosphate (LFP) Battery, Lithium Nickel Manganese Cobalt Oxide (NMC) Battery, and Lithium Polymer Battery, or a super-capacity, so the electrode plate pair is able to output or input electric energy to the exterior through an electric conductive interface formed by at least two-sided electric conductive terminal, or further to be connected in series, or in parallel, or in series then in parallel, or in parallel then in series for forming as an electricity charging/discharging device module of two or more than two electricity charging/discharging devices with insulation package enclose member applicable for various requirements; said electricity charging/discharging device with insulation package enclose member can be used directly or can be further selectively covered with a housing for protection at the external of the electrode plate pair with multiple-sided electric conductive terminals of the insulation package enclose member.

Various applicable structures of the present application are described as following:

I. The present invention further utilizes a single-layer insulation package enclose member to cover the electrode plate pair with multiple-sided electric conductive terminals for structuring a structural embodiment of an electricity charging/discharging device, thereby allowing the electrode plate pair with multiple-sided electric conductive terminals to be structured as an input/output electric conductive interface through input/output electric conductive terminals having positive and negative polarities for the purpose of transferring electric energy to the exterior; because the shapes and types of electrode plates can be varied according to actual needs, a quadrilateral electrode plate is adopted herein for illustration, as followings:

FIG. 9 is a schematic structural view showing the input/output electric conductive terminals having positive and negative polarities at one side of the electrode plate pair and a quadrilateral sheet-like lateral positive electric conductive member (109) and a lateral negative electric conductive member (110) at two lateral sides being structured as a multiple input/output electric conductive interface according to one embodiment of the present invention.

FIG. 10 is a lateral cross sectional view of FIG. 9 taken along A-A.

FIG. 11 is a lateral cross sectional view of FIG. 9 taken along B-B.

As shown in FIG. 9, FIG. 10 and FIG. 11, mainly consists:
positive electrode plate (101): composed of one or more than one of sheet-like or film-like quadrilateral positive electrode plates, opposite sides of the positive electrode plate are respectively formed with at least an electric conductive terminal for inputting/outputting electric energy, and the surface of the positive electrode plate is provided with an electrochemical material;
negative electrode plate (102): composed of one or more than one of sheet-like or film-like quadrilateral negative electrode plates, opposite sides of the negative electrode plate are respectively formed with at least an electric conductive terminal for inputting/outputting electric energy, and the surface of the negative electrode plate is provided with an electrochemical material;
separator (104): formed by a thin film having microporous or porous property and mainly made of PP or PE, disposed between the positive and the negative electrode plates, and the main function thereof is to isolate the positive and the negative electrode plates for preventing the self-discharge of the cell and the short circuit between the two polarities, and installed between electrode plates having different polarities and installed at a lateral side of the electrode plate according to actual needs;

Opposite sides of the quadrilateral electrode plate are respectively and outwardly extended with one or more input/output terminals for transferring electric energy, and the separator is disposed between one or more of the positive electrode plates and one or more of the negative electrode plates having the same or different quantity, and the electrode plates having different polarities are staggeringly stacked for forming as an electrode plate pair; and when a plurality of the electrode plates having the same polarity are provided, the input/output terminals having the same polarity for transferring electric energy and formed at the same side of each of the electrode plates having the same polarity are conductive electrically connected in parallel.

insulation package enclosed member (105): made of a soft or rigid package material having insulation property such as an aluminum laminated film, the periphery of the insulation package enclosed member (105) is formed in a sealed hollow sleeve status, and openings formed at two sides allow the positive electrode plate (101) and the negative electrode plate (102) having the separator (104) clamped in between to be disposed, one opening of the insulation package enclosed member (105) allows the electric conductive terminal for inputting/outputting electric energy (1011) and the electric conductive terminal for inputting/outputting electric energy (1021) to be exposed, and the insulation package enclosed member (105) is processed for forming a sealing zone (1051) so as to seal the portions of the electric conductive terminal for inputting/outputting electric energy (1011) and the electric conductive terminal for inputting/outputting electric energy (1021) defined close to the electrode plate, and the distal ends of the electric conductive terminal for inputting/outputting electric energy (1011) and the electric conductive terminal for inputting/outputting electric energy (1021) are exposed at the same side, an electrolyte solution or an electrolyte material is filled in the insulation package enclosed member (105), the other opening allows the electric conductive terminal for inputting/outputting electric energy (1012) and the electric conductive terminal for inputting/outputting electric energy (1022) to be exposed, and the insulation package enclose member (105) is processed for forming a sealing zone (1052) so as to seal the portions of the electric conductive terminal for inputting/outputting electric energy (1012) and the electric conductive terminal for inputting/outputting electric energy (1022) defined close to the electrode plate, and the distal ends of the electric conductive terminal for inputting/outputting electric energy (1012) and the electric conductive terminal for inputting/outputting electric energy (1022) are exposed and inwardly bent along the exterior of the sealing zone (1052) of the insulation package enclosed member (105) thereby being respectively connected with the lateral positive electric conductive member (109) and the lateral negative electric conductive member (110), wherein the electric conductive terminal for inputting/outputting electric energy (1012) is conductive electrically connected to one end of the lateral positive electric conductive member (109), and the other end of the lateral positive electric conductive member (109) is conductive electrically connected to the electric conductive terminal for inputting/outputting electric energy (1011) thereby forming a parallel connection with positive polarity; the electric conductive terminal for inputting/outputting electric energy (1022) is electrically connected to one end of the lateral negative electric conductive member (110), and the other end of the lateral negative electric conductive member (110) is conductive electrically connected to the electric conductive terminal for inputting/outputting electric energy (1021) thereby forming a parallel conductive electrical connection with negative polarity, so an electricity charging/discharging cell is structured;

lateral positive electric conductive member (109): made of an electric conductive material and disposed at one side of the insulation package enclosed member (105);

lateral negative electric conductive member (110): made of an electric conductive material and disposed at another side of the insulation package enclosed member (105);

The above-mentioned lateral positive electric conductive member (109) and the lateral negative electric conductive member (110) include being composed of an electric conductive member formed in a quadrilateral sheet-like, or strip-like or circular sheet-like status, and the top and the bottom ends thereof are respectively extended with an electric conductive strip, the electric conductive strip respectively extended from the top and the bottom ends of the lateral positive electric conductive member (109) are then respectively and conductive electrically connected to the electric conductive terminal for inputting/outputting electric energy (1011) and the electric conductive terminal for inputting/outputting electric energy (1012) having positive polarity, and the electric conductive strip respectively extended from the top and the bottom ends of the lateral negative electric conductive member (110) are then respectively and conductive electrically connected to the electric conductive terminal for inputting/outputting electric energy (1021) and the electric conductive terminal for inputting/outputting electric energy (1022) having negative polarity.

FIG. 12 is a schematic structural view showing the input/output electric conductive terminals having positive and negative polarities at one side of the electrode plate pair and the strip-like lateral positive electric conductive member (109) and the lateral negative electric conductive member (110) at two lateral sides are structured as the multiple input/output electric conductive interface according to one embodiment of the present invention.

The lateral cross sectional view of FIG. 12 taken along A-A is the same as FIG. 10.

The lateral cross sectional view of FIG. 12 taken along B-B is the same as FIG. 11.

As shown in FIG. 12, FIG. 10 and FIG. 11, the input/output electric conductive terminals having positive and negative polarities at one side of the electrode plate pair and the strip-like lateral positive electric conductive member (109) and the lateral negative electric conductive member (110) at two lateral sides are structured as the multiple input/output electric conductive interface.

FIG. 13 is a schematic structural view showing the input/output electric conductive terminals having positive and negative polarities at one side of the electrode plate pair and the circular sheet-like lateral positive electric conductive member (109) and the lateral negative electric conductive member (110) at two lateral sides are structured as the multiple input/output electric conductive interface according to one embodiment of the present invention.

The lateral cross sectional view of FIG. 13 taken along A-A is the same as FIG. 10.

The lateral cross sectional view of FIG. 13 taken along B-B is the same as FIG. 11.

As shown in FIG. 13, FIG. 10 and FIG. 11, the input/output electric conductive terminals having positive and negative polarities at one side of the electrode plate pair and the circular sheet-like lateral positive electric conductive member (109) and the lateral negative electric conductive member (110) at two lateral sides are structured as the multiple input/output electric conductive interface according to one embodiment of the present invention.

Figure 14:
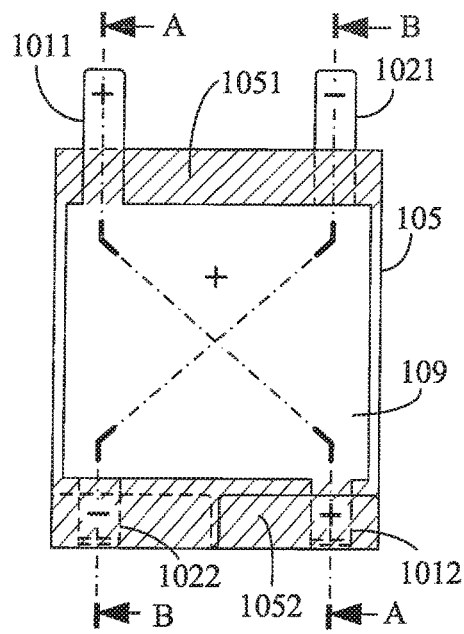
FIG. 14 is a schematic structural view showing the positive electrode plate (101) and the lateral positive electric conductive member (109), and the negative electrode plate (102) and the lateral negative electric conductive member (110) being integrally formed, and the input/output electric conductive terminals having positive and negative polarities at one side of the electrode plate pair and the quadrilateral sheet-like lateral positive electric conductive member (109) and the lateral negative electric conductive member (110) at two lateral sides being structured as the multiple input/output electric conductive interface according to one embodiment of the present invention.

FIG. 14 is a schematic structural view showing the positive electrode plate (101) and the lateral positive electric conductive member (109), and the negative electrode plate (102) and the lateral negative electric conductive member (110) being integrally formed, and the input/output electric conductive terminals having positive and negative polarities at one side of the electrode plate pair and the quadrilateral sheet-like lateral positive electric conductive member (109) and the lateral negative electric conductive member (110) at two lateral sides being structured as the multiple input/output electric conductive interface according to one embodiment of the present invention.

Figures 15, 16:
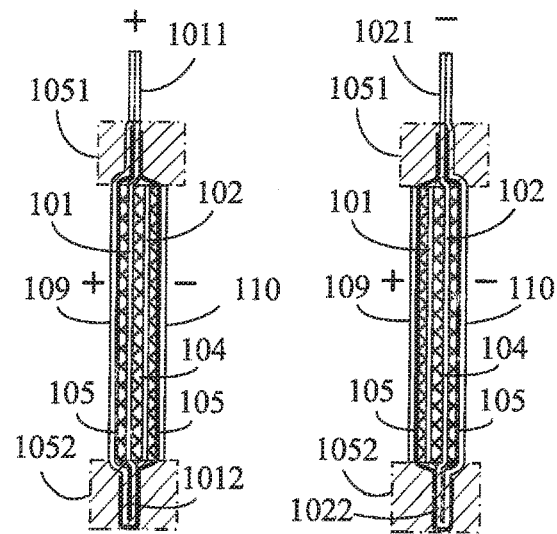
FIG. 15 is a lateral cross sectional view of FIG. 14 taken along A-A.
FIG. 16 is a lateral cross sectional view of FIG. 14 taken along B-B.

FIG. 15 is a lateral cross sectional view of FIG. 14 taken along A-A.

FIG. 16 is a lateral cross sectional view of FIG. 14 taken along B-B.

As shown in FIG. 14, FIG. 15 and FIG. 16, the positive electrode plate (101) and the lateral positive electric conductive member (109), and the negative electrode plate (102) and the lateral negative electric conductive member (110) are integrally formed, and the input/output electric conductive terminals having positive and negative polarities at one side of the electrode plate pair and the quadrilateral sheet-like lateral positive electric conductive member (109) and the lateral negative electric conductive member (110) at two lateral sides are structured as the multiple input/output electric conductive interface.

Figure 17:
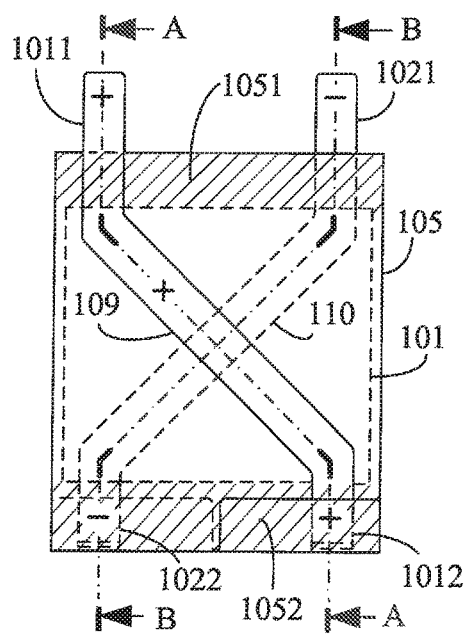
FIG. 17 is a schematic structural view showing the positive electrode plate (101) and the lateral positive electric conductive member (109), and the negative electrode plate (102) and the lateral negative electric conductive member (110) being integrally formed, and the input/output electric conductive terminals having positive and negative polarities at one side of the electrode plate pair and the strip-like lateral positive electric conductive member (109) and the lateral negative electric conductive member (110) at two lateral sides being structured as the multiple input/output electric conductive interface according to one embodiment of the present invention.

FIG. 17 is a schematic structural view showing the positive electrode plate (101) and the lateral positive electric conductive member (109), and the negative electrode plate (102) and the lateral negative electric conductive member (110) being integrally formed, and the input/output electric conductive terminals having positive and negative polarities at one side of the electrode plate pair and the strip-like lateral positive electric conductive member (109) and the lateral negative electric conductive member (110) at two lateral sides being structured as the multiple input/output electric conductive interface according to one embodiment of the present invention.

The lateral cross sectional view of FIG. 17 taken along A-A is the same as FIG. 15.

The lateral cross sectional view of FIG. 17 taken along B-B is the same as FIG. 16.

As shown in FIG. 17, FIG. 15 and FIG. 16, the positive electrode plate (101) and the lateral positive electric conductive member (109), and the negative electrode plate (102) and the lateral negative electric conductive member (110) are integrally formed, and the input/output electric conductive terminals having positive and negative polarities at one side of the electrode plate pair and the strip-like lateral positive electric conductive member (109) and the lateral negative electric conductive member (110) at two lateral sides are structured as the multiple input/output electric conductive interface.

Figure 18:
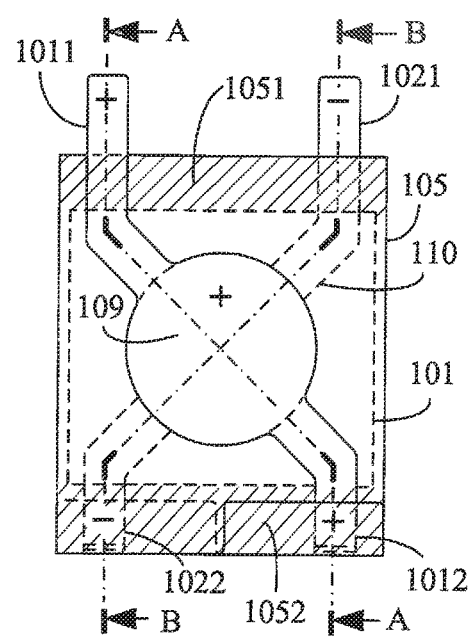
FIG. 18 is a schematic structural view showing the positive electrode plate (101) and the lateral positive electric conductive member (109), and the negative electrode plate (102) and the lateral negative electric conductive member (110) being integrally formed, and the input/output electric conductive terminals having positive and negative polarities at one side of the electrode plate pair and the circular sheet-like lateral positive electric conductive member (109) and the lateral negative electric conductive member (110) at two lateral sides being structured as the multiple input/output electric conductive interface according to one embodiment of the present invention.

FIG. 18 is a schematic structural view showing the positive electrode plate (101) and the lateral positive electric conductive member (109), and the negative electrode plate (102) and the lateral negative electric conductive member (110) being integrally formed, and the input/output electric conductive terminals having positive and negative polarities at one side of the electrode plate pair and the circular sheet-like lateral positive electric conductive member (109) and the lateral negative electric conductive member (110) at two lateral sides being structured as the multiple input/output electric conductive interface according to one embodiment of the present invention.

The lateral cross sectional view of FIG. 18 taken along A-A is the same as FIG. 15.

The lateral cross sectional view of FIG. 18 taken along B-B is the same as FIG. 16.

As shown in FIG. 18, FIG. 15 and FIG. 16, the positive electrode plate (101) and the lateral positive electric conductive member (109), and the negative electrode plate (102) and the lateral negative electric conductive member (110) are integrally formed, and the input/output electric conductive terminals having positive and negative polarities at one side of the electrode plate pair and the circular sheet-like lateral positive electric conductive member (109) and the lateral negative electric conductive member (110) at two lateral sides are structured as the multiple input/output electric conductive interface.

FIG. 19 is a schematic structural view showing the positive electrode plate (101) and the lateral positive electric conductive member (109), and the negative electrode plate (102) and the lateral negative electric conductive member (110) being integrally formed, and the input/output electric conductive terminals having at least one positive polarity input/output electric conductive terminal and at least one negative polarity input/output electric conductive terminal at two sides of the electrode plate pair and the quadrilateral sheet-like lateral positive electric conductive member (109) and the lateral negative electric conductive member (110) at two lateral sides being structured as the multiple input/output electric conductive interface according to one embodiment of the present invention.

FIG. 20 is a lateral cross sectional view of FIG. 19 taken along A-A.

FIG. 21 is a lateral cross sectional view of FIG. 19 taken along B-B.

As shown in FIG. 19, FIG. 20 and FIG. 21, the positive electrode plate (101) and the lateral positive electric conductive member (109), and the negative electrode plate (102) and the lateral negative electric conductive member (110) are integrally formed, and the input/output electric conductive terminals having at least one positive polarity input/output electric conductive terminal and at least one negative polarity input/output electric conductive at two sides of the electrode plate pair and the quadrilateral sheet-like lateral positive electric conductive member (109) and the lateral negative electric conductive member (110) at two lateral sides are structured as the multiple input/output electric conductive interface.

FIG. 22 is a schematic structural view showing the positive electrode plate (101) and the lateral positive electric conductive member (109), and the negative electrode plate (102) and the lateral negative electric conductive member (110) being integrally formed, and the input/output electric conductive terminals having at least one positive polarity input/output electric conductive terminal and at least one negative polarity input/output electric conductive terminal at two sides of the electrode plate pair and the strip-like lateral positive electric conductive member (109) and the lateral negative electric conductive member (110) at two lateral sides being structured as the multiple input/output electric conductive interface according to one embodiment of the present invention.

The lateral cross sectional view of FIG. 22 taken along A-A is the same as FIG. 20.

The lateral cross sectional view of FIG. 22 taken along B-B is the same as FIG. 21.

As shown in FIG. 22, FIG. 20 and FIG. 21, the positive electrode plate (101) and the lateral positive electric conductive member (109), and the negative electrode plate (102) and the lateral negative electric conductive member (110) are integrally formed, and the input/output electric conductive terminals having at least one positive polarity input/output electric conductive terminal and at least one negative polarity input/output electric conductive terminal at two sides of the electrode plate pair and the strip-like lateral positive electric conductive member (109) and the lateral negative electric conductive member (110) at two lateral sides are structured as the multiple input/output electric conductive interface.

FIG. 23 is a schematic structural view showing the positive electrode plate (101) and the lateral positive electric conductive member (109), and the negative electrode plate (102) and the lateral negative electric conductive member (110) being integrally formed, and the input/output electric conductive terminals having at least one positive polarity input/output electric conductive terminal and at least one negative polarity input/output electric conductive terminal at two sides of the electrode plate pair and the circular sheet-like lateral positive electric conductive member (109) and the lateral negative electric conductive member (110) at two lateral sides being structured as the multiple input/output electric conductive interface according to one embodiment of the present invention.

The lateral cross sectional view of FIG. 23 taken along A-A is the same as FIG. 20.

The lateral cross sectional view of FIG. 23 taken along B-B is the same as FIG. 21.

As shown in FIG. 23, FIG. 20 and FIG. 21, the positive electrode plate (101) and the lateral positive electric conductive member (109), and the negative electrode plate (102) and the lateral negative electric conductive member (110) are integrally formed, and the input/output electric conductive terminals having at least one positive polarity input/output electric conductive terminal and at least one negative polarity input/output electric conductive terminal at two sides of the electrode plate pair and the circular sheet-like lateral positive electric conductive member (109) and the lateral negative electric conductive member (110) at two lateral sides are structured as the multiple input/output electric conductive interface.

Figure 24:
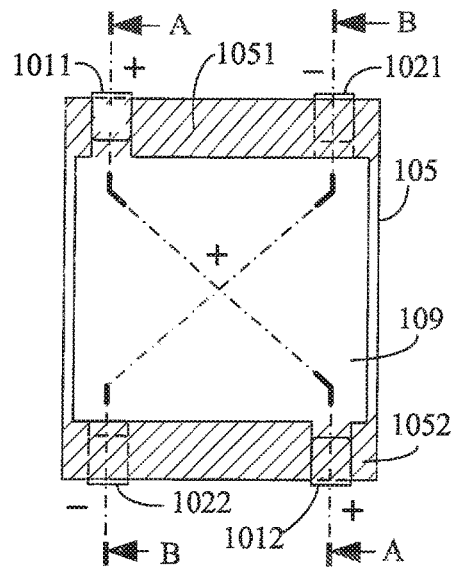
FIG. 24 is a schematic structural view showing the input/output electric conductive terminals having positive and negative polarities and respectively formed by a folded structure at two sides of the electrode plate pair and the quadrilateral sheet-like lateral positive electric conductive member (109) and the lateral negative electric conductive member (110) at two lateral sides being structured as the multiple input/output electric conductive interface according to one embodiment of the present invention.

FIG. 24 is a schematic structural view showing the input/output electric conductive terminals having positive and negative polarities and respectively formed by a folded structure at two sides of the electrode plate pair and the quadrilateral sheet-like lateral positive electric conductive member (109) and the lateral negative electric conductive member (110) at two lateral sides being structured as the multiple input/output electric conductive interface according to one embodiment of the present invention.

Figures 25, 26:
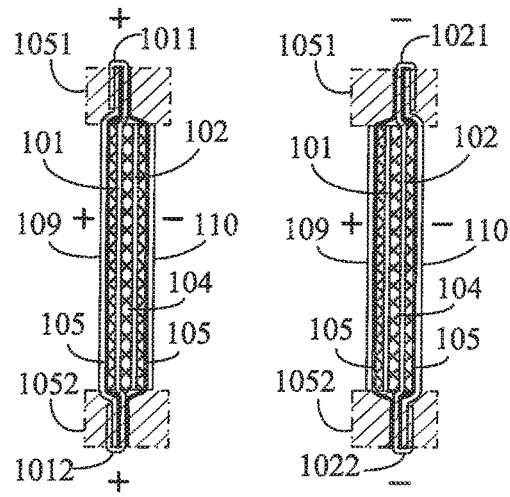
FIG. 25 is a lateral cross sectional view of FIG. 24 taken along A-A.
FIG. 26 is a lateral cross sectional view of FIG. 24 taken along B-B.

FIG. 25 is a lateral cross sectional view of FIG. 24 taken along A-A.

FIG. 26 is a lateral cross sectional view of FIG. 24 taken along B-B.

As shown in FIG. 24, FIG. 25 and FIG. 26, the input/output electric conductive terminals having positive and negative polarities and respectively formed by a folded structure at two sides of the electrode plate pair and the quadrilateral sheet-like lateral positive electric conductive member (109) and the lateral negative electric conductive member (110) at two lateral sides are structured as the multiple input/output electric conductive interface.

Figure 27:
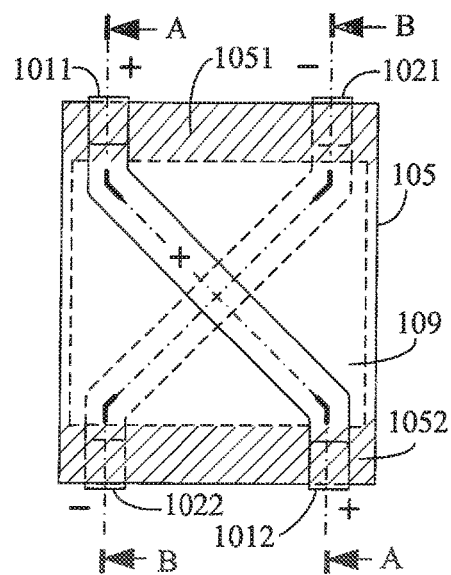
FIG. 27 is a schematic structural view showing the input/output electric conductive terminals having positive and negative polarities respectively formed by a folded structure at two sides of the electrode plate pair and the strip-like lateral positive electric conductive member (109) and the lateral negative electric conductive member (110) at two lateral sides being structured as the multiple input/output electric conductive interface according to one embodiment of the present invention.

FIG. 27 is a schematic structural view showing the input/output electric conductive terminals having positive and negative polarities respectively formed by a folded structure at two sides of the electrode plate pair and the strip-like lateral positive electric conductive member (109) and the lateral negative electric conductive member (110) at two lateral sides being structured as the multiple input/output electric conductive interface according to one embodiment of the present invention.

The lateral cross sectional view of FIG. 27 taken along A-A is the same as FIG. 25.

The lateral cross sectional view of FIG. 27 taken along B-B is the same as FIG. 26.

As shown in FIG. 27, FIG. 25 and FIG. 26, the input/output electric conductive terminals having positive and negative polarities respectively formed by a folded structure at two sides of the electrode plate pair and the strip-like lateral positive electric conductive member (109) and the lateral negative electric conductive member (110) at two lateral sides are structured as the multiple input/output electric conductive interface.

Figure 28:
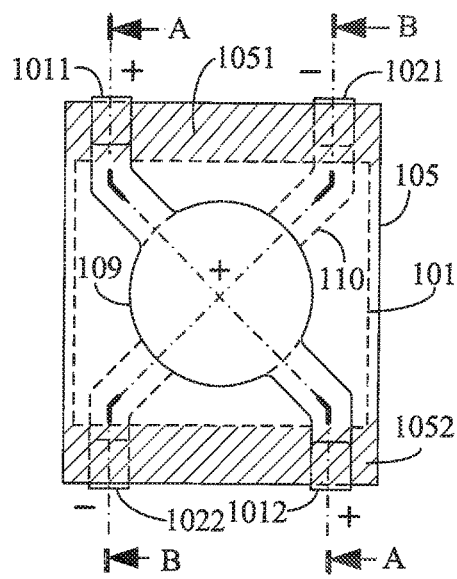
FIG. 28 is a schematic structural view showing the input/output electric conductive terminals having positive and negative polarities respectively formed by a folded structure at two sides of the electrode plate pair and the circular sheet-like lateral positive electric conductive member (109) and the lateral negative electric conductive member (110) at two lateral sides being structured as the multiple input/output electric conductive interface according to one embodiment of the present invention.

FIG. 28 is a schematic structural view showing the input/output electric conductive terminals having positive and negative polarities respectively formed by a folded structure at two sides of the electrode plate pair and the circular sheet-like lateral positive electric conductive member (109) and the lateral negative electric conductive member (110) at two lateral sides being structured as the multiple input/output electric conductive interface according to one embodiment of the present invention.

The lateral cross sectional view of FIG. 28 taken along A-A is the same as FIG. 25.

The lateral cross sectional view of FIG. 28 taken along B-B is the same as FIG. 26.

As shown in FIG. 28, FIG. 25 and FIG. 26, the input/output electric conductive terminals having positive and negative polarities respectively formed by a folded structure at two sides of the electrode plate pair and the circular sheet-like lateral positive electric conductive member (109) and the lateral negative electric conductive member (110) at two lateral sides are structured as the multiple input/output electric conductive interface.

FIG. 29 is a schematic structural view showing an input/output electric conductive terminal having different polarity and respectively provided at two ends defined at the same side of the electrode plate pair and the quadrilateral sheet-like lateral positive electric conductive member (109) and the lateral negative electric conductive member (110) at two lateral sides of the electrode plate pair being structured as the multiple input/output electric conductive interface according to one embodiment of the present invention.

FIG. 30 is a lateral cross sectional view of FIG. 29 taken along A-A.

FIG. 31 is a lateral cross sectional view of FIG. 29 taken along B-B.

As shown in FIG. 29, FIG. 30 and FIG. 31, an input/output electric conductive terminal having different polarity and respectively provided at two ends defined at the same side of the electrode plate pair and the quadrilateral sheet-like lateral positive electric conductive member (109) and the lateral negative electric conductive member (110) at two lateral sides of the electrode plate pair are structured as the multiple input/output electric conductive interface.

FIG. 32 is a schematic structural view showing an input/output electric conductive terminal having different polarity and respectively provided at two ends defined at the same side of the electrode plate pair and the strip-like lateral positive electric conductive member (109) and the lateral negative electric conductive member (110) at two lateral sides of the electrode plate pair being structured as the multiple input/output electric conductive interface according to one embodiment of the present invention.

The lateral cross sectional view of FIG. 32 taken along A-A is the same as FIG. 30.

The lateral cross sectional view of FIG. 32 taken along B-B is the same as FIG. 31.

As shown in FIG. 32, FIG. 30 and FIG. 31, an input/output electric conductive terminal having different polarity and respectively provided at two ends defined at the same side of the electrode plate pair and the strip-like lateral positive electric conductive member (109) and the lateral negative electric conductive member (110) at two lateral sides of the electrode plate pair are structured as the multiple input/output electric conductive interface.

FIG. 33 is a schematic structural view showing an input/output electric conductive terminal having different polarity and respectively provided at two ends defined at the same side of the electrode plate pair and the circular sheet-like lateral positive electric conductive member (109) and the lateral negative electric conductive member (110) at two lateral sides of the electrode plate pair being structured as the multiple input/output electric conductive interface according to one embodiment of the present invention.

The lateral cross sectional view of FIG. 33 taken along A-A is the same as FIG. 30.

The lateral cross sectional view of FIG. 33 taken along B-B is the same as FIG. 31.

As shown in FIG. 33, FIG. 20 and FIG. 31, an input/output electric conductive terminal having different polarity and respectively provided at two ends defined at the same side of the electrode plate pair and the circular sheet-like lateral positive electric conductive member (109) and the lateral negative electric conductive member (110) at two lateral sides of the electrode plate pair are structured as the multiple input/output electric conductive interface.

According to the above-mentioned embodiments, the lateral positive electric conductive member (109) and the lateral negative electric conductive member (110) at two sides of the electricity charging/discharging device with insulation package enclose member having electrode plate pair with multiple-sided electric conductive terminals can be further served as an input/output electric conductive interface for being individually used, or connected in series, in parallel or in series and parallel, the configuration includes:

exposed electric conductive surfaces of one lateral positive electric conductive member (109) and one opposite lateral negative electric conductive member (110) are directly formed as the input/output electric conductive interface for being individually used, or connected in series, in parallel or in series and parallel; or the exposed surface of the lateral positive electric conductive member (109) is provided with a lateral positive auxiliary electric conductive member (1091), and the exposed surface of the lateral negative electric conductive member (110) is provided with a lateral negative auxiliary electric conductive member (1101) for structuring the input/output electric conductive interface for being individually used, or connected in series, in parallel or in series and parallel; or one or more locations defined at the mid portion of the lateral positive electric conductive member (109) are formed with an outwardly-protruded structure and one or more locations defined at the mid portion of the lateral negative electric conductive member (110) are formed with an outwardly-protruded structure, thereby structuring the input/output electric conductive interface for being individually used, or connected in series, in parallel or in series and parallel.

After the plural electricity charging/discharging cells are structured, the electricity charging/discharging cells can be individually operated and combined through electric conductive members, at least one or more of the electricity charging/discharging cells are disposed in the interior of one or more of the housings so as to be collected for forming as a modularized structure which is connected through the electric conductive members or the input/output electric conductive interface of each electricity charging/discharging device for transferring electric energy.

Figure 34:
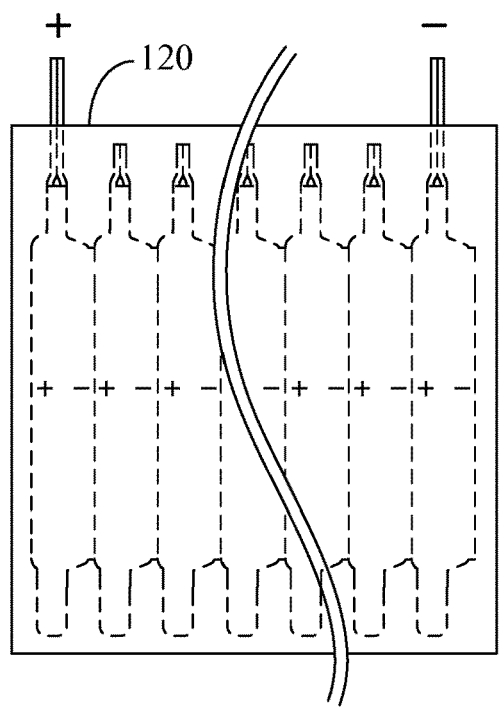
FIG. 34 is a schematic structural view showing the electricity charging/discharging cells being disposed inside the housing (120) for forming as a module according to the present invention.

FIG. 34 is a schematic structural view showing the electricity charging/discharging cells being disposed inside the housing (120) for forming as a module according to the present invention.

Figure 35:
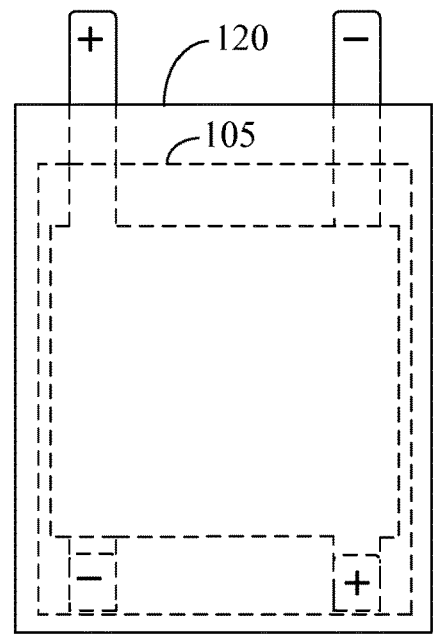
FIG. 35 is a lateral structural view of FIG. 34.

FIG. 35 is a lateral structural view of FIG. 34.

As shown in FIG. 34 and FIG. 35, at least one or more of the electricity charging/discharging cells are disposed inside the housing (120), wherein:

housing (120): made of a soft flexible material or a rigid material such as stainless steel.

According to the present invention, the electricity charging/discharging device with insulation package enclose member having electrode plate pair with multiple-sided electric conductive terminals can be further formed as a rolling structure, illustrated as followings:

FIG. 36 is a structural develop view showing the multiple input/output electric conductive interface being formed as a rolling structure according to one embodiment of the present invention.

FIG. 37 is a lateral cross sectional view of FIG. 36 taken along A-A.

FIG. 38 is a lateral cross sectional view of FIG. 36 taken along B-B.

As shown in FIG. 36, FIG. 37 and FIG. 38, the positive electrode plate (101) and the negative electrode plate (102) of the input/output electric conductive terminal extended towards two sides and the separator (104) are formed as a rolling structure, and the distal terminals and/or the lateral positive electric conductive member (109) and the lateral negative electric conductive member (110) at two lateral sides being structured as the multiple input/output electric conductive interface.

Figure 39:
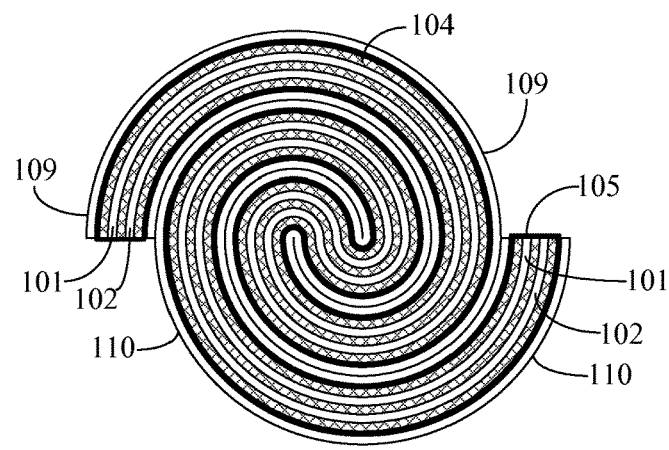
FIG. 39 is the first cross sectional view showing the rolling structure shown in FIG. 36 taken along C-C according to the present invention.

FIG. 39 is the first cross sectional view showing the rolling structure shown in FIG. 36 taken along C-C according to the present invention.

As shown in FIG. 39, at least the lateral positive electric conductive member (109) and the lateral negative electric conductive member (110) at two lateral sides and at least an input/output electric conductive terminal at one distal end defined at one side are individually-arranged for structuring as the multiple input/output electric conductive interface.

Figure 40:
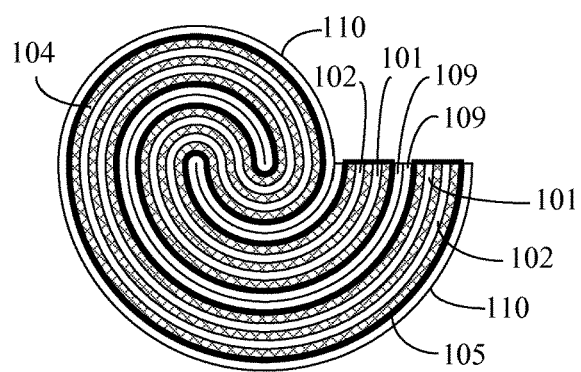
FIG. 40 is the second cross sectional view showing the rolling structure shown in FIG. 36 taken along C-C according to the present invention.

FIG. 40 is the second cross sectional view showing the rolling structure shown in FIG. 36 taken along C-C according to the present invention.

As shown in FIG. 40, the single-layer insulation package enclosed member (105) is served for insulation package at two lateral sides and the input/output electric conductive terminals at two sides are adjacently-arranged for structuring as the multiple input/output electric conductive interface.

Figure 41:
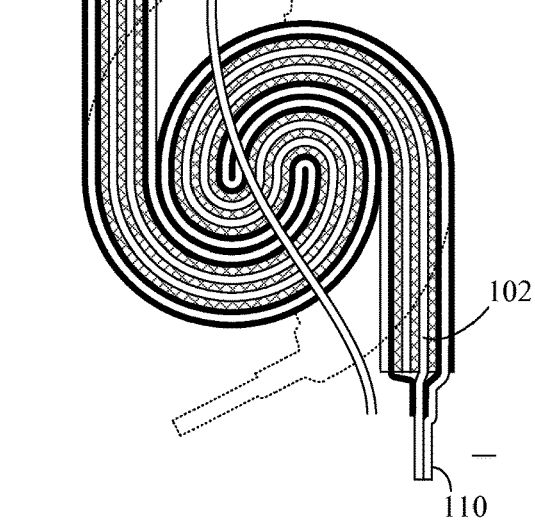
FIG. 41 is the third cross sectional view showing the rolling structure shown in FIG. 36 taken along C-C according to the present invention.

FIG. 41 is the third cross sectional view showing the rolling structure shown in FIG. 36 taken along C-C according to the present invention.

As shown in FIG. 41, the lateral positive electric conductive member (109) and the lateral negative electric conductive member (110) arranged at two lateral sides and the input/output electric conductive terminals at two sides are structures as the multiple input/output electric conductive interface.

II. The present invention further discloses a structural embodiment which folds and then parallel connects the electric conductive terminals at different sides of the electrode plate pair with multiple-sided electric conductive terminals, so the electrode plate pair with multiple-sided electric conductive terminals after being covered and packaged is able to be structured as an input/output electric conductive interface through single input/output electric conductive terminal having a single positive polarity and a single negative polarity for transferring electric energy to the exterior; because the shapes and types of electrode plates can be varied according to actual needs, a quadrilateral electrode plate is adopted herein for illustration, as followings:

FIG. 42 is a schematic structural view showing one side of the electrode plate pair having a quadrilateral sheet-like lateral positive electric conductive member (109) and a lateral negative electric conductive member (110) being provided with the input/output electric conductive terminal having positive and negative polarity for being structured as a single-sided input/output electric conductive interface according to one embodiment of the present invention.

FIG. 43 is a lateral cross sectional view of FIG. 42 taken along A-A.

FIG. 44 is a lateral cross sectional view of FIG. 42 taken along B-B.

As shown in FIG. 42, FIG. 43 and FIG. 44, mainly consists:

positive electrode plate (101): composed of one or more than one of sheet-like or film-like quadrilateral positive electrode plates, opposite sides of the positive electrode plate are respectively formed with at least an electric conductive terminal for inputting/outputting electric energy, and the surface of the positive electrode plate is provided with an electrochemical material;

negative electrode plate (102): composed of one or more than one of sheet-like or film-like quadrilateral negative electrode plates, opposite sides of the negative electrode plate are respectively formed with at least an electric conductive terminal for inputting/outputting electric energy, and the surface of the negative electrode plate is provided with an electrochemical material;

separator (104): formed by a thin film having microporous or porous property and mainly made of PP or PE, disposed between the positive and the negative electrode plates, and the main function thereof is to isolate the positive and the negative electrode plates for preventing the self-discharge of the cell and the short circuit between the two polarities, and installed between electrode plates having different polarities and installed at a lateral side of the electrode plate according to actual needs;

Opposite sides of the quadrilateral electrode plate are respectively and outwardly extended with one or more input/output terminals for transferring electric energy, and the separator is disposed between one or more of the positive electrode plates and one or more of the negative electrode plates having the same or different quantity, and the electrode plates having different polarities are staggeringly stacked for forming as an electrode plate pair; and when a plurality of the electrode plates having the same polarity are provided, the input/output terminals having the same polarity for transferring electric energy and formed at the same side of each of the electrode plates having the same polarity are conductive electrically connected in parallel;

insulation package enclosed member (105): made of a soft or rigid package material having insulation property such as an aluminum laminated film, the periphery of the insulation package enclosed member (105) is formed in a sealed hollow sleeve status, and openings formed at two sides allow the positive electrode plate (101) and the negative electrode plate (102) having the separator (104) clamped in between to be disposed, one opening of the insulation package enclosed member (105) allows the electric conductive terminal for inputting/outputting electric energy (1011) and the electric conductive terminal for inputting/outputting electric energy (1021) to be exposed, and the insulation package enclosed member (105) is processed for forming a sealing zone (1051) so as to seal the portions of the electric conductive terminal for inputting/outputting electric energy (1011) and the electric conductive terminal for inputting/outputting electric energy (1021) defined close to the electrode plate, and the distal ends of the electric conductive terminal for inputting/outputting electric energy (1011) and the electric conductive terminal for inputting/outputting electric energy (1021) are exposed at the same side for being structured as the single-sided input/output electric conductive interface; the interior of the insulation package enclosed member (105) allows an electrolyte solution or an electrolyte material to be filled in; the lateral positive electric conductive member (109) is disposed at one side defined at the exterior of the insulation package enclosed member (105) and electrically connected between the electric conductive terminal for inputting/outputting electric energy (1011) and the electric conductive terminal for inputting/outputting electric energy (1012), the lateral negative electric conductive member (110) is disposed at another side defined at the exterior of the insulation package enclosed member (105) and electrically connected between the electric conductive terminal for inputting/outputting electric energy (1021) and the electric conductive terminal for inputting/outputting electric energy (1022); another end of the insulation package enclosed member (105) is formed with two folding covering and packaging segments (1050) for allowing the electric conductive terminal for inputting/outputting electric energy (1012), the electric conductive terminal for inputting/outputting electric energy (1022) at the other end and the insulation package enclosed member (105) to be processed for forming a sealing zone (1052) so as to seal the electric conductive terminal for inputting/outputting electric energy (1012) and the electric conductive terminal for inputting/outputting electric energy (1022), then the two folding covering and packaging segments (1050) are respectively and upwardly folded along two sides defined at the exterior of the sealing zone (1052) of the insulation package enclosed member (105) for respectively sealing and covering the lateral positive electric conductive member (109) and the lateral negative electric conductive member (110) and further upwardly extended for being sealed in the sealing zone (1051) with the portions of the electric conductive terminal for inputting/outputting electric energy (1011) and the electric conductive terminal for inputting/outputting electric energy (1021) defined close to the electrode plate, wherein the electric conductive terminal for inputting/ outputting electric energy (1012) is electrically connected to one end of the lateral positive electric conductive member (109), and then through the other end of the lateral positive electric conductive member (109) electrically connected to the electric conductive terminal for inputting/outputting electric energy (1011) thereby electrical conductively forming a parallel connection with positive polarity; the electric conductive terminal for inputting/outputting electric energy (1022) is electrically connected to one end of the lateral negative electric conductive member (110), and then through the other end of the lateral negative electric conductive member (110) electrically connected to the electric conductive terminal for inputting/outputting electric energy (1021) thereby electrical conductively forming a parallel connection with negative polarity, so the electricity charging/discharging device with insulation package enclose member having electrode plate pair with multiple-sided electric conductive terminals is structured, and the exposed distal portions of the electric conductive terminal for inputting/outputting electric energy (1011) and the electric conductive terminal for inputting/outputting electric energy (1021) are structured as the single-sided input/output electric conductive interface;

lateral positive electric conductive member (109): made of an electric conductive material and disposed at one side of the insulation package enclosed member (105);

lateral negative electric conductive member (110): made of an electric conductive material and disposed at another side of the insulation package enclosed member (105);

The above-mentioned lateral positive electric conductive member (109) and the lateral negative electric conductive member (110) include being composed of an electric conductive member formed in a quadrilateral sheet-like, or strip-like or circular sheet-like status, and the top and the bottom ends thereof are respectively extended with an electric conductive strip, the electric conductive strips respectively extended from the top and the bottom ends of the lateral positive electric conductive member (109) are then respectively and electrically connected in parallel with the electric conductive terminal for inputting/outputting electric energy (1011) and the electric conductive terminal for inputting/outputting electric energy (1012) having positive polarity, and the electric conductive strips respectively extended from the top and the bottom ends of the lateral negative electric conductive member (110) are then respectively and electrically connected in parallel with the electric conductive terminal for inputting/outputting electric energy (1021) and the electric conductive terminal for inputting/outputting electric energy (1022) having negative polarity, and the exposed portions of the electric conductive terminal for inputting/outputting electric energy (1011) and the electric conductive terminal for inputting/outputting electric energy (1021) are structured as the single-sided input/output electric conductive interface;

FIG. 45 is a schematic structural view showing one side of the electrode plate pair having the strip-like lateral positive electric conductive member (109) and the lateral negative electric conductive member (110) being provided with the input/output electric conductive terminals having positive and negative polarity for being structured as the single-sided input/output electric conductive interface according to one embodiment of the present invention.

The lateral cross sectional view of FIG. 45 taken along A-A is the same as FIG. 43.

The lateral cross sectional view of FIG. 45 taken along B-B is the same as FIG. 44.

As shown in FIG. 45, FIG. 43 and FIG. 44, one side of the electrode plate pair having the strip-like lateral positive electric conductive member (109) and the lateral negative electric conductive member (110) are provided with the input/output electric conductive terminals having positive and negative polarity for being structured as the single-sided input/output electric conductive interface.

FIG. 46 is a schematic structural view showing one side of the electrode plate pair having the circular sheet-like lateral positive electric conductive member (109) and the lateral negative electric conductive member (110) being provided with the input/output electric conductive terminals having positive and negative polarity for being structured as the single-sided input/output electric conductive interface according to one embodiment of the present invention.

The lateral cross sectional view of FIG. 46 taken along A-A is the same as FIG. 43.

The lateral cross sectional view of FIG. 46 taken along B-B is the same as FIG. 44.

As shown in FIG. 46, FIG. 43 and FIG. 44, one side of the electrode plate pair having the circular sheet-like lateral positive electric conductive member (109) and the lateral negative electric conductive member (110) are provided with the input/output electric conductive terminals having positive and negative polarity for being structured as the single-sided input/output electric conductive interface.

According to the above-mentioned embodiments, the lateral positive electric conductive member (109) and the lateral negative electric conductive member (110) at two sides of the electricity charging/discharging device with insulation package enclose member having electrode plate pair with multiple-sided electric conductive terminals can be further served as an input/output electric conductive interface for being individually used, or connected in series, in parallel or in series and parallel, the configuration includes:

exposed electric conductive surfaces of a lateral positive electric conductive member (109) and an opposite lateral negative electric conductive member (110) are directly formed as the input/output electric conductive interface for being individually used, or connected in series, in parallel or in series and parallel; or the exposed surface of the lateral positive electric conductive member (109) is provided with a lateral positive auxiliary electric conductive member (1091), and the exposed surface of the lateral negative electric conductive member (110) is provided with a lateral negative auxiliary electric conductive member (1101), thereby structuring the input/output electric conductive interface for being individually used, or connected in series, in parallel or in series and parallel; or one or more locations defined at the mid portion of the lateral positive electric conductive member (109) are formed with an outwardly-protruded structure and one or more locations defined at the mid portion of the lateral negative electric conductive member (110) are formed with an outwardly-protruded structure, thereby structuring the input/output electric conductive interface for being individually used, or connected in series, in parallel or in series and parallel.

Figure 47:
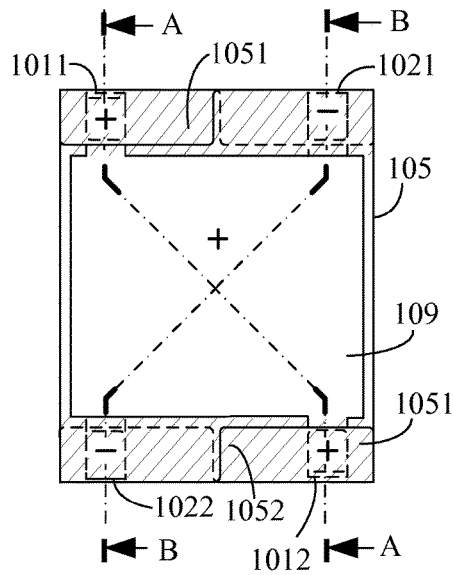
FIG. 47 is a schematic structural view showing one side of the electrode plate pair having the quadrilateral sheet-like lateral positive electric conductive member (109) and the lateral negative electric conductive member (110) being served as the input/output electric conductive terminal having positive polarity, and the other side thereof being served as the input/output electric conductive terminal having negative polarity thereby structuring the single-sided input/output electric conductive interface according to one embodiment of the present invention.

FIG. 47 is a schematic structural view showing one side of the electrode plate pair having the quadrilateral sheet-like lateral positive electric conductive member (109) and the lateral negative electric conductive member (110) being served as the input/output electric conductive terminal having positive polarity, and the other side thereof being served as the input/output electric conductive terminal having negative polarity thereby structuring the single-sided input/output electric conductive interface according to one embodiment of the present invention.

Figure 48:
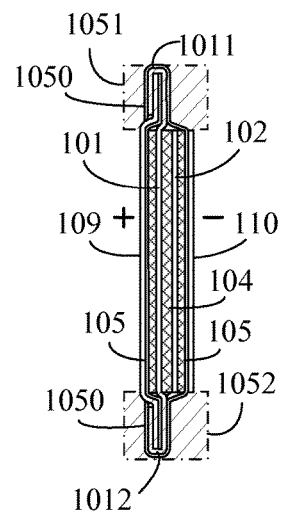
FIG. 48 is a lateral cross sectional view of FIG. 47 taken along A-A.

FIG. 48 is a lateral cross sectional view of FIG. 47 taken along A-A.

Figure 49:
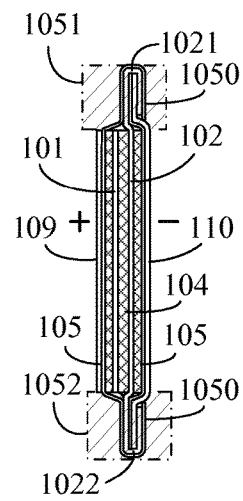
FIG. 49 is a lateral cross sectional view of FIG. 47 taken along B-B.

FIG. 49 is a lateral cross sectional view of FIG. 47 taken along B-B.

As shown in FIG. 47, FIG. 48 and FIG. 49, one side of the electrode plate pair having the quadrilateral sheet-like lateral positive electric conductive member (109) and the lateral negative electric conductive member (110) is served as the input/output electric conductive terminal having positive polarity, and the other side thereof is served as the input/output electric conductive terminal having negative polarity thereby structuring the single-sided input/output electric conductive interface; mainly consists:

positive electrode plate (101): composed of one or more than one of sheet-like or film-like quadrilateral positive electrode plates, each of the opposite sides of the positive electrode plate is respectively formed with at least an electric conductive terminal for inputting/outputting electric energy, and the surface of the positive electrode plate is provided with an electrochemical material;

negative electrode plate (102): composed of one or more than one of sheet-like or film-like quadrilateral negative electrode plates, each of the opposite sides of the negative electrode plate is respectively formed with at least an electric conductive terminal for inputting/outputting electric energy, and the surface of the negative electrode plate is provided with an electrochemical material;

separator (104): formed by a thin film having microporous or porous property and mainly made of PP or PE, disposed between the positive and the negative electrode plates, and the main function thereof is to isolate the positive and the negative electrode plates for preventing the self-discharge of the cell and the short circuit between two polarities, and installed between electrode plates having different polarities and installed at a lateral side of the electrode plate according to actual needs;

Opposite sides of the quadrilateral electrode plate are respectively and outwardly extended with one or more input/output terminals for transferring electric energy, and the separator is disposed between one or more of the positive electrode plates and one or more of the negative electrode plates having the same or different quantity, and the electrode plates having different polarities are staggeringly stacked for forming as an electrode plate pair; and when a plurality of the electrode plates having the same polarity are provided, the input/output terminals having the same polarity for transferring electric energy and formed at the same side of each of the electrode plates having the same polarity are electrically connected in parallel;

insulation package enclosed member (105): made of a soft or rigid package material having insulation property such as an aluminum laminated film, the periphery of the insulation package enclosed member (105) is formed in a sealed hollow sleeve status, and openings formed at two sides allow the positive electrode plate (101) and the negative electrode plate (102) having the separator (104) clamped in between to be disposed, one distal end of the insulation package enclosed member (105) is formed with a folding covering and packing segment (1050); through the folding covering and packaging segment (1050) upwardly protruded from the insulation package enclosed member (105) which serves as the inner insulation for the lateral negative electric conductive member (110), and the upward extending segment of the insulation package enclosed member (105) which covers the inner insulation of the lateral positive electric conductive member (109) are processed for forming the sealing zone (1051), the electric conducting connection portion of the electric conductive terminal for inputting/outputting electric energy (1011) and the upward extending segment of the lateral positive electric conductive member (109) is enabled to be sealed; and through the folding covering and packaging segment (1050) upwardly protruded from the insulation package enclosed member (105) which serves as the inner insulation for the lateral positive electric conductive member (109), and the upward extending segment of the insulation package enclosed member (105) which covers the inner insulation of the lateral negative electric conductive member (110) are processed for forming the sealing zone (1051), the electric conducting connection portion of the electric conductive terminal for inputting/outputting electric energy (1021) and the upward extending segment of the lateral negative electric conductive member (110) is enabled to be sealed; the interior of the insulation package enclosed member (105) allows an electrolyte solution or an electrolyte material to be filled in; and through the folding covering and packaging segment (1050) downwardly protruded from the insulation package enclosed member (105) which serves as the inner insulation for the lateral negative electric conductive member (110), and the downward extending segment of the insulation package enclosed member (105) which covers the inner insulation of the lateral positive electric conductive member (109) are processed for forming the sealing zone (1052), the electric conducting connection portion of the electric conductive terminal for inputting/outputting electric energy (1012) and the downward extending segment of the lateral positive electric conductive member (109) is enabled to be sealed; and through the folding covering and packaging segment (1050) downwardly protruded from the insulation package enclose member (105) which serves as the inner insulation for the lateral positive electric conductive member (109), and the downward extending segment of the insulation package enclose member (105) which covers the inner insulation of the lateral negative electric conductive member (110) are processed for forming the sealing zone (1052), the electric conducting connection portion of the electric conductive terminal for inputting/outputting electric energy (1022) and the downward extending segment of the lateral negative electric conductive member (110) is enabled to be sealed, wherein the electric conductive terminal for inputting/outputting electric energy (1012) is electrically connected to one end of the lateral positive electric conductive member (109), and then through the other end of the lateral positive electric conductive member (109) electrically connected to the electric conductive terminal for inputting/outputting electric energy (1011), thereby electrical conductively forming a parallel connection with positive polarity; the electric conductive terminal for inputting/outputting electric energy (1022) is electrically connected to one end of the lateral negative electric conductive member (110), and then through the other end of the lateral negative electric conductive member (110) electrically connected to the electric conductive terminal for inputting/outputting electric energy (1021), thereby electrical conductively forming a parallel connection with negative polarity, and the exposed electric conductive surface of the lateral positive electric conductive member (109) and the exposed electric conductive surface of the lateral negative electric conductive member (110) are structured for forming as the single-sided input/output electric conductive interface;

lateral positive electric conductive member (109): made of an electric conductive material and served as the input/output electric conductive terminal having positive polarity;

lateral negative electric conductive member (110): made of an electric conductive material and served as the input/output electric conductive terminal having negative polarity;

The above-mentioned lateral positive electric conductive member (109) and the lateral negative electric conductive member (110) include being composed of an electric conductive member formed in a quadrilateral sheet-like, or strip-like or circular sheet-like status, and the top and the bottom ends thereof are respectively extended with an electric conductive strip, and the electric conductive strips respectively extended from the top and the bottom ends of the lateral positive electric conductive member (109) are then respectively and electrically connected in parallel with the electric conductive terminal for inputting/outputting electric energy (1011) and the electric conductive terminal for inputting/outputting electric energy (1012) having positive polarity, and the electric conductive strips respectively extended from the top and the bottom ends of the lateral negative electric conductive member (110) are then respectively and electrically connected to the electric conductive terminal for inputting/outputting electric energy (1021) and the electric conductive terminal for inputting/outputting electric energy (1022) having negative polarity, and the exposed electric conductive surface of the lateral positive electric conductive member (109) and the exposed electric conductive surface of the lateral negative electric conductive member (110) are structured for forming as the single-sided input/output electric conductive interface.

Figure 50:
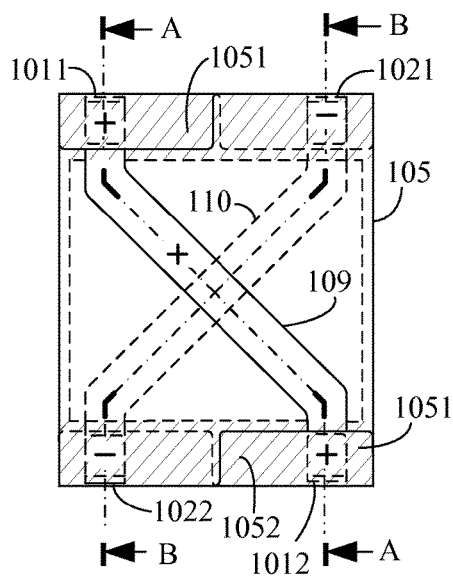
FIG. 50 is a schematic structural view showing one side of the electrode plate pair having the strip-like lateral positive electric conductive member (109) and the lateral negative electric conductive member (110) being served as the input/output electric conductive terminal having positive polarity, and the other end thereof being served as the input/output electric conductive terminal having negative polarity thereby structuring the single-sided input/output electric conductive interface according to one embodiment of the present invention.

FIG. 50 is a schematic structural view showing one side of the electrode plate pair having the strip-like lateral positive electric conductive member (109) and the lateral negative electric conductive member (110) being served as the input/output electric conductive terminal having positive polarity, and the other end thereof being served as the input/output electric conductive terminal having negative polarity thereby structuring the single-sided input/output electric conductive interface according to one embodiment of the present invention.

The lateral cross sectional view of FIG. 50 taken along A-A is the same as FIG. 48.

The lateral cross sectional view of FIG. 50 taken along B-B is the same as FIG. 49.

As shown in FIG. 50, FIG. 48 and FIG. 49, one side of the electrode plate pair having the strip-like lateral positive electric conductive member (109) and the lateral negative electric conductive member (110) is served as the input/output electric conductive terminal having positive polarity, and the other end thereof is served as the input/output electric conductive terminal having negative polarity thereby structuring the single-sided input/output electric conductive interface.

Figure 51:
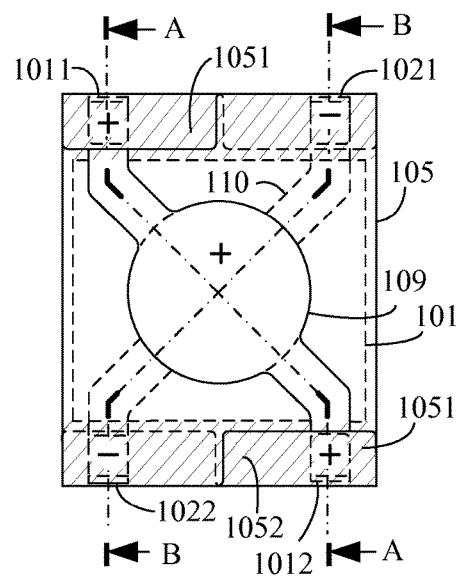
FIG. 51 is a schematic structural view showing one side of the electrode plate pair having the circular sheet-like lateral positive electric conductive member (109) and the lateral negative electric conductive member (110) being served as the input/output electric conductive terminal having positive polarity, and the other end thereof being served as the input/output electric conductive terminal having negative polarity thereby structuring the single-sided input/output electric conductive interface according to one embodiment of the present invention.

FIG. 51 is a schematic structural view showing one side of the electrode plate pair having the circular sheet-like lateral positive electric conductive member (109) and the lateral negative electric conductive member (110) being served as the input/output electric conductive terminal having positive polarity, and the other end thereof being served as the input/output electric conductive terminal having negative polarity thereby structuring the single-sided input/output electric conductive interface according to one embodiment of the present invention.

The lateral cross sectional view of FIG. 51 taken along A-A is the same as FIG. 48.

The lateral cross sectional view of FIG. 51 taken along B-B is the same as FIG. 49.

As shown in FIG. 51, FIG. 48 and FIG. 49, one side of the electrode plate pair having the circular sheet-like lateral positive electric conductive member (109) and the lateral negative electric conductive member (110) is served as the input/output electric conductive terminal having positive polarity, and the other end thereof is served as the input/output electric conductive terminal having negative polarity thereby structuring the single-sided input/output electric conductive interface according to one embodiment of the present invention.

Figure 52:
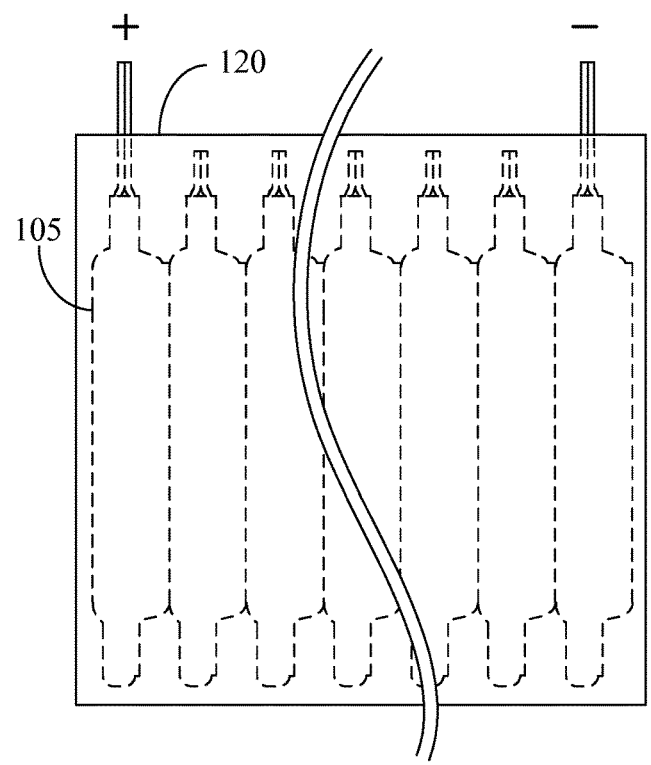
FIG. 52 is a schematic structural view showing the electricity charging/discharging cells being disposed inside the housing (120) for forming as a module according to the present invention.

After the plural electricity charging/discharging cells are structured, the electricity charging/discharging cells can be individually operated and combined through electric conductive members, at least one or more of the electricity charging/discharging cells are disposed in the interior of one or more of the housings so as to be collected for forming as a modularized structure which is connected through the electric conductive members or the input/output electric conductive interface of each electricity charging/discharging device for transferring electric energy;

FIG. 52 is a schematic structural view showing the electricity charging/discharging cells being disposed inside the housing (120) for forming as a module according to the present invention.

Figure 53:
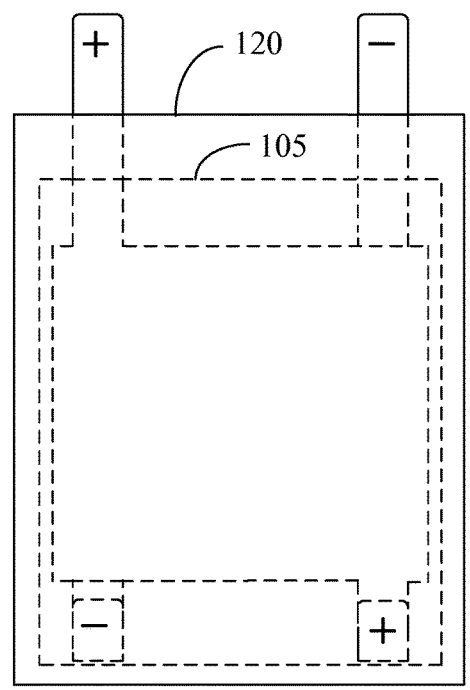
FIG. 53 is a lateral structural view of FIG. 52.

FIG. 53 is a lateral structural view of FIG. 52.

As shown in FIG. 52 and FIG. 53, at least one or more of the electricity charging/discharging cells are disposed inside the housing (120), wherein:

housing (120): made of a soft flexible material or a rigid material such as stainless steel.

Figure 54:
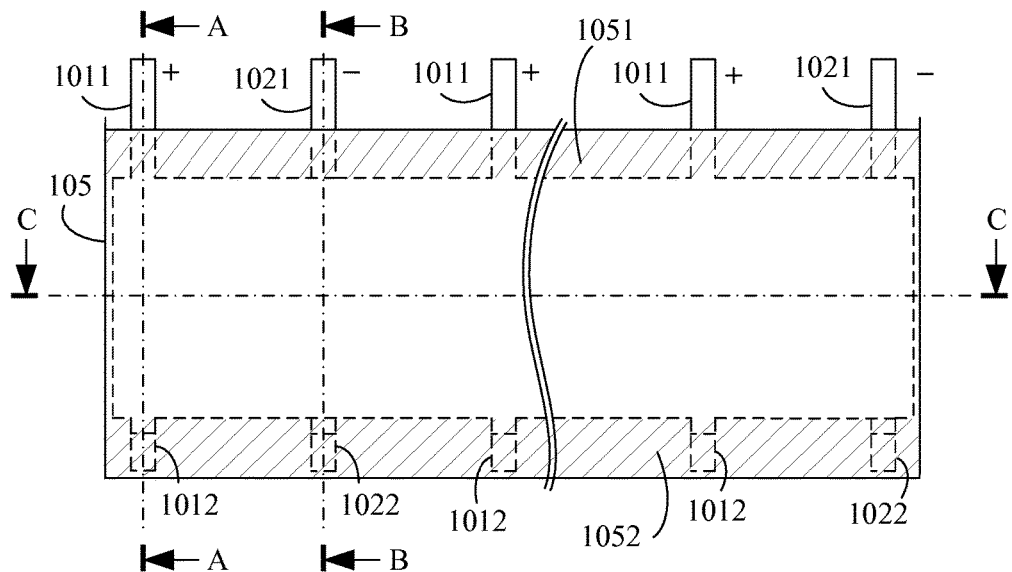
FIG. 54 is a structural unfold view of the electrode plate formed in rolling structure showing the single-sided input/output electric conductive terminal and the lateral positive electric conductive member (109) and the lateral negative electric conductive member (110) of the electrode plate pair being sealed in a single-layer insulation status for forming as the rolling structure, wherein the input/output electric conductive terminal at one side being served as the single-sided input/output electric conductive interface according one embodiment of the present invention.

According to the present invention, the electricity charging/discharging device with insulation package enclose member having electrode plate pair with multiple-sided electric conductive terminals can be further formed as a rolling structure, illustrated as followings:

FIG. 54 is a structural unfold view of the electrode plate formed in rolling structure showing the single-sided input/output electric conductive terminal and the lateral positive electric conductive member (109) and the lateral negative electric conductive member (110) of the electrode plate pair being sealed in a single-layer insulation status for forming as the rolling structure, wherein the input/output electric conductive terminal at one side being served as the single-sided input/output electric conductive interface according one embodiment of the present invention.

Figures 55, 56:
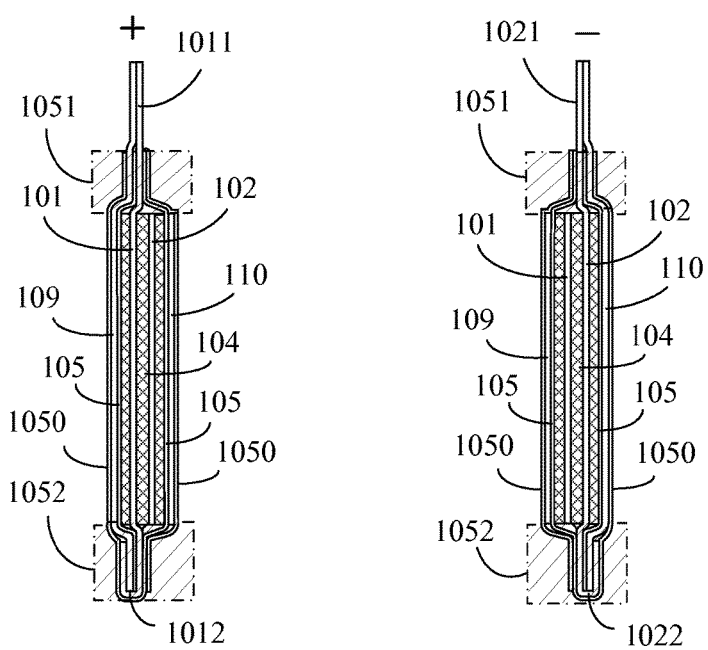
FIG. 55 is a lateral cross sectional view of FIG. 54 taken along A-A.
FIG. 56 is a lateral cross sectional view of FIG. 54 taken along B-B.

FIG. 55 is a lateral cross sectional view of FIG. 54 taken along A-A.

FIG. 56 is a lateral cross sectional view of FIG. 54 taken along B-B.

As shown in FIG. 54, FIG. 55 and FIG. 56, the single-sided input/output electric conductive terminal and the lateral positive electric conductive member (109) and the lateral negative electric conductive member (110) of the electrode plate pair of the electricity charging/discharging device with insulation package enclose member having electrode plate pair with multiple-sided electric conductive terminals is sealed in a single-layer insulation status for forming as the rolling structure, and the input/output electric conductive terminal at one side is served as the single-sided input/output electric conductive interface.

Figure 57:
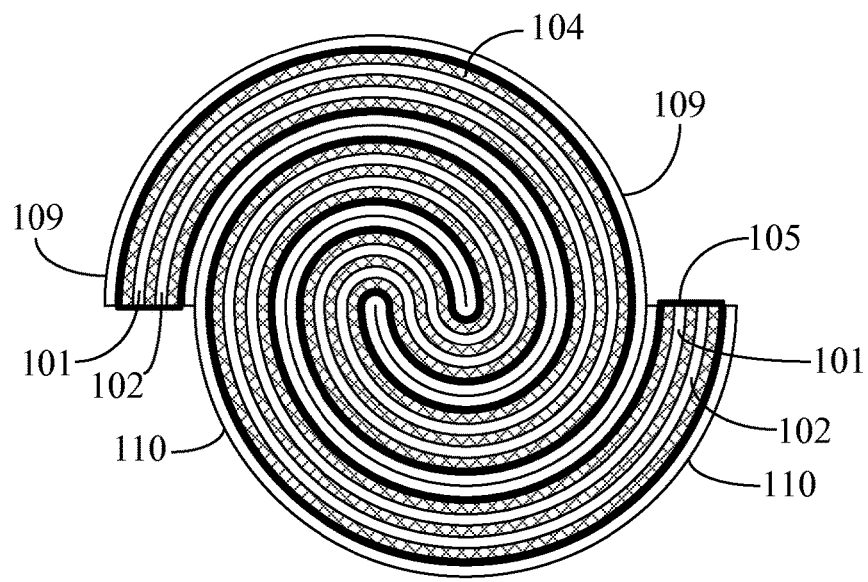
FIG. 57 is a cross sectional view showing the rolling structure shown in FIG. 54 taken along C-C according to the present invention.

FIG. 57 is a cross sectional view showing the rolling structure shown in FIG. 54 taken along C-C according to the present invention.

As shown in FIG. 57, for allowing the lateral positive electric conductive member (109), the lateral negative electric conducive member (110) and the input/output electric conductive terminal at one side to be sealed in a single-layer insulation status, the positive electrode plate (101), the negative electrode plate (102), the separator (104), the lateral positive electric conductive member (109) and the lateral negative electric conductive member (110) are formed as the rolling structure, and one or more of the single-sided individually-arranged input/output electric conductive terminals having positive polarity and one or more of the input/output electric conductive terminals having negative polarity are individually-arranged for structuring as the single-sided input/output electric conductive interface.

Figure 58:
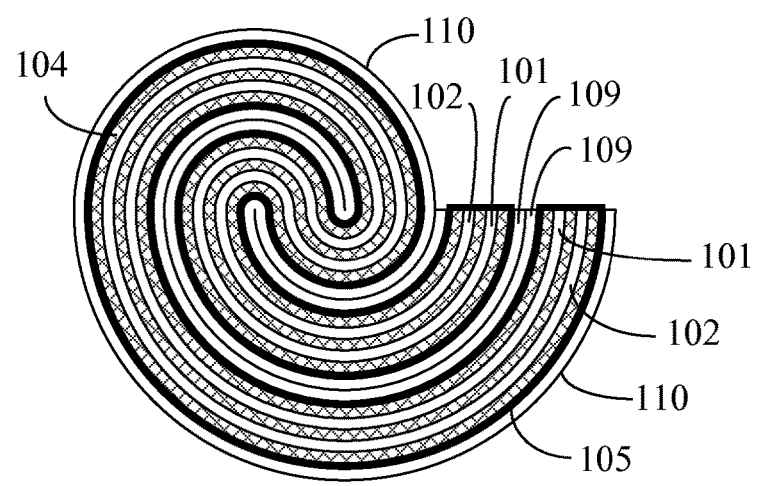
FIG. 58 is another cross sectional view showing the rolling structure shown in FIG. 54 taken along C-C according to the present invention.

FIG. 58 is another cross sectional view showing the rolling structure shown in FIG. 54 taken along C-C according to the present invention.

As shown in FIG. 58, for allowing the lateral positive electric conductive member (109), the lateral negative electric conducive member (110) and the input/output electric conductive terminal at one side to be sealed in a single-layer insulation status, the positive electrode plate (101), the negative electrode plate (102), the insulation member (104), the lateral positive electric conductive member (109) and the lateral negative electric conducive member (110) are formed as the rolling structure, and one or more of the single-sided adjacently-arranged positive input/output electric conductive terminals and one or more of the negative input/output electric conductive terminals are adjacently-arranged and homo-polarity connected in parallel for structuring as the single-sided input/output electric conductive interface.

Figure 59:
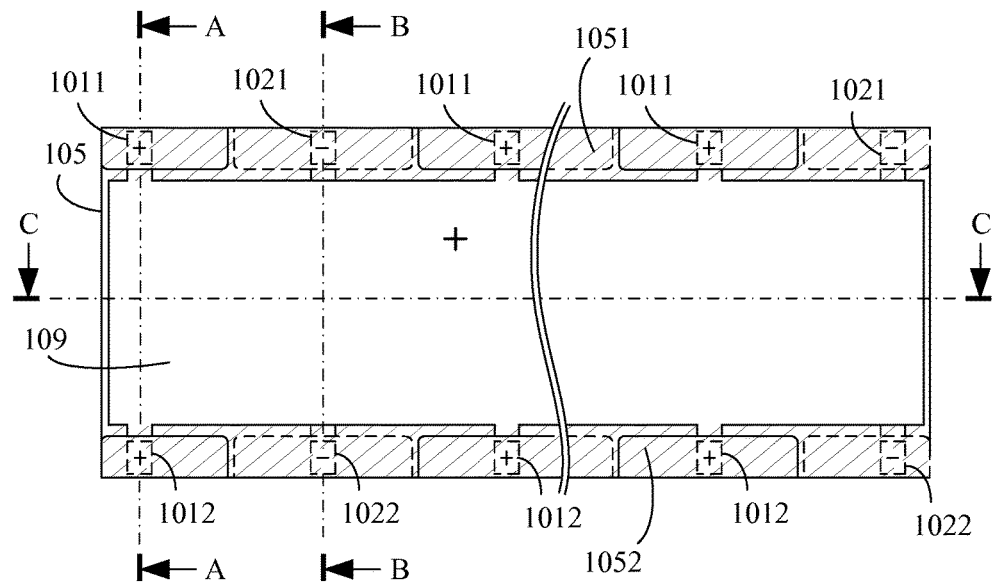
FIG. 59 is a structural unfold view of the electrode plate formed in the rolling structure showing the input/output electric conductive terminals at two sides of the electrode plate pair being sealed in a single-layer insulation status, and the lateral positive electric conductive member (109) and the lateral negative electric conductive member (110) being structured as the single-sided input/output electric conductive interface according one embodiment of the present invention.

FIG. 59 is a structural unfold view of the electrode plate formed in the rolling structure showing the input/output electric conductive terminals at two sides of the electrode plate pair being sealed in a single-layer insulation status, and the lateral positive electric conductive member (109) and the lateral negative electric conductive member (110) being structured as the single-sided input/output electric conductive interface according one embodiment of the present invention.

Figures 60, 61:
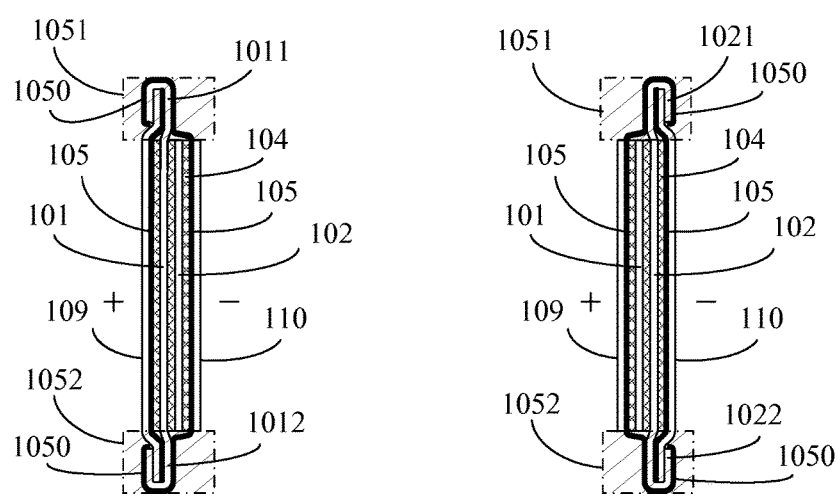
FIG. 60 is a lateral cross sectional view of FIG. 59 taken along A-A.
FIG. 61 is a lateral cross sectional view of FIG. 59 taken along B-B.

FIG. 60 is a lateral cross sectional view of FIG. 59 taken along A-A.

FIG. 61 is a lateral cross sectional view of FIG. 59 taken along B-B.

As shown in FIG. 59, FIG. 60 and FIG. 61, the input/output electric conductive terminals at two sides of the electrode plate pair of the electricity charging/discharging device with insulation package enclose member having electrode plate pair with multiple-sided electric conductive terminals are sealed in a single-layer insulation status, and the lateral positive electric conductive member (109) and the lateral negative electric conductive member (110) are structured as the single-sided input/output electric conductive interface for forming the rolling structure.

Figure 62:
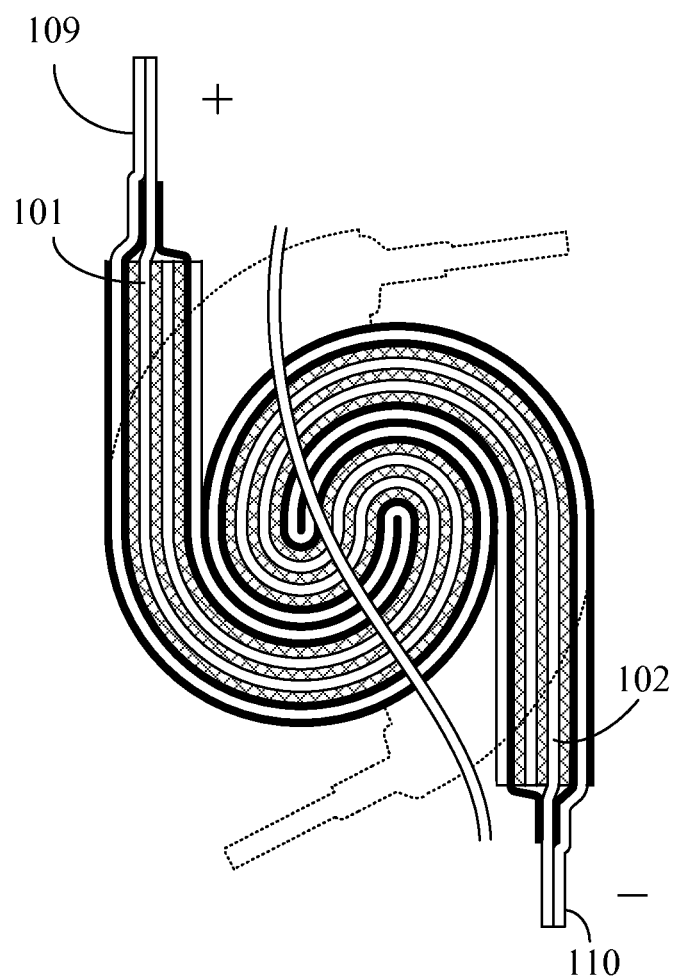
FIG. 62 is a cross sectional view showing the rolling structure shown in FIG. 59 taken along C-C according to the present invention.

FIG. 62 is a cross sectional view showing the rolling structure shown in FIG. 59 taken along C-C according to the present invention.

As shown in FIG. 62, for allowing the input/output electric conductive terminals at two sides of the electrode plate pair to be sealed in a single-layer insulation status, the lateral positive electric conductive member (109) and the lateral negative electric conducive member (110) at two sides are structured as the single-sided input/output electric conductive interface.

III. The present invention provides a structural embodiment which is further installed an outer auxiliary insulation package enclosed member (106) to an electricity charging/discharging device structured by the electrode plate pair with multiple-sided electric conductive terminals having insulation package enclose member, and is converted into a multiple-layered package structure with single-sided input/output electric conductive interface, thereby allowing the electrode plate pair with multiple-sided electric conductive terminals to be structured as an input/output electric conductive interface through single-sided input/output electric conductive terminals having positive and negative polarities for the purpose of transferring electric energy to the exterior; because the shapes and types of electrode plates can be varied according to actual needs, a quadrilateral electrode plate is adopted herein for illustration, as followings:

FIG. 63 is a schematic structural view showing the electricity charging/discharging device with insulation package enclose member having electrode plate pair with multiple-sided electric conductive terminals being provided with a quadrilateral sheet-like lateral positive electric conductive member (109) and a lateral negative electric conductive member (110).

FIG. 64 is a lateral cross sectional view of FIG. 63 taken along A-A.

FIG. 65 is a lateral cross sectional view of FIG. 63 taken along B-B.

As shown in FIG. 63, FIG. 64 and FIG. 65, mainly consists:

positive electrode plate (101): composed of one or more than one of sheet-like or film-like quadrilateral positive electrode plates, opposite sides of the positive electrode plate are respectively formed with at least an electric conductive terminal for inputting/outputting electric energy, and the surface of the positive electrode plate is provided with an electrochemical material;

negative electrode plate (102): composed of one or more than one of sheet-like or film-like quadrilateral negative electrode plates, opposite sides of the negative electrode plate are respectively formed with at least an electric conductive terminal for inputting/outputting electric energy, and the surface of the negative electrode plate is provided with an electrochemical material;

separator (104): formed by a thin film having microporous or porous property and mainly made of PP or PE, disposed between the positive and the negative electrode plates, and the main function thereof is to isolate the positive and the negative electrode plates for preventing the self-discharge of the cell and the short circuit between the two polarities, and installed between electrode plates having different polarities and installed at a lateral side of the electrode plate according to actual needs;

Opposite sides of the quadrilateral electrode plate are respectively and outwardly extended with one or more input/output terminals for transferring electric energy, and the separator is disposed between one or more of the positive electrode plates and one or more of the negative electrode plates having the same or different quantity, and the electrode plates having different polarities are staggeringly stacked for forming as an electrode plate pair; and when a plurality of the electrode plates having the same polarity are provided, the input/output terminals having the same polarity for transferring electric energy and formed at the same side of each of the electrode plates having the same polarity are conductive electrically connected in parallel;

insulation package enclosed member (105): made of a soft or rigid package material having insulation property such as an aluminum laminated film, the periphery of the insulation package enclosed member (105) is formed in a sealed hollow sleeve status, and openings formed at two sides allow the positive electrode plate (101) and the negative electrode plate (102) having the separator (104) clamped in between to be disposed, one opening of the insulation package enclosed member (105) allows the electric conductive terminal for inputting/outputting electric energy (1011) and the electric conductive terminal for inputting/outputting electric energy (1021) to be exposed, and the insulation package enclosed member (105) is processed for forming a sealing zone (1051) so as to seal the portions of the electric conductive terminal for inputting/outputting electric energy (1011) and the electric conductive terminal for inputting/outputting electric energy (1021) defined close to the electrode plate, and the distal ends of the electric conductive terminal for inputting/outputting electric energy (1011) and the electric conductive terminal for inputting/outputting electric energy (1021) are exposed at the same side, an electrolyte solution or an electrolyte material is filled in the insulation package enclosed member (105), the other opening allows the electric conductive terminal for inputting/outputting electric energy (1012) and the electric conductive terminal for inputting/outputting electric energy (1022) to be exposed, and the insulation package enclosed member (105) is processed for forming a sealing zone (1052) so as to seal the portions of the electric conductive terminal for inputting/outputting electric energy (1012) and the electric conductive terminal for inputting/outputting electric energy (1022) defined close to the electrode plate, and the distal ends of the electric conductive terminal for inputting/outputting electric energy (1012) and the electric conductive terminal for inputting/outputting electric energy (1022) are exposed and inwardly bent along the exterior of the sealing zone (1052) of the insulation package enclosed member (105) thereby being respectively connected with the lateral positive electric conductive member (109) and the lateral negative electric conductive member (110), wherein the electric conductive terminal for inputting/outputting electric energy (1012) is conductive electrically connected to one end of the lateral positive electric conductive member (109), and the other end of the lateral positive electric conductive member (109) is conductive electrically connected to the electric conductive terminal for inputting/outputting electric energy (1011) thereby forming a parallel conductive electrical connection with positive polarity; the electric conductive terminal for inputting/outputting electric energy (1022) is conductive electrically connected to one end of the lateral negative electric conductive member (110), and the other end of the lateral negative electric conductive member (110) is conductive electrically connected to the electric conductive terminal for inputting/outputting electric energy (1021) thereby forming a parallel conductive electrical connection with negative polarity, so an electricity charging/discharging cell is structured;

lateral positive electric conductive member (109): made of an electric conductive material and disposed at one side of the insulation package enclosed member (105);

lateral negative electric conductive member (110): made of an electric conductive material and disposed at another side of the insulation package enclosed member (105);

The above-mentioned lateral positive electric conductive member (109) and the lateral negative electric conductive member (110) include being composed of an electric conductive member formed in a quadrilateral sheet-like, or strip-like or circular sheet-like status, and the top and the bottom ends thereof are respectively extended with an electric conductive strip, the electric conductive strip respectively extended from the top and the bottom ends of the lateral positive electric conductive member (109) are then respectively and conductive electrically connected to the electric conductive terminal for inputting/outputting electric energy (1011) and the electric conductive terminal for inputting/outputting electric energy (1012) having positive polarity, and the electric conductive strip respectively extended from the top and the bottom ends of the lateral negative electric conductive member (110) are then respectively and conductive electrically connected to the electric conductive terminal for inputting/outputting electric energy (1021) and the electric conductive terminal for inputting/outputting electric energy (1022) having negative polarity;

outer auxiliary insulation package enclosed member (106): made of a soft or rigid package material having insulation property such as an aluminum packingfoil and formed in a bag-like status having three sides being sealed and allowing the electricity charging/discharging cell packaged by the insulation package enclosed member (105) to be disposed, and the electric conductive terminal for inputting/outputting electric energy (1011) and the electric conductive terminal for inputting/outputting electric energy (1021) of the electricity charging/discharging cell are exposed through openings formed in the outer auxiliary insulation package enclosed member (106), and through the outer auxiliary insulation package enclosed member (106) being processed for forming an outer sealing zone (1061) and the insulation package enclosed member (105) being processed for forming the sealing zone (1051), the mid portions of the electric conductive terminal for inputting/outputting electric energy (1011) and the electric conductive terminal for inputting/outputting electric energy (1021) are sealed, and the distal portions of the electric conductive terminal for inputting/outputting electric energy (1011) and the electric conductive terminal for inputting/outputting electric energy (1021) are exposed at the same side for forming as electric conductive terminals for inputting/outputting electric energy to the exterior, thereby structuring the multiple-layer package structure which is additionally installed the outer auxiliary insulation package enclosed member (106) to the electrode plate pair with multiple-sided electric conductive terminals of the present application and converted into single-sided input/output electric conductive interface.

FIG. 66 is a schematic structural view showing the electricity charging/discharging device with insulation package enclose member having electrode plate pair with multiple-sided electric conductive terminals being installed with the strip-like lateral positive electric conductive member (109) and the lateral negative electric conductive member (110).

The lateral cross sectional view of FIG. 66 taken along A-A is the same as FIG. 64.

The lateral cross sectional view of FIG. 66 taken along B-B is the same as FIG. 65.

As shown in FIG. 66, FIG. 64 and FIG. 65, the multiple-layer package structure having electrode plate pair with multiple-sided electric conductive terminals converted into single-sided input/output electric conductive interface being installed with the strip-like lateral positive electric conductive member (109) and the lateral negative electric conductive member (110).

FIG. 67 is a schematic structural view showing the electricity charging/discharging device with insulation package enclose member having electrode plate pair with multiple-sided electric conductive terminals being installed with the circular sheet-like lateral positive electric conductive member (109) and the lateral negative electric conductive member (110).

The lateral cross sectional view of FIG. 67 taken along A-A is the same as FIG. 64.

The lateral cross sectional view of FIG. 67 taken along B-B is the same as FIG. 65.

As shown in FIG. 67, FIG. 64 and FIG. 65, the multiple-layer package structure having electrode plate pair with multiple-sided electric conductive terminals converted into single-sided input/output electric conductive interface being installed with the circular sheet-like lateral positive electric conductive member (109) and the lateral negative electric conductive member (110).

Figure 68:
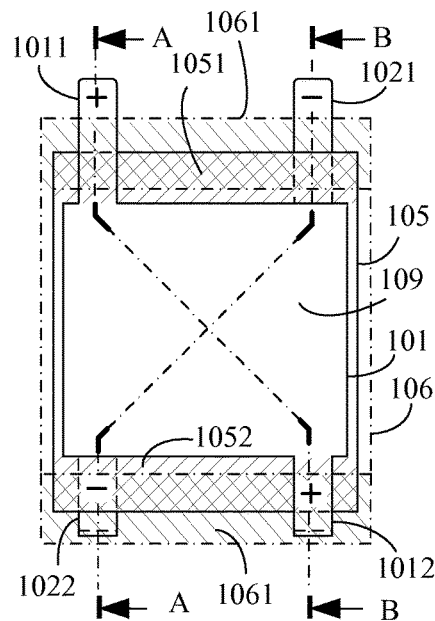
FIG. 68 is a schematic structural view showing one side of the positive electrode plate (101) shown in FIG. 63 being integrally extended with the electric conductive terminal for inputting/outputting electric energy (1012) and the lateral positive electric conductive member (109) then combined with the electric conductive terminal for inputting/outputting electric energy (1011), and one side of the negative electrode plate (102) being integrally extended with the electric conductive terminal for inputting/outputting electric energy (1022) and the lateral negative electric conductive member (110) then combined with the negative electrode plate (102).

According to each embodiment disclosed above, one side of the positive electrode plate (101) can be further integrally extended with the electric conductive terminal for inputting/outputting electric energy (1012) and the lateral positive electric conductive member (109) then combined with the electric conductive terminal for inputting/outputting electric energy (1011), and one side of the negative electrode plate (102) can be further integrally extended with the electric conductive terminal for inputting/outputting electric energy (1022) and the lateral negative electric conductive member (110) then combined with the negative electrode plate (102) thereby reducing the processing points for combination, embodiments are provided as followings:

FIG. 68 is a schematic structural view showing one side of the positive electrode plate (101) shown in FIG. 63 being integrally extended with the electric conductive terminal for inputting/outputting electric energy (1012) and the lateral positive electric conductive member (109) then combined with the electric conductive terminal for inputting/outputting electric energy (1011), and one side of the negative electrode plate (102) being integrally extended with the electric conductive terminal for inputting/outputting electric energy (1022) and the lateral negative electric conductive member (110) then combined with the negative electrode plate (102).

Figures 69, 70:
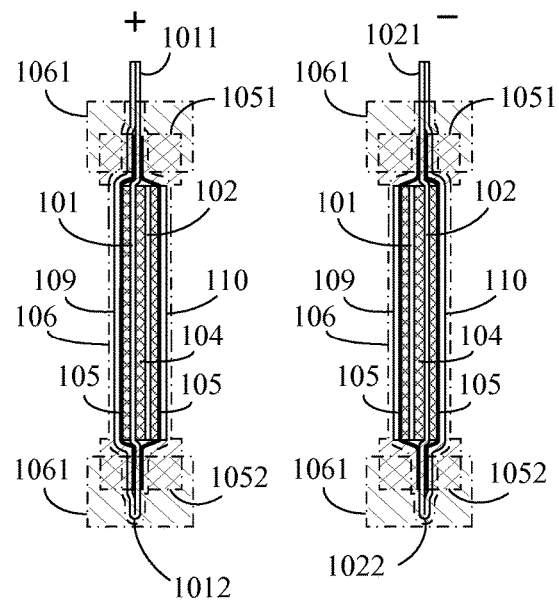
FIG. 69 is a lateral cross sectional view of FIG. 68 taken along A-A.
FIG. 70 is a lateral cross sectional view of FIG. 68 taken along B-B.

FIG. 69 is a lateral cross sectional view of FIG. 68 taken along A-A.

FIG. 70 is a lateral cross sectional view of FIG. 68 taken along B-B.

As shown in FIG. 68, FIG. 69 and FIG. 70, the main characteristic is that one side of the positive electrode plate (101) is integrally extended with the electric conductive terminal for inputting/outputting electric energy (1012) and the lateral positive electric conductive member (109) then combined with the electric conductive terminal for inputting/outputting electric energy (1011), and one side of the negative electrode plate (102) is integrally extended with the electric conductive terminal for inputting/outputting electric energy (1022) and the lateral negative electric conductive member (110) then combined with the negative electrode plate (102), thereby structuring a single-sided input/output electric conductive interface.

Figure 71:
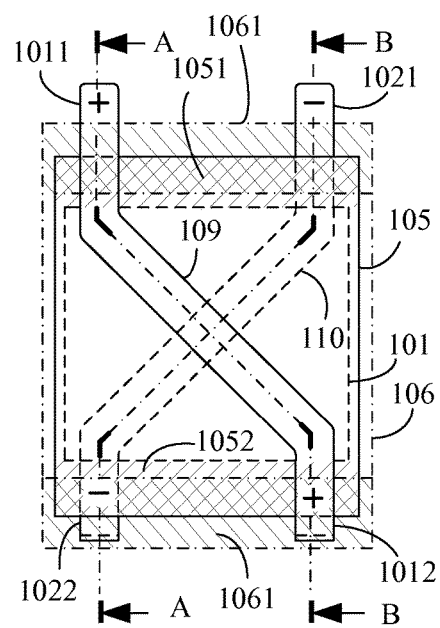
FIG. 71 is a schematic structural view showing one side of the positive electrode plate (101) shown in FIG. 66 being integrally extended with the electric conductive terminal for inputting/outputting electric energy (1012) and the lateral positive electric conductive member (109) then combined with the electric conductive terminal for inputting/outputting electric energy (1011), and one side of the negative electrode plate (102) being integrally extended with the electric conductive terminal for inputting/outputting electric energy (1022) and the lateral negative electric conductive member (110) then combined with the negative electrode plate (102).

FIG. 71 is a schematic structural view showing one side of the positive electrode plate (101) shown in FIG. 66 being integrally extended with the electric conductive terminal for inputting/outputting electric energy (1012) and the lateral positive electric conductive member (109) then combined with the electric conductive terminal for inputting/outputting electric energy (1011), and one side of the negative electrode plate (102) being integrally extended with the electric conductive terminal for inputting/outputting electric energy (1022) and the lateral negative electric conductive member (110) then combined with the negative electrode plate (102).

The lateral cross sectional view of FIG. 71 taken along A-A is the same as FIG. 69.

The lateral cross sectional view of FIG. 71 taken along B-B is the same as FIG. 70.

As shown in FIG. 71, FIG. 69 and FIG. 70, the main characteristic is that one side of the positive electrode plate (101) is integrally extended with the electric conductive terminal for inputting/outputting electric energy (1012) and the lateral positive electric conductive member (109) then combined with the electric conductive terminal for inputting/outputting electric energy (1011), and one side of the negative electrode plate (102) is integrally extended with the electric conductive terminal for inputting/outputting electric energy (1022) and the lateral negative electric conductive member (110) then combined with the negative electrode plate (102), thereby structuring a single-sided input/output electric conductive interface.

Figure 72:
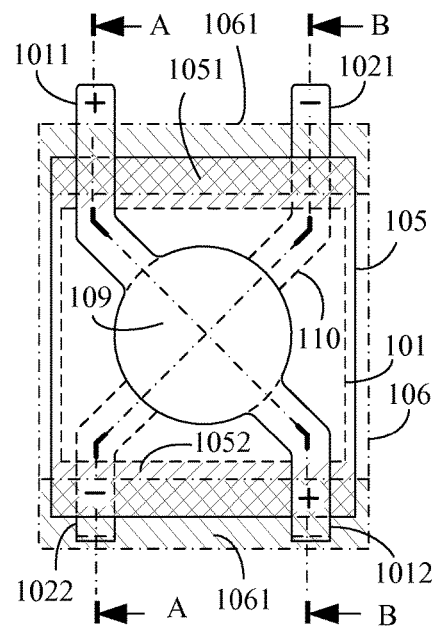
FIG. 72 is a schematic structural view showing one side of the positive electrode plate (101) shown in FIG. 67 being integrally extended with the electric conductive terminal for inputting/outputting electric energy (1012) and the lateral positive electric conductive member (109) then combined with the electric conductive terminal for inputting/outputting electric energy (1011), and one side of the negative electrode plate (102) being integrally extended with the electric conductive terminal for inputting/outputting electric energy (1022) and the lateral negative electric conductive member (110) then combined with the negative electrode plate (102).

FIG. 72 is a schematic structural view showing one side of the positive electrode plate (101) shown in FIG. 67 being integrally extended with the electric conductive terminal for inputting/outputting electric energy (1012) and the lateral positive electric conductive member (109) then combined with the electric conductive terminal for inputting/outputting electric energy (1011), and one side of the negative electrode plate (102) being integrally extended with the electric conductive terminal for inputting/outputting electric energy (1022) and the lateral negative electric conductive member (110) then combined with the negative electrode plate (102).

The lateral cross sectional view of FIG. 72 taken along A-A is the same as FIG. 69.

The lateral cross sectional view of FIG. 72 taken along B-B is the same as FIG. 70.

As shown in FIG. 72, FIG. 69 and FIG. 70, the main characteristic is that one side of the positive electrode plate (101) is integrally extended with the electric conductive terminal for inputting/outputting electric energy (1012) and the lateral positive electric conductive member (109) then combined with the electric conductive terminal for inputting/outputting electric energy (1011), and one side of the negative electrode plate (102) is integrally extended with the electric conductive terminal for inputting/outputting electric energy (1022) and the lateral negative electric conductive member (110) then combined with the negative electrode plate (102), thereby structuring a single-sided input/output electric conductive interface.

According to the above-mentioned embodiments, the lateral positive electric conductive member (109) and the lateral negative electric conductive member (110) at two sides of the electricity charging/discharging device with insulation package enclose member having electrode plate pair with multiple-sided electric conductive terminals can be further served as an input/output electric conductive interface for being individually used, or connected in series, in parallel or in series and parallel, the configuration includes:
- externally exposed electric conductive surfaces of the lateral positive electric conductive member (109) and the lateral negative electric conductive member (110) are directly formed as the input/output electric conductive interfaces;
- the externally exposed surface of the lateral positive electric conductive member (109) is provided with a lateral positive auxiliary electric conductive member (1091), and the externally exposed surface of the lateral negative electric conductive member (110) is provided with a lateral negative auxiliary electric conductive member (1101) for structuring the input/output electric conductive interfaces.
- one or more locations defined at the mid portion of the lateral positive electric conductive member (109) are formed with an outwardly-protruded structure and one or more locations defined at the mid portion of the lateral negative electric conductive member (110) are formed with an outwardly-protruded structure, thereby structuring the input/output electric conductive interfaces.

Figure 73:
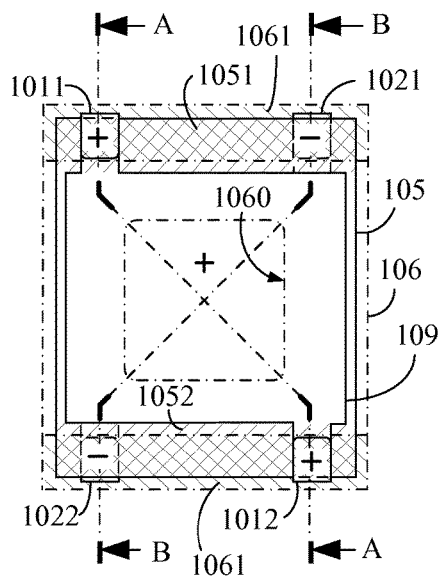
FIG. 73 is a schematic structural view showing the lateral positive electric conductive member (109) and the lateral negative electric conductive member (110) at two sides of the electricity charging/discharging device with insulation package enclose member having electrode plate pair with multiple-sided electric conductive terminals shown in FIG. 63 passing openings (1060) of the outer auxiliary insulation package enclosed member (106) at two sides for respectively being served as an input/output electric conductive interface.

Embodiments are provided as followings:

FIG. 73 is a schematic structural view showing the lateral positive electric conductive member (109) and the lateral negative electric conductive member (110) at two sides of the electricity charging/discharging device with insulation package enclose member having electrode plate pair with multiple-sided electric conductive terminals shown in FIG. 63 passing openings (1060) of the outer auxiliary insulation package enclosed member (106) at two sides for respectively being served as an input/output electric conductive interface.

Figures 74, 75:
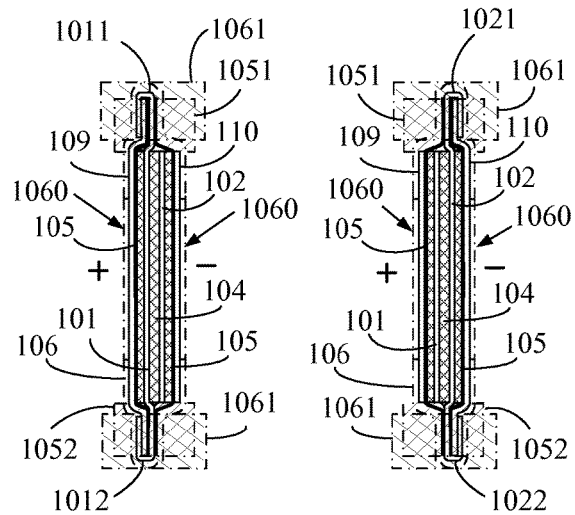
FIG. 74 is a lateral cross sectional view of FIG. 73 taken along A-A.
FIG. 75 is a lateral cross sectional view of FIG. 73 taken along B-B.

FIG. 74 is a lateral cross sectional view of FIG. 73 taken along A-A.

FIG. 75 is a lateral cross sectional view of FIG. 73 taken along B-B.

As shown in FIG. 73, FIG. 74 and FIG. 75, the main characteristic is that the lateral positive electric conductive member (109) and the lateral negative electric conductive member (110) at two sides of the electricity charging/discharging device with insulation package enclose member having electrode plate pair with multiple-sided electric conductive terminals pass the openings (1060) of the outer auxiliary insulation package enclosed member (106) at two sides for respectively being served as the input/output electric conductive interface.

Figure 76:
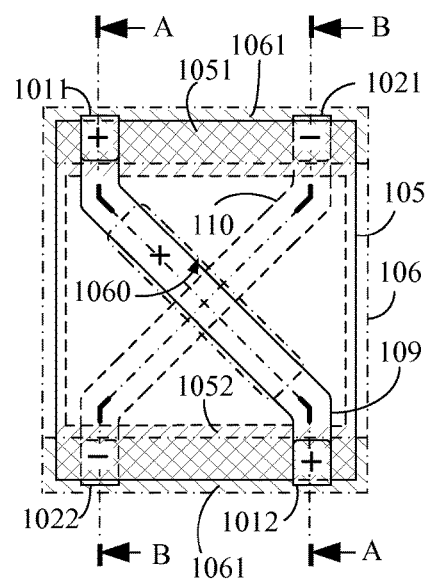
FIG. 76 is a schematic structural view showing the lateral positive electric conductive member (109) and the lateral negative electric conductive member (110) at two sides of the electricity charging/discharging device with insulation package enclose member having electrode plate pair with multiple-sided electric conductive terminals shown in FIG. 66 passing openings (1060) of the outer auxiliary insulation package enclosed member (106) at two sides for respectively being served as an input/output electric conductive interface.

FIG. 76 is a schematic structural view showing the lateral positive electric conductive member (109) and the lateral negative electric conductive member (110) at two sides of the electricity charging/discharging device with insulation package enclose member having electrode plate pair with multiple-sided electric conductive terminals shown in FIG. 66 passing openings (1060) of the outer auxiliary insulation package enclosed member (106) at two sides for respectively being served as an input/output electric conductive interface.

The lateral cross sectional view of FIG. 76 taken along A-A is the same as FIG. 74.

The lateral cross sectional view of FIG. 76 taken along B-B is the same as FIG. 75.

As shown in FIG. 76, FIG. 74 and FIG. 75, the main characteristic is that the lateral positive electric conductive member (109) and the lateral negative electric conductive member (110) at two sides of the electricity charging/discharging device with insulation package enclose member having electrode plate pair with multiple-sided electric conductive terminals pass the openings (1060) of the outer auxiliary insulation package enclosed member (106) at two sides for respectively being served as the input/output electric conductive interface.

Figure 77:
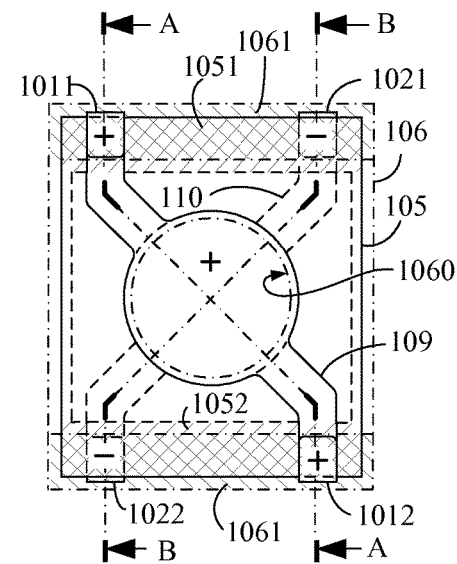
FIG. 77 is a schematic structural view showing the lateral positive electric conductive member (109) and the lateral negative electric conductive member (110) at two sides of the electricity charging/discharging device with insulation package enclose member having electrode plate pair with multiple-sided electric conductive terminals shown in FIG. 67 passing openings (1060) of the outer auxiliary insulation package enclosed member (106) at two sides for respectively being served as an input/output electric conductive interface.

FIG. 77 is a schematic structural view showing the lateral positive electric conductive member (109) and the lateral negative electric conductive member (110) at two sides of the electricity charging/discharging device with insulation package enclose member having electrode plate pair with multiple-sided electric conductive terminals shown in FIG. 67 passing openings (1060) of the outer auxiliary insulation package enclosed member (106) at two sides for respectively being served as an input/output electric conductive interface.

The lateral cross sectional view of FIG. 77 taken along A-A is the same as FIG. 74.

The lateral cross sectional view of FIG. 77 taken along B-B is the same as FIG. 75.

As shown in FIG. 77, FIG. 74 and FIG. 75, the main characteristic is that the lateral positive electric conductive member (109) and the lateral negative electric conductive member (110) at two sides of the electricity charging/discharging device with insulation package enclose member having electrode plate pair with multiple-sided electric conductive terminals pass the openings (1060) of the outer auxiliary insulation package enclosed member (106) at two sides for respectively being served as the input/output electric conductive interface.

FIG. 78 is a schematic structural view showing the lateral positive electric conductive member (109) being installed with the lateral positive auxiliary electric conductive member (1091) and the lateral negative electric conductive member (110) being installed with the lateral negative auxiliary electric conductive member (1101) at two sides of the electricity charging/discharging device with insulation package enclose member having electrode plate pair with multiple-sided electric conductive terminals shown in FIG. 63 passing openings (1060) of the outer auxiliary insulation package enclosed member (106) at two sides for respectively being served as an input/output electric conductive interface.

FIG. 79 is a lateral cross sectional view of FIG. 78 taken along A-A.

FIG. 80 is a lateral cross sectional view of FIG. 78 taken along B-B.

As shown in FIG. 78, FIG. 79 and FIG. 80, the main characteristic is that the lateral positive electric conductive member (109) being installed with the lateral positive auxiliary electric conductive member (1091) and the lateral negative electric conductive member (110) being installed with the lateral negative auxiliary electric conductive member (1101) at two sides of the electricity charging/discharging device with insulation package enclose member having electrode plate pair with multiple-sided electric conductive terminals pass the openings (1060) of the outer auxiliary insulation package enclosed member (106) at two sides for respectively being served as the input/output electric conductive interface.

FIG. 81 is a schematic structural view showing the lateral positive electric conductive member (109) being installed with the lateral positive auxiliary electric conductive member (1091) and the lateral negative electric conductive member (110) being installed with the lateral negative auxiliary electric conductive member (1101) at two sides of the electricity charging/discharging device with insulation package enclose member having electrode plate pair with multiple-sided electric conductive terminals shown in FIG. 66 passing openings (1060) of the outer auxiliary insulation package enclosed member (106) at two sides for respectively being served as an input/output electric conductive interface.

The lateral cross sectional view of FIG. 81 taken along A-A is the same as FIG. 79.

The lateral cross sectional view of FIG. 81 taken along B-B is the same as FIG. 80.

As shown in FIG. 81, FIG. 79 and FIG. 80, the main characteristic is that the lateral positive electric conductive member (109) being installed with the lateral positive auxiliary electric conductive member (1091) and the lateral negative electric conductive member (110) being installed with the lateral negative auxiliary electric conductive member (1101) at two sides of the electricity charging/discharging device with insulation package enclose member having electrode plate pair with multiple-sided electric conductive terminals pass the openings (1060) of the outer auxiliary insulation package enclosed member (106) at two sides for respectively being served as the input/output electric conductive interface.

FIG. 82 is a schematic structural view showing the lateral positive electric conductive member (109) being installed with the lateral positive auxiliary electric conductive member (1091) and the lateral negative electric conductive member (110) being installed with the lateral negative auxiliary electric conductive member (1101) at two sides of the electricity charging/discharging device with insulation package enclose member having electrode plate pair with multiple-sided electric conductive terminals shown in FIG. 67 passing openings (1060) of the outer auxiliary insulation package enclosed member (106) at two sides for respectively being served as an input/output electric conductive interface.

The lateral cross sectional view of FIG. 82 taken along A-A is the same as FIG. 79.

The lateral cross sectional view of FIG. 82 taken along B-B is the same as FIG. 80.

As shown in FIG. 82, FIG. 79 and FIG. 80, the main characteristic is that the lateral positive electric conductive member (109) being installed with the lateral positive auxiliary electric conductive member (1091) and the lateral negative electric conductive member (110) being installed with the lateral negative auxiliary electric conductive member (1101) at two sides of the electricity charging/discharging device with insulation package enclose member having electrode plate pair with multiple-sided electric conductive terminals pass the openings (1060) of the outer auxiliary insulation package enclosed member (106) at two sides for respectively being served as the input/output electric conductive interface.

Figure 83:
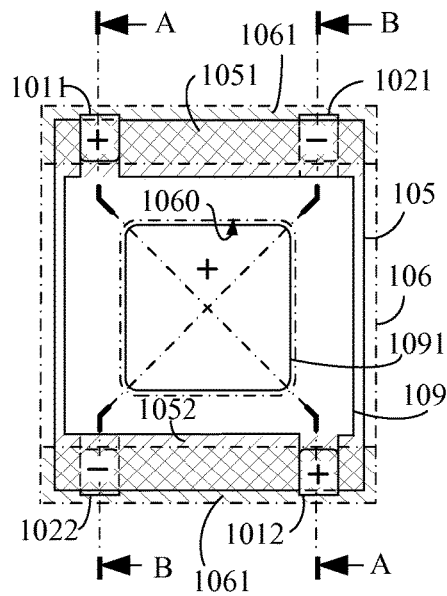
FIG. 83 is a schematic structural view showing the lateral positive electric conductive member (109) having the mid portion being formed with an outwardly-protruded structure and the lateral negative electric conductive member (110) having the mid portion being formed with an outwardly-protruded structure at two sides of the electricity charging/discharging device with insulation package enclose member having electrode plate pair with multiple-sided electric conductive terminals shown in FIG. 63 passing openings (1060) of the outer auxiliary insulation package enclosed member (106) at two sides for respectively being served as an input/output electric conductive interface.

FIG. 83 is a schematic structural view showing the lateral positive electric conductive member (109) having the mid portion being formed with an outwardly-protruded structure and the lateral negative electric conductive member (110) having the mid portion being formed with an outwardly-protruded structure at two sides of the electricity charging/discharging device with insulation package enclose member having electrode plate pair with multiple-sided electric conductive terminals shown in FIG. 63 passing openings (1060) of the outer auxiliary insulation package enclose member (106) at two sides for respectively being served as an input/output electric conductive interface.

Figures 84, 85:
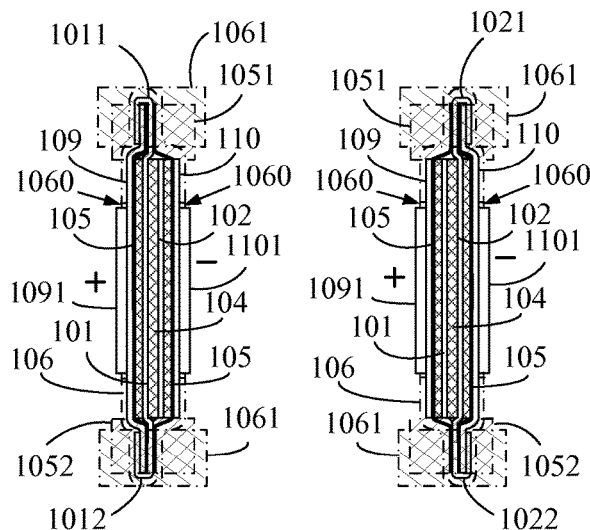
FIG. 84 is a lateral cross sectional view of FIG. 83 taken along A-A.
FIG. 85 is a lateral cross sectional view of FIG. 83 taken along B-B.

FIG. 84 is a lateral cross sectional view of FIG. 83 taken along A-A.

FIG. 85 is a lateral cross sectional view of FIG. 83 taken along B-B.

As shown in FIG. 83, FIG. 84 and FIG. 85, the main characteristic is that the lateral positive electric conductive member (109) having the mid portion being formed with an outwardly-protruded structure and the lateral negative electric conductive member (110) having the mid portion being formed with an outwardly-protruded structure at two sides of the electricity charging/discharging device with insulation package enclose member having electrode plate pair with multiple-sided electric conductive terminals pass the openings (1060) of the outer auxiliary insulation package enclosed member (106) at two sides for respectively being served as the input/output electric conductive interface.

Figure 86:
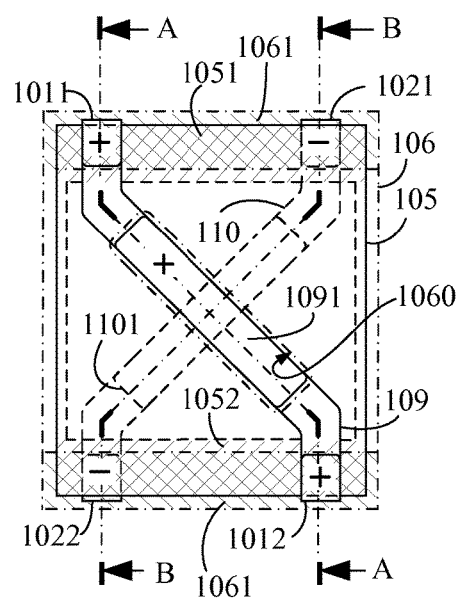
FIG. 86 is a schematic structural view showing the lateral positive electric conductive member (109) having the mid portion being formed with an outwardly-protruded structure and the lateral negative electric conductive member (110) having the mid portion being formed with an outwardly-protruded structure at two sides of the electricity charging/discharging device with insulation package enclose member having electrode plate pair with multiple-sided electric conductive terminals shown in FIG. 66 passing openings (1060) of the outer auxiliary insulation package enclosed member (106) at two sides for respectively being served as an input/output electric conductive interface.

FIG. 86 is a schematic structural view showing the lateral positive electric conductive member (109) having the mid portion being formed with an outwardly-protruded structure and the lateral negative electric conductive member (110) having the mid portion being formed with an outwardly-protruded structure at two sides of the electricity charging/discharging device with insulation package enclose member having electrode plate pair with multiple-sided electric conductive terminals shown in FIG. 66 passing openings (1060) of the outer auxiliary insulation package enclosed member (106) at two sides for respectively being served as an input/output electric conductive interface.

The lateral cross sectional view of FIG. 86 taken along A-A is the same as FIG. 84.

The lateral cross sectional view of FIG. 86 taken along B-B is the same as FIG. 85.

As shown in FIG. 86, FIG. 84 and FIG. 85, the main characteristic is that the lateral positive electric conductive member (109) having the mid portion being formed with an outwardly-protruded structure and the lateral negative electric conductive member (110) having the mid portion being formed with an outwardly-protruded structure at two sides of the electricity charging/discharging device with insulation package enclose member having electrode plate pair with multiple-sided electric conductive terminals pass the openings (1060) of the outer auxiliary insulation package enclosed member (106) at two sides for respectively being served as the input/output electric conductive interface.

Figure 87:
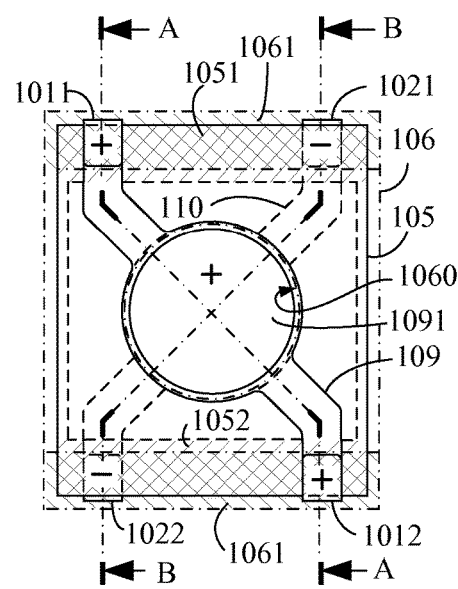
FIG. 87 is a schematic structural view showing the lateral positive electric conductive member (109) having the mid portion being formed with an outwardly-protruded structure and the lateral negative electric conductive member (110) having the mid portion being formed with an outwardly-protruded structure at two sides of the electricity charging/discharging device with insulation package enclose member having electrode plate pair with multiple-sided electric conductive terminals shown in FIG. 67 passing openings (1060) of the outer auxiliary insulation package enclosed member (106) at two sides for respectively being served as an input/output electric conductive interface.

FIG. 87 is a schematic structural view showing the lateral positive electric conductive member (109) having the mid portion being formed with an outwardly-protruded structure and the lateral negative electric conductive member (110) having the mid portion being formed with an outwardly-protruded structure at two sides of the electricity charging/discharging device with insulation package enclose member having electrode plate pair with multiple-sided electric conductive terminals shown in FIG. 67 passing openings (1060) of the outer auxiliary insulation package enclosed member (106) at two sides for respectively being served as an input/output electric conductive interface.

The lateral cross sectional view of FIG. 87 taken along A-A is the same as FIG. 84.

The lateral cross sectional view of FIG. 87 taken along B-B is the same as FIG. 85.

As shown in FIG. 87, FIG. 84 and FIG. 85, the main characteristic is that the lateral positive electric conductive member (109) having the mid portion being formed with an outwardly-protruded structure and the lateral negative electric conductive member (110) having the mid portion being formed with an outwardly-protruded structure at two sides of the electricity charging/discharging device with insulation package enclose member having electrode plate pair with multiple-sided electric conductive terminals pass the openings (1060) of the outer auxiliary insulation package enclosed member (106) at two sides for respectively being served as the input/output electric conductive interface.

Figure 88:
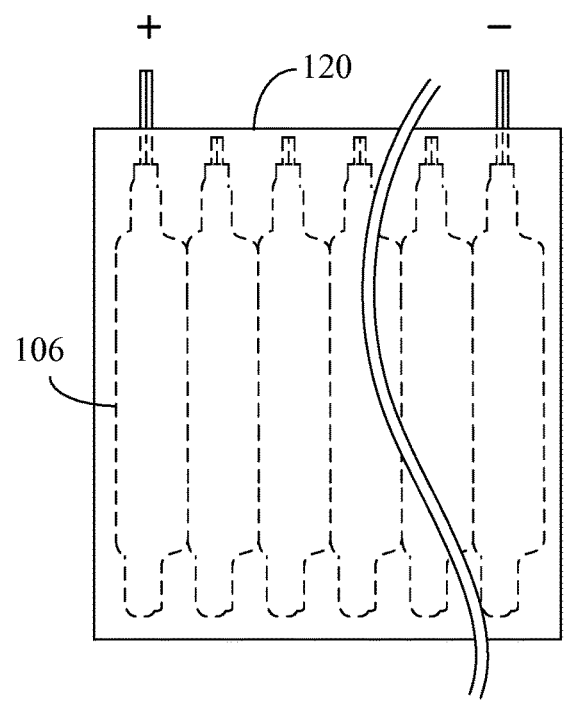
FIG. 88 is a schematic structural view showing the electricity charging/discharging cells being disposed inside the housing (120) for forming as a module according to the present invention.

After the plural electricity charging/discharging cells are structured, the electricity charging/discharging cells can be individually operated and combined through electric conductive members, at least one or more of the electricity charging/discharging cells are disposed in the interior of one or more of the housings so as to be collected for forming as a modularized structure which is connected through the electric conductive members or the input/output electric conductive interface of each electricity charging/discharging device for transferring electric energy;

FIG. 88 is a schematic structural view showing the electricity charging/discharging cells being disposed inside the housing (120) for forming as a module according to the present invention.

Figure 89:
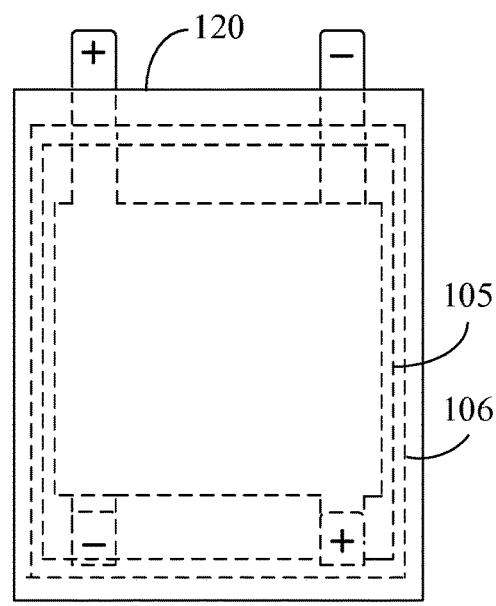
FIG. 89 is a lateral structural view of FIG. 88.

FIG. 89 is a lateral structural view of FIG. 88.

As shown in FIG. 88 and FIG. 89, at least one or more of the electricity charging/discharging cells are disposed inside the housing (120), wherein:
housing (120): made of a soft flexible material or a rigid material such as stainless steel.

Figure 90:
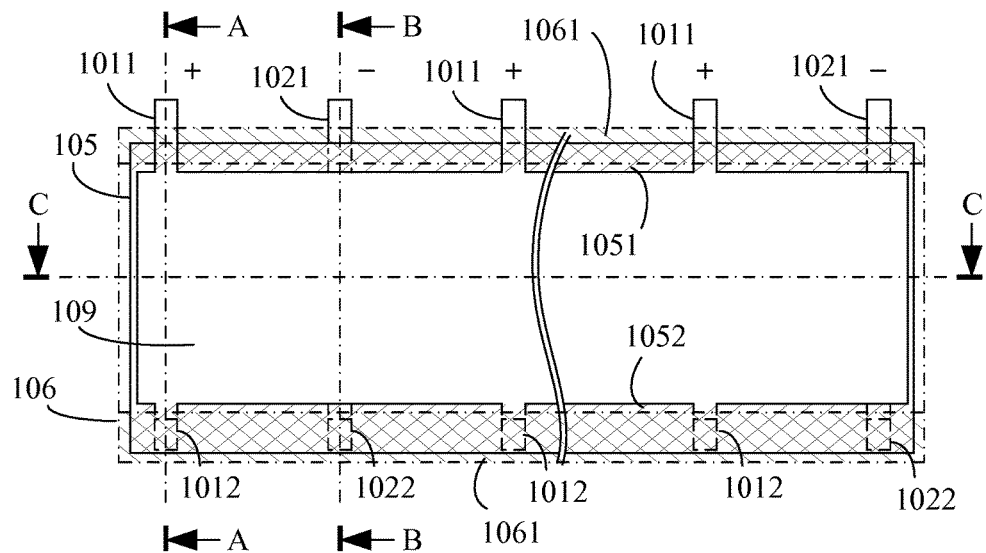
FIG. 90 is a structural develop view showing the single-sided input/output electric conductive terminal and the lateral positive electric conductive member (109) and the lateral negative electric conductive member (110) of the electrode plate pair being sealed as a multi-layer insulation package enclosed member, wherein the input/output electric conductive terminal at one side being served as the single-sided input/output electric conductive interface according to the present invention.

According to the present invention, the electricity charging/discharging device with insulation package enclose member having electrode plate pair with multiple-sided electric conductive terminals can be further formed as a rolling structure, illustrated as followings:

FIG. 90 is a structural develop view showing the single-sided input/output electric conductive terminal and the lateral positive electric conductive member (109) and the lateral negative electric conductive member (110) of the electrode plate pair being sealed as a multi-layer insulation package enclosed member, wherein the input/output electric conductive terminal at one side being served as the single-sided input/output electric conductive interface according to the present invention.

Figure 91:
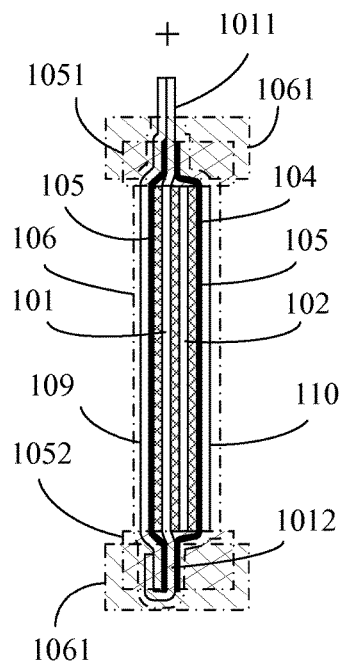
FIG. 91 is a lateral cross sectional view of FIG. 90 taken along A-A.

FIG. 91 is a lateral cross sectional view of FIG. 90 taken along A-A.

Figure 92:
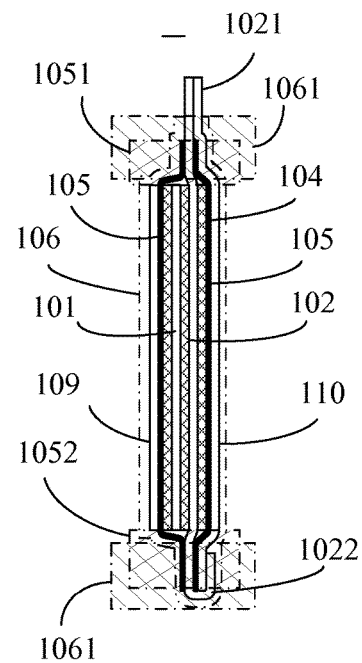
FIG. 92 is a lateral cross sectional view of FIG. 90 taken along B-B.

FIG. 92 is a lateral cross sectional view of FIG. 90 taken along B-B.

As shown in FIG. 90, FIG. 91 and FIG. 92, the single-sided input/output electric conductive terminal and the lateral positive electric conductive member (109) and the lateral negative electric conductive member (110) of the electrode plate pair are sealed as a multi-layer insulation package enclosed member for forming as the rolling structure, wherein the input/output electric conductive terminal at one side is served as the single-sided input/output electric conductive interface.

Figure 93:
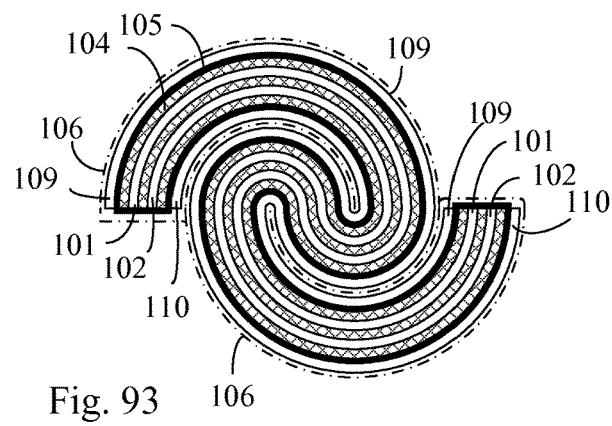
FIG. 93 is the first cross sectional view showing the rolling structure shown in FIG. 90 taken along C-C according to the present invention.

FIG. 93 is the first cross sectional view showing the rolling structure shown in FIG. 90 taken along C-C according to the present invention.

As shown in FIG. 93, for enabling the multi-layer insulation package enclosed member to be used for sealing, one or more of the single-sided individually-arranged positive input/output electric conductive terminals and one or more of the negative input/output electric conductive terminals are individually-arranged for forming as the single-sided input/output electric conductive interface.

Figure 94:
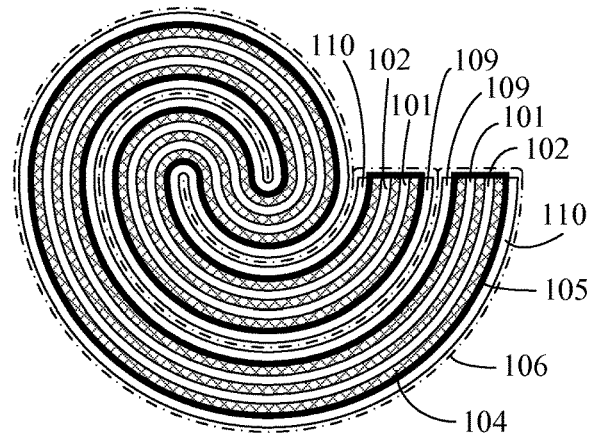
FIG. 94 is the second cross sectional view showing the rolling structure shown in FIG. 90 taken along C-C according to the present invention.

FIG. 94 is the second cross sectional view showing the rolling structure shown in FIG. 90 taken along C-C according to the present invention.

As shown in FIG. 94, for enabling the multi-layer insulation package enclosed member to be used for sealing, one or more of the single-sided adjacently-arranged positive input/output electric conductive terminals and one or more of the negative input/output electric conductive terminals are adjacently-arranged and homo-polarity connected in parallel for forming as the single-sided input/output electric conductive interface.

Figure 95:
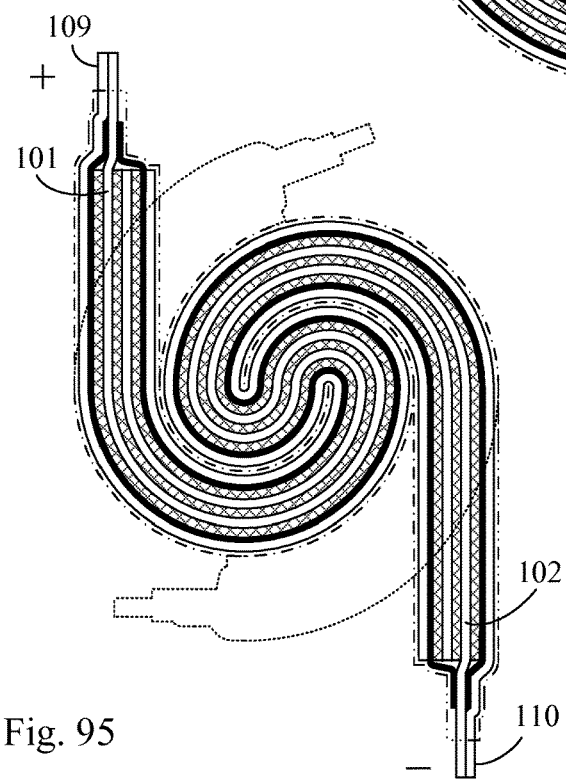
FIG. 95 is the third cross sectional view showing the rolling structure shown in FIG. 90 taken along C-C according to the present invention.

FIG. 95 is the third cross sectional view showing the rolling structure shown in FIG. 90 taken along C-C according to the present invention.

As shown in FIG. 95, for enabling the multi-layer insulation package enclosed member to be used for sealing, only the lateral positive electric conductive member (109) and the lateral negative electric conductive member (110) are served to be structured as the single-sided input/output electric conductive interface.

Figures 96, 97, 98:
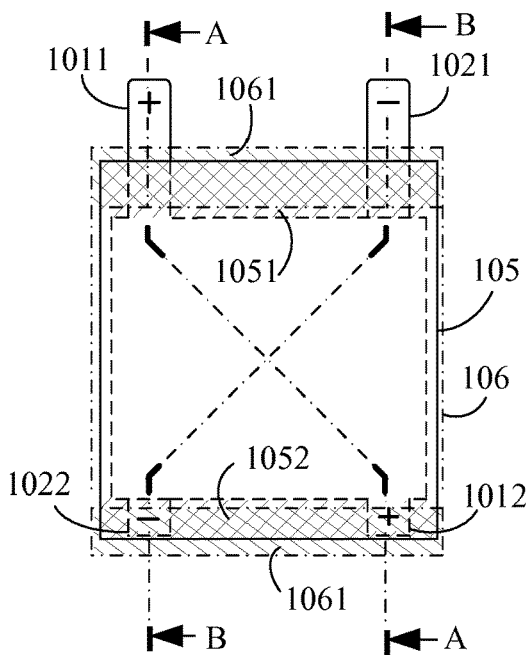
FIG. 96 is a schematic structural view showing an embodiment of increasing the number of the positive electrode plate (101) and/or the negative electrode plate (102) at the same time applied to a multiple-layer package structure with specific single-sided input/output and having electrode plate pair with multiple-sided input/output terminals.
FIG. 97 is a lateral cross sectional view of FIG. 96 taken along A-A.
FIG. 98 is a lateral cross sectional view of FIG. 96 taken along B-B.
Figure 99:
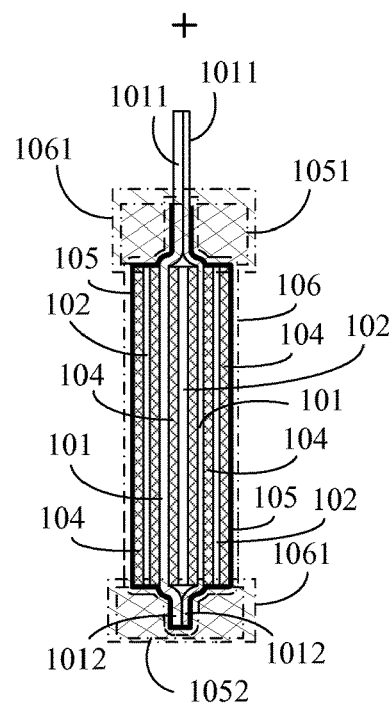
FIG. 99 is a lateral cross sectional view of FIG. 96 taken along A-A showing the first embodiment of the thickness of part of the electrode plates, the positive electrode plate (101) and/or the negative electrode plate (102), being different.
Figure 100:
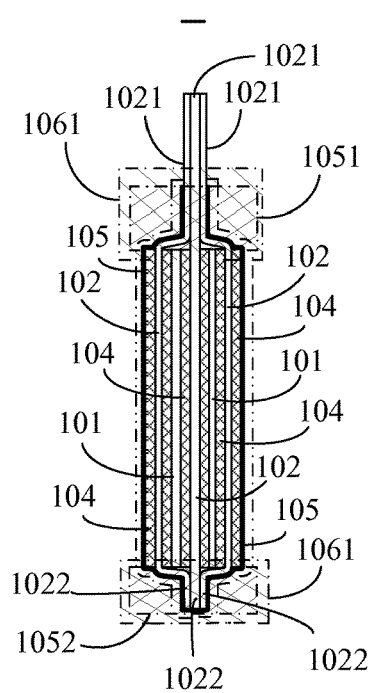
FIG. 100 is a lateral cross sectional view of FIG. 96 taken along B-B showing the first embodiment of the thickness of part of the electrode plates, the positive electrode plate (101) and/or the negative electrode plate (102), being different.
Figure 101:
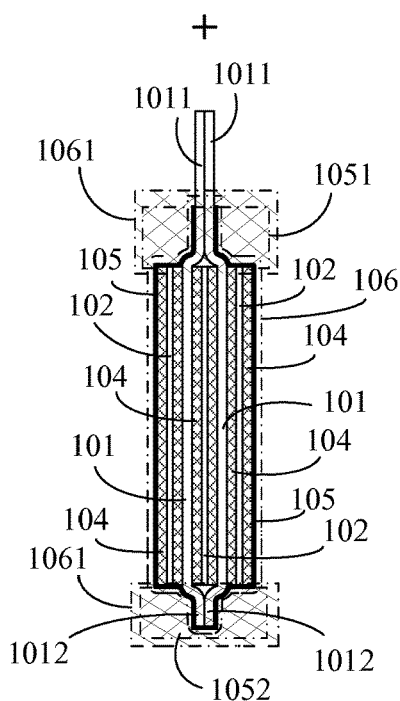
FIG. 101 is a lateral cross sectional view of FIG. 96 taken along A-A showing the second embodiment of the thickness of part of the electrode plates, the positive electrode plate (101) and/or the negative electrode plate (102), being different.
Figure 102:
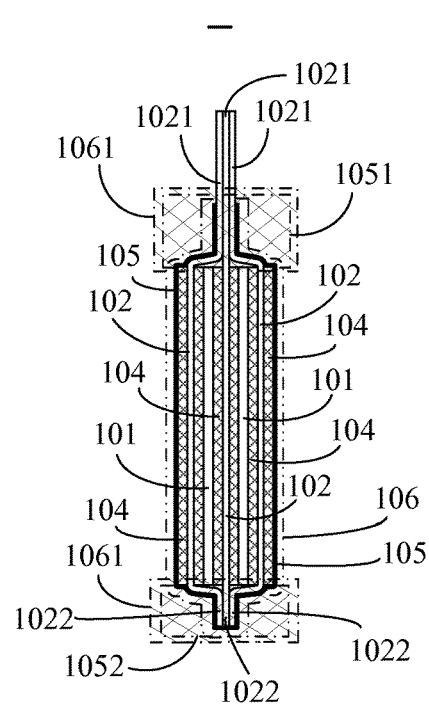
FIG. 102 is a lateral cross sectional view of FIG. 96 taken along B-B showing the second embodiment of the thickness of part of the electrode plates, the positive electrode plate (101) and/or the negative electrode plate (102), being different.
Figure 103:
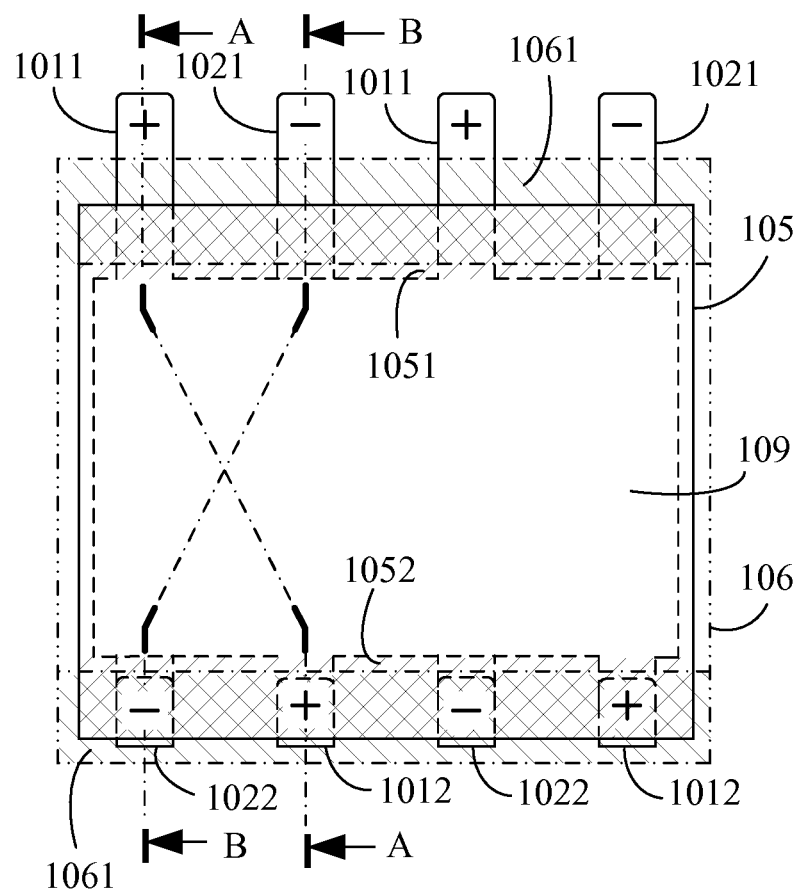
FIG. 103 is a schematic structural view showing an embodiment of two sides of the positive electrode plate (101) and/or the negative electrode plate (102) being respectively installed with two electric conductive terminals for inputting/outputting electric energy applied to a multiple-layer package structure with specific single-sided input/output and having electrode plate pair with multiple-sided input/output terminals.

When the electricity charging/discharging device with insulation package enclose member having electrode plate pair with multiple-sided electric conductive terminals is implemented, the number and the dimension of the electrode plate pair, the positive electrode plate (101) and/or the negative electrode plate (102), of the same insulation package enclose member (105) can be further applicable selected, including following one or more than one selection:
1) increasing the number of the positive electrode plate (101) and/or the negative electrode plate (102) at the same time, while the number of the positive electrode plate (101) and the negative electrode plate (102) being the same;
2) increasing the number of the positive electrode plate (101) and/or the negative electrode plate (102) at the same time, while the number of the positive electrode plate (101) and the negative electrode plate (102) being not the same;

FIG. 96 is a schematic structural view showing an embodiment of increasing the number of the positive electrode plate (101) and/or the negative electrode plate (102) at the same time applied to a multiple-layer package structure with specific single-sided input/output and having electrode plate pair with multiple-sided input/output terminals;

FIG. 97 is a lateral cross sectional view of FIG. 96 taken along A-A;

FIG. 98 is a lateral cross sectional view of FIG. 96 taken along B-B;
3) the thickness of part of the electrode plates, the positive electrode plate (101) and/or the negative electrode plate (102), being different; and FIG. 99 is a lateral cross sectional view of FIG. 96 taken along A-A showing the first embodiment of the thickness of part of the electrode plates, the positive electrode plate (101) and/or the negative electrode plate (102), being different;

FIG. 100 is a lateral cross sectional view of FIG. 96 taken along B-B showing the first embodiment of the thickness of part of the electrode plates, the positive electrode plate (101) and/or the negative electrode plate (102), being different;

FIG. 101 is a lateral cross sectional view of FIG. 96 taken along A-A showing the second embodiment of the thickness of part of the electrode plates, the positive electrode plate (101) and/or the negative electrode plate (102), being different;

FIG. 102 is a lateral cross sectional view of FIG. 96 taken along B-B showing the second embodiment of the thickness of part of the electrode plates, the positive electrode plate (101) and/or the negative electrode plate (102), being different;

4) two or more than two sides of the positive electrode plate (101) and/or the negative electrode plate (102) being respectively installed with electric conductive terminals for inputting/outputting electric energy, while at least one side having more than one electric conductive terminal for inputting/outputting electric energy;

FIG. 103 is a schematic structural view showing an embodiment of two sides of the positive electrode plate (101) and/or the negative electrode plate (102) being respectively installed with two electric conductive terminals for inputting/outputting electric energy applied to a multiple-layer package structure with specific single-sided input/output and having electrode plate pair with multiple-sided input/output terminals.

The applications of the electricity charging/discharging device with insulation package enclose member having electrode plate pair with multiple-sided electric conductive terminals are as followings:

individually used; or
homo-polarity connected in parallel; or
homo-polarity connected in series; or
reverse-polarity connected in series; or
homo-polarity connected in parallel, then two ends formed through the parallel connection being connected in series by polarity order for boosting voltage; or
connected in series by polarity order for boosting voltage, then two ends having the same rated voltage formed through the serial connection being homo-polarity connected in parallel.

According to the electricity charging/discharging device with insulation package enclose member having electrode plate pair with multiple-sided electric conductive terminals, the geometric shape of the electrode plate can be formed in various geometric shapes such as polygonal, circular or elliptical according to actual needs.

According to the electricity charging/discharging device with insulation package enclose member having electrode plate pair with multiple-sided electric conductive terminals, two or more sides of each electrode plate are formed with the input/output electric conductive interface, and the two sides can be opposite sides or adjacent sides or three sides or more sides or the periphery thereof can be formed in the circular or elliptical shape.

According to the electricity charging/discharging device with insulation package enclose member having electrode plate pair with multiple-sided electric conductive terminals, the input/output electric conductive terminal formed on the side of the electrode plate can be one or more than one.

The invention claimed is:

1. An electricity storing/discharging device, comprising:
   at least one positive electrode plate (101) having at least one first input/output terminal (1011) outwardly extending from a first side of the least one positive electrode plate (101) and at least one third input/output terminal (1012) outwardly extending from a second side of the at least one positive electrode plate (101) that is different from the first side;
   at least one negative electrode plate (102) having at least one second input/output terminal (1021) extending from a first side of the least one negative electrode plate (102) and at least one fourth input/output terminal (1022) extending from a second side of the at least one negative electrode plate (102) that is different from the first side;
   a separator (104) installed between the at least one positive electrode plate (101) and the at least one negative electrode plate (102);
   a sealed packaging member (105) for enclosing the at least one positive electrode plate (101), the at least one negative electrode plate (102), and the separator (104);
   a lateral positive electrically conductive member (109) extending along a first exterior side of the sealed packaging member (105) and electrically connecting the first input/output terminal (1011) to the third input/output terminal (1012); and
   a lateral negative electrically conductive member (110) extending along a second exterior side of the sealed packaging member (105) and electrically connecting the second input/output terminal (1021) to the fourth input/output terminal (1022).

2. The electricity storing/discharging device as claimed in claim 1, wherein the at least one positive electrode plate (101), the at least one negative electrode plate (102), the separator (104), and the sealed packaging member (105) collectively form a lithium-ion battery or supercapacitor.

3. The electricity storing/discharging device as claimed in claim 2, wherein the lithium ion battery is one of a lithium iron phosphate (LFP) battery, a lithium nickel manganese cobalt oxide (NMC) battery, and a lithium polymer battery.

4. The electricity storing/discharging device as claimed in claim 1, wherein the number of the at least one positive electrode plate (101) is greater than one and the number of the at least one negative electrode plate (102) equals the number of the at least one positive electrode plate (101).

5. The electricity storing/discharging device as claimed in claim 1, wherein the number of the at least one positive electrode plate (101) or the number of the at least one negative electrode plate (102) is greater than one, and the number of the at least one positive electrode plate (101) differs from the number of the at least one negative electrode plate (102).

6. The electricity storing/discharging device as claimed in claim 1, wherein the number of the at least one positive electrode plate (101) and the number of the at least one negative electrode plate (102) is greater than one, and the number of the at least one positive electrode plate (101) differs from the number of the at least one negative electrode plate (102).

7. The electricity storing/discharging device as claimed in claim 1, wherein a thickness of the at least one positive electrode plate (101) differs from a thickness of the at least one negative electrode plate (102).

8. The electricity storing/discharging device as claimed in claim 1, wherein at least one of the first and second sides of the at least one positive electrode plate (101) and/or the at least one negative electrode plate (102) has at least two input/output terminals extending therefrom.

9. The electricity storing/discharging device as claimed in claim 1, further comprising a housing (120) that surrounds one or more electricity charging/discharging cells, each formed by at least one each of said positive electrode plate (101), negative electrode plate (102), separator (104), and sealed packaging member (105) to provide a modular cell structure.

10. The electricity storing/discharging device as claimed in claim 9, wherein the housing (120) is a rigid housing.

11. The electricity storing/discharging device as claimed in claim 9, wherein the housing (120) is a flexible housing.

12. The electricity storing/discharging device as claimed in claim 1, wherein:

the sealed packaging member (105) is filled with an electrolyte, the sealed packaging member (105) includes a first sealing zone (1051) for sealing a portion of the at least one first input/output terminal (1011) that is adjacent the first side of the at least one positive electrode plate (101) and a portion of the at least one second input/output terminal (1021) that is adjacent the first side of the at least one negative electrode plate (102), and a second sealing zone (1052) for sealing a portion of the at least one third input/output terminal (1012) that is adjacent the second side of the at least one positive electrode plate (101) and a portion of the at least one fourth input/output terminal (1022) that is adjacent the second side of the at least one negative electrode plate (102), and the sealed packaging member (105) further includes respective sealed openings through which the at least one first input/output terminal (1011), the at least one second input/output terminal (1021), the at least one third input/output terminal (1012), and the at least one fourth input/output terminal (1022) respective extend to enable input and/or output of electric energy through at least one of the first and third input/output terminals (1011,1012) and at least one of the second and fourth input/output terminals (1021,1022);

wherein distal ends of any two of the first input/output terminal (1011), the second input/output terminal (1021), the third input/output terminal (1012) and the fourth input/output terminal (1022) are inwardly bent along an interior of at least one of the first and second sealing zones (1051,1052) for electrical connection to the respective lateral positive electrically conductive member (109) and lateral negative electrically conductive member (110), and wherein the lateral positive electrically conductive member (109) and lateral negative electrically conductive member (110) form parallel electrical connections between the respective first and third input/output terminals (1011,1012) and second and fourth input/output terminals (1021,1022).

13. The electricity storing/discharging device as claimed in claim 12, wherein the lateral positive electrically conductive member (109) and the lateral negative electrically conductive member (110) each includes a substantially rectangular section.

14. The electricity storing/discharging device as claimed in claim 12, wherein the lateral positive electrically conductive member (109) and the lateral negative electrically conductive member (110) are substantially strip-shaped members.

15. The electricity storing/discharging device as claimed in claim 12, wherein the lateral positive electrically conductive member (109) and the lateral negative electrically conductive member (110) each includes a substantially circular section.

16. The electricity storing/discharging device as claimed in claim 12, wherein the positive electrode plate (101) is integrally formed with the lateral positive electrically conductive member (109), and the negative electrode plate (102) is integrally formed with the lateral negative electrically conductive member (110).

17. The electricity storing/discharging device as claimed in claim 12, further comprising a lateral positive auxiliary electrically conductive member (1091) on an exposed surface of the lateral positive electrically conductive member (109).

18. The electricity storing/discharging device as claimed in claim 12, further comprising a lateral negative auxiliary electrically conductive member (1101) on an exposed surface of the lateral negative electrically conductive member (110).

19. The electricity storing/discharging device as claimed in claim 12, wherein the first, second, third, and fourth input/output terminals (1011,1021,1012,1022) are each exposed to provide multiple electrically conductive interfaces on each side of the respective positive and negative electrode plates (101,102) for series, parallel, or series-parallel connection.

20. The electricity storing/discharging device as claimed in claim 12, wherein the first and second input/output terminals (1011,1021) are exposed to provide multiple electrically conductive interfaces on the first sides of the respective positive and negative electrode plates (101,102), and the third and fourth input/output terminals (1012,1022) are sealed within the second sealing zone (1052) on the second sides of the respective positive and negative electrode plates (101,102).

21. The electricity storing/discharging device as claimed in claim 12, wherein one of the first and second input/output terminals (1011,1021) is exposed to provide an electrically conductive interface on the first side of one of the positive and negative electrode plates (101,102), the other of the first and second input/output terminal (1011,1021) is sealed within the first sealing zone (1051) on the first side of the respective positive and negative electrode plates (101,102), one of the third and fourth input/output terminals (1012,1022) is exposed to provide an electrically conductive interface on the second side of the other one of the positive and negative electrode plates (101,102), and the other of the third and fourth input/output terminals (1012,1022) is sealed within the second sealing zone (1052) on the second side of the respective positive and negative electrode plates (101,102).

22. The electricity storing/discharging device as claimed in claim 12, wherein the inwardly-bent distal ends of the third and fourth input/output terminals (1012,1022) are respectively joined to but not integrally formed with the lateral positive and negative electrically conductive members (109,110).

23. The electricity storing/discharging device as claimed in claim 12, wherein distal ends of each of the first input/output terminal (1011), the second input/output terminal (1021), the third input/output terminal (1012) and the fourth input/output terminal (1022) are inwardly bent along an interior of one of the respective first and second sealing zones (1051,1052), and exposed to provide multiple electrically conductive interfaces on each of the first and second sides of the respective positive and negative electrode plates (101,102) for series, parallel, or series-parallel connection.

24. The electricity storing/discharging device as claimed in claim 12, further comprising an outer auxiliary insulation package enclosing member (106) for enclosing the electricity storage/discharge cell formed by the sealed packaging member (105), the at least one positive electrode plate (101), the at least one negative electrode plate (102), and the separator (104) installed between the electrode plates (101, 102), wherein the outer auxiliary insulation package enclosing member (106) is made of an electrically insulating material and forms a bag-like structure, and wherein the lateral positive electrically conductive member (109) and the lateral negative electrically conductive member (110), or the first and second input/output terminals (1011,1021), are exposed through openings in the outer auxiliary insulation package enclosing member (106) to form an input/output electrically conductive interface.

25. The electricity storing/discharging device as claimed in claim 24, wherein:
the outer auxiliary insulation package enclosing member (106) includes an outer sealing zone (1061) for forming, together with the first sealing zone (1051), a seal around mid-portions of the first and second input/output terminals (1011,1021), and
distal portions of the first and second input/output terminals (1011,1021) are exposed through openings in a same side of the outer auxiliary insulation package enclosing member (106) to form the single input/output electrically conductive interface.

26. The electricity storing/discharging device as claimed in claim 24, wherein the lateral positive electrically conductive member (109) and the lateral negative electrically conductive member (110) are exposed through openings (1060) at two lateral sides of the of the outer auxiliary insulation package enclosing member (106) to form the single input/output electrically conductive interface.

27. The electricity storing/discharging device as claimed in claim 24, wherein the lateral positive electrically conductive member (109) and the lateral negative electrically conductive member (110) are laterally extended to form a respective lateral positive auxiliary electrically conductive member (1091) and a lateral negative auxiliary electrically conductive member (1101), and the lateral positive electrically conductive member (109) and the lateral negative electrically conductive member (110) are exposed through openings (1060) at two lateral sides of the of the outer auxiliary insulation package enclosing member (106) to form the single input/output electrically conductive interface.

28. The electricity storing/discharging device as claimed in claim 24, wherein a mid-portion of the lateral positive electrically conductive member (109) and a mid-portion of the lateral negative electrically conductive member (110) each includes an outwardly protruding structure exposed through a respective opening (1060) in lateral sides of the outer auxiliary insulation package enclosing member (106) to form the single input/output electrically conductive interface.

29. The electricity storing/discharging device as claimed in claim 24, wherein the electricity storage/discharge cell and the outer auxiliary insulation package enclosing member (106) are formed into a rolled structure.

30. The electricity storing/discharging device as claimed in claim 24, further comprising at least one additional said first input/output terminal (1011), at least one additional said second input/output terminal (1021), the multiple first and second input/output terminals (1011,1021) being exposed through the openings in the outer auxiliary insulation package enclosing member (106) to form the single input/output electrically conductive interface.

31. The electricity storing/discharging device as claimed in claim 24, wherein the outer auxiliary insulation package enclosing member (106) is made of an aluminum laminated film.

32. The electricity storing/discharging device as claimed in claim 1, further comprising:
a lateral positive electrically conductive member (109) extending along a first exterior side of the sealed packaging member (105) and electrically connecting the at least one first input/output terminal (1011) to the at least one third input/output terminal (1012); and
a lateral negative electrically conductive member (110) extending along a second exterior side of the sealed packaging member (105) and electrically connecting the at least one second input/output terminal (1021) to the at least one fourth input/output terminal (1022),
wherein the lateral positive electrically conductive member (109) and lateral negative electrically conductive member (110) form parallel electrical connections between the respective first and third input/output terminals (1011,1012) and second and fourth input/output terminals (1021,1022).

33. The electricity storing/discharging device as claimed in claim 24, wherein the at least one positive electrode plate (101), the at least one negative electrode plate (102), the separator (104), and the sealed packaging member (105) are flexible and formed into a rolled structure.

34. The electricity storing/discharging device as claimed in claim 1, wherein the sealed packaging member (105) is made of an aluminum laminated film.

35. The electricity storing/discharging device as claimed in claim 1, wherein the separator (104) is made of polyethylene (PE) or polypropylene (PP).

* * * * *